(12) United States Patent
Matsumoto et al.

(10) Patent No.: US 7,750,084 B2
(45) Date of Patent: Jul. 6, 2010

(54) PHOTORESPONSIVE POLYMER, BUILT-UP TYPE DIACETYLENE POLYMER, CRYSTAL OF AMMONIUM CARBOXYLATE, AND METHOD FOR MANUFACTURING THEM

(75) Inventors: Akikazu Matsumoto, Kawachinagano (JP); Toru Odani, Sendai (JP)

(73) Assignee: Japan Science and Technology Agency, Saitama (JP)

( * ) Notice: Subject to any disclaimer, the term of this patent is extended or adjusted under 35 U.S.C. 154(b) by 1322 days.

(21) Appl. No.: 10/487,849

(22) PCT Filed: Aug. 26, 2002

(86) PCT No.: PCT/JP02/08559

§ 371 (c)(1), (2), (4) Date: Oct. 1, 2004

(87) PCT Pub. No.: WO03/018525

PCT Pub. Date: Mar. 6, 2003

(65) Prior Publication Data

US 2005/0038284 A1 Feb. 17, 2005

(30) Foreign Application Priority Data

| Aug. 27, 2001 | (JP) | ............................. 2001-257028 |
| May 9, 2002 | (JP) | ............................. 2002-134763 |
| Jul. 10, 2002 | (JP) | ............................. 2002-201880 |

(51) Int. Cl.
- *C08F 8/30* (2006.01)
- *C08F 20/00* (2006.01)
- *C07C 69/74* (2006.01)
- *C07C 63/04* (2006.01)

(52) U.S. Cl. .................... 525/329.9; 526/298; 560/122; 562/493

(58) Field of Classification Search .................. 560/122; 562/493; 525/329.9; 526/298
See application file for complete search history.

(56) References Cited

U.S. PATENT DOCUMENTS 2,502,548 A * 4/1950 Allen et al. .................. 528/317

3,743,505 A 7/1973 Bloom et al.
3,844,791 A * 10/1974 Bloom et al. ................ 430/338

(Continued)

FOREIGN PATENT DOCUMENTS

EP 0 418 833 A2 3/1991

(Continued)

OTHER PUBLICATIONS

Japanese Publication, "Kagakudojin 2000", vol. 55, No. 12, pp. 22-26, (2000).

(Continued)

*Primary Examiner*—William K Cheung
(74) *Attorney, Agent, or Firm*—Harness, Dickey & Pierce, P.L.C.

(57) ABSTRACT

A crystal of carboxyl acid and at least one compound selected from the group consisting of amine and ammonia are mixed in an absence of a liquid medium. The carboxyl acid is conjugated diene such as (Z,Z)-muconic acid, the conjugated diene including a carboxyl group. The at least one nitrogen-containing compound selected from the group consisting of amine and ammonia is primary amine represented by $RCH_2NH_2$, where R is an aryl group, or is a normal alkyl group that contains five or more carbon atoms. Moreover, such amine that is a bivalent group and that is represented by —Ar—N=N—Ar'—, where Ar and Ar' are independently aromatic hydrocarbon bivalent groups, is intercalated in a layered crystal of a polymer such as polymuconic acid, the layered crystal including a carboxyl group. In this way, a novel photoresponsive polymer is obtained. Also obtained is a crystal of ammonium carboxylate including at least one kind of carboxyl acid and at least one kind of amine, at least one kind of compound selected from (i) the at least one kind of carboxyl acid and (ii) the at least one kind of amine being a diacetylene derivative. The crystal of ammonium carboxylate is subjected to light or heat, to obtain a built-up type diacetylene polymer.

6 Claims, 18 Drawing Sheets

U.S. PATENT DOCUMENTS

| | | | |
|---|---|---|---|
| 3,954,816 | A | 5/1976 | Bloom et al. |
| 4,066,676 | A | 1/1978 | Bloom et al. |
| 4,431,263 | A | 2/1984 | Garito |
| 4,439,514 | A * | 3/1984 | Garito .................. 430/272.1 |
| 4,536,450 | A | 8/1985 | Garito |
| 4,581,315 | A | 4/1986 | Garito |
| 4,615,962 | A | 10/1986 | Garito |
| 4,814,404 | A | 3/1989 | Matsuda et al. |
| 4,904,438 | A | 2/1990 | Matsuda et al. |
| 5,504,245 | A | 4/1996 | Liang et al. |
| 5,663,418 | A | 9/1997 | Liang et al. |
| 5,969,181 | A | 10/1999 | Breitenbach et al. |
| RE37,188 | E | 5/2001 | Liang et al. |
| 6,294,593 | B1 * | 9/2001 | Jeng et al. .................. 522/103 |

FOREIGN PATENT DOCUMENTS

| | | |
|---|---|---|
| JP | 55-5100 | 2/1980 |
| JP | 56-43220 | 4/1981 |
| JP | 63-063635 | 3/1988 |
| JP | 63-063713 | 3/1988 |
| JP | 63-096144 | 4/1988 |
| JP | 01-233247 | 9/1989 |
| JP | 02-015043 | 1/1990 |
| JP | 04-248818 | 9/1992 |
| JP | 10-072400 | 3/1998 |
| JP | 10-507166 | 7/1998 |

OTHER PUBLICATIONS

Japanese Publication, A. Matsumoto, 1997, vol. 46, No. 9, pp. 703-708.

A. Matsumoto et al., "Molecular Design and Polymer Structure Control Based on Polymer Crystal Engineering. Topochemical Polymerization of 1, 3-Diene Mono- and Dicarboxylic Acid Derivatives Bearing a Naphthylmethylammonium Group as the Counteraction", J. Am. Chem. Soc., 2000, vol. 122, pp. 9109-9119.

T. Odani et al., "First example of the topochemical polymerization of the (E, E)-muconic acid derivative", Macromol. Rapid Commun., 2000, vol. 21, No. 1, pp. 40-44.

A. Matsumoto , "Organic Intercalation: The Discovery and Application of New Topochemical Polymerization", Chemistry, 2000, vol. 55, No. 12, pp. 22-26.

A. Matsumoto, "Recent Development in Macromolecule Chemistry: Crystalline-State Polymerization", Macromolecules, 1997, vol. 46, No. 9, pp. 703-708.

M. Ogawa et al., "Photocontrol of the Basal Spacing of Azobenzene-Magadiite Intercalation Compound", Adv. Mater. 2001, 13, No. 14, Jul. 18, pp. 1107-1109.

M. Ogawa, "Preparation of a Cationic Azobenzene Derivative-Montmorillonite Intercalation Compound and the Photochemical Behavior", Chem. Mater., vol. 8, No. 7, 1996, pp. 1347-1349.

A. Matsumoto et al., "Topochemical Polymerization of 1,3-Diene Monomers and Features of Polymer Crystals as Organic Intercalation Materials", Macromol. Rapid Commun. 2001, 22, No. 15, pp. 1195-1215.

A. Matsumoto, "Stereospecific Polymerization of 1,3-Diene Monomers in the Crystalline State", Prog. React. Kinet. Mecha., vol. 26, 2001, pp. 59-109.

European Office Action issued on May 2, 2005.

Aoba et al., "Solid-State Polymerization of Some Diacetylenic Nylon Salts", Mol. Cryst. Liq. Cryst., vol. 315, pp. 59-64 (1998).

* cited by examiner

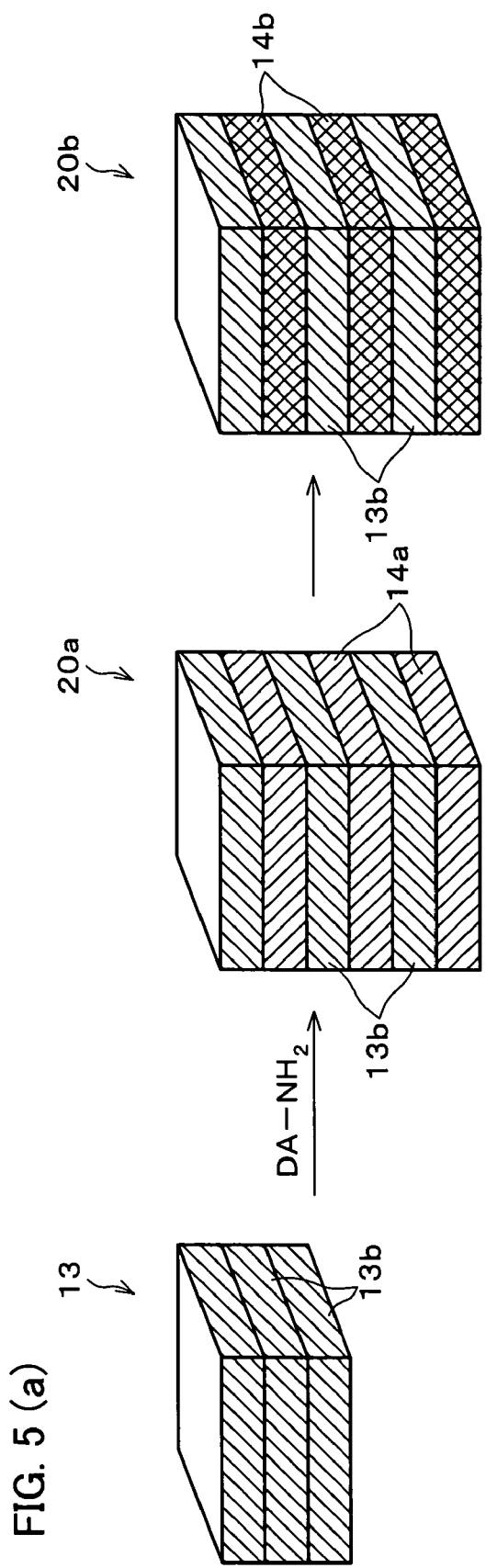
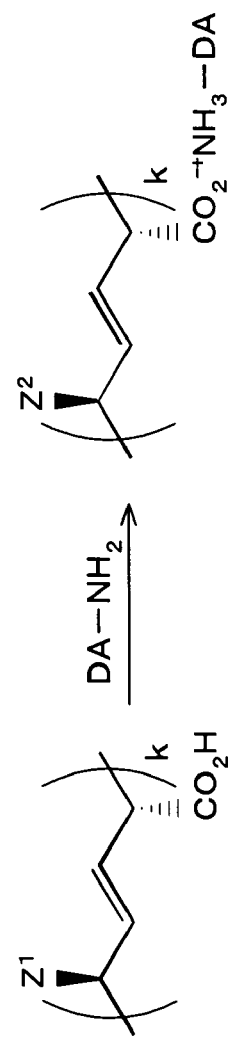
FIG. 5(a)
FIG. 5(b)

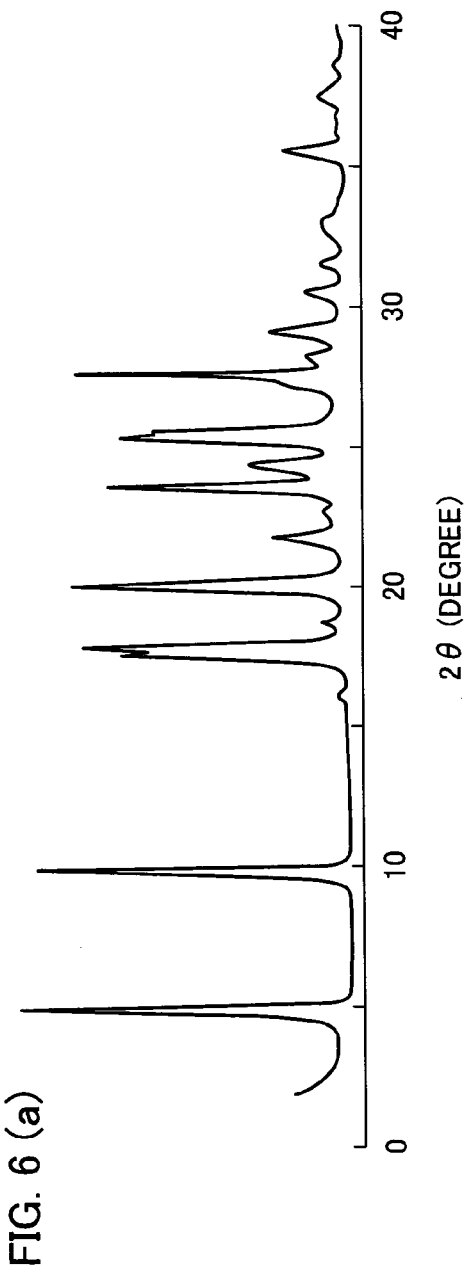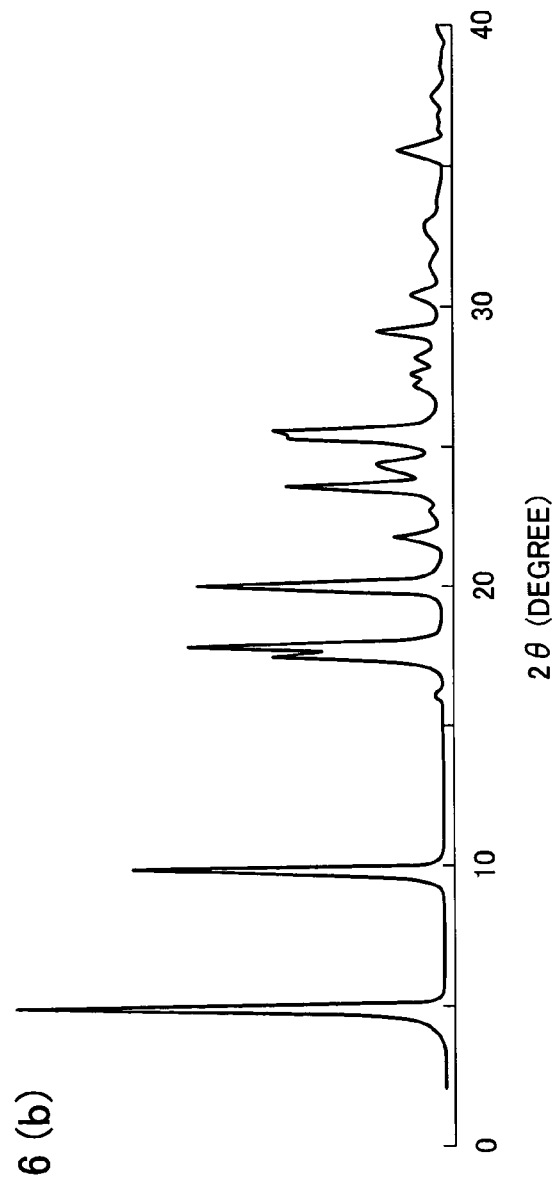
FIG. 6 (a)
FIG. 6 (b)

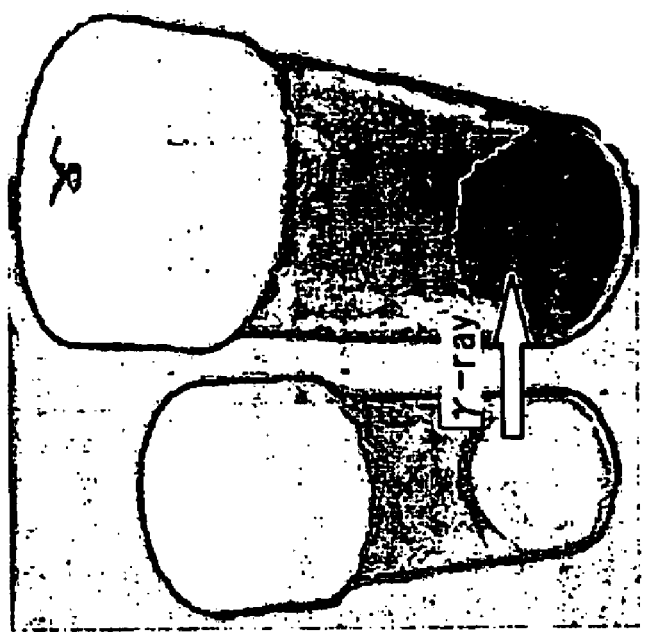
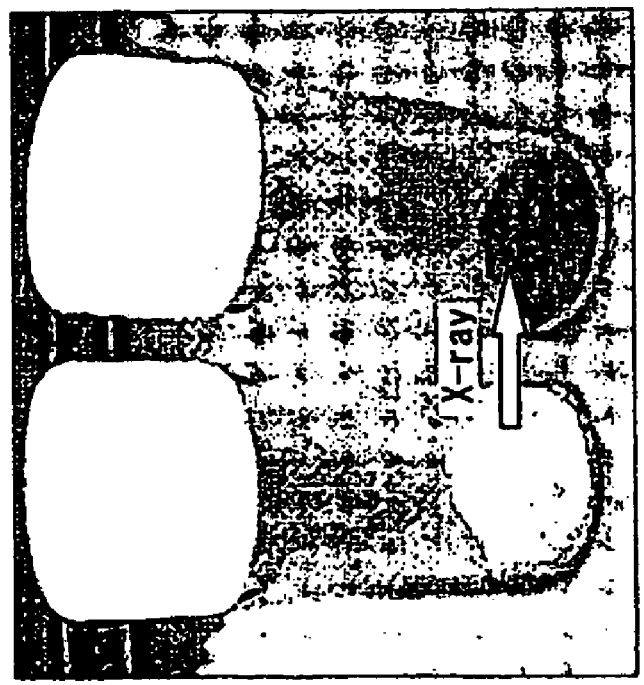
FIG. 16 (a)
FIG. 16 (b)

US 7,750,084 B2

PHOTORESPONSIVE POLYMER, BUILT-UP TYPE DIACETYLENE POLYMER, CRYSTAL OF AMMONIUM CARBOXYLATE, AND METHOD FOR MANUFACTURING THEM

The U.S. Patent application is a 371 of PCT/JP02/08559 filed Aug. 26, 2002.

TECHNICAL FIELD

The present invention relates to (i) a novel photoresponsive polymer in which a guest compound including a photoresponsive group is intercalated in a layered crystalline polymer, (ii) a built-up type diacetylene polymer that is a novel compound having a layered structure in which an arrangement of polymer chains in a crystal is controlled, (iii) a crystal of ammonium carboxylate made of (a) carboxyl acid and (b) at least one nitrogen-containing compound selected from the group consisting of amine and ammonia, and (iv) a method of manufacturing the crystal of ammonium carboxylate suitable for manufacturing the photoresponsive polymer and the built-up type diacetylene polymer.

BACKGROUND ART

Conventionally, a crystal of ammonium carboxylate is produced by a well-known method using (a) a crystal of carboxyl acid and (b) amine.

For example, inventors of the present invention reported that a crystal of muconic alkylammonium is obtained as follows. A crystal of muconic acid and normal alkylamine are dissolved and mixed in a solvent such as methanol, water, or the like. Then, the solvent is removed, and a solid substance thus obtained is recrystallized.

The inventors of the present invention also reported that a polymer crystal is produced by solid-state polymerization, i.e. by radiating light, X-rays, γ-rays, or the like onto the crystal of muconic alkylammonium obtained by the foregoing method, and that a layered crystal of polymuconic acid is obtained by hydrolyzing the polymer crystal with acid, and then removing the solvent.

The inventors of the present invention further reported that, by the following operation, normal alkylamine is intercalated between layers of the layered crystal of polymuconic acid obtained by the foregoing method: (1) dispersing the layered crystal in a dispersion medium such as methanol, water, or the like, (2) mixing the solution with normal alkyl amine, and (3) removing the dispersion medium.

However, according to the conventional methods using a solvent or a dispersion medium, a polymer crystal having a layered structure cannot be obtained in a simple manner, because it is necessary to separate the solvent or the dispersion medium, and to cause recrystallization.

Moreover, according to the method in which intercalation is induced by using a dispersion medium, there are cases in which a polymer crystal having a layered structure cannot be obtained, because a polymer crystal swells or dissolves in the dispersion medium if certain kind of amine is used. Especially, if alkyl primary amine having a branch structure or primary amine including a functional group is used, a polymer crystal in which the alkyl primary amine having a branch structure between layers of a layered crystal or the primary amine including a functional group cannot be obtained, because the layered crystal of polymuconic acid swells or dissolves in the dispersion medium during a reaction.

Existence of photoresponsive low-molecular-weight compounds, photoresponsive polymers, and photoresponsive polymer materials are conventionally well-known. For example, it is well-known that an azobenzene derivative (a low-molecular-weight compound) has photoresponsiveness, i.e. that an azobenzene derivative is isomerized into a cis body when subjected to ultraviolet rays, and into a trans body when subjected to heat or visible light. Also well-known are photoresponsive polymers in which a side chain thereof is chemically bonded with a substituent including an azo group, and photoresponsive polymer materials in which a low-molecular-weight azo compound is dispersed in a polymer matrix. These are used in a solution state or in a film-shaped solid state.

Many attempts have been made to intercalate amine including a photoresponsive group, such as an azo group, into a generally available inorganic layered crystal. It is well-known that, because some inorganic layered crystals, namely clay minerals, silicate, and metal oxide, have cation exchangeability due to negative charges thereof, it is relatively easy to intercalate amine into these inorganic layered crystals, i.e. clay minerals, silicate, and metal oxide (see Chemical Society of Japan ed, "Inorganic and Organic Nano Compounds", in *Kikan Kagaku Sousetsu*, No. 42, Gakkai Shuppan Center (1999), p. 33-44). For example, it is reported that in one case amine including an azo group was intercalated into an inorganic layered crystal (For example, "Photocontrol of the Basal Spacing of Azobenzene-Magadiite Intercalation Compound", M. Ogawa, T. Ishii, N. Miyamoto, K. Kuroda, Adv. Mater. 13, 1107-1109 (2001), and "Preparation of a Cationic Azobenzene Derivative-Montmorillonite Intercalation Compound and the Photochemical Behavior", M. Ogawa, Mater. Chem., 8, 1347-1349 (1996)).

However, it is not easy to photoisomerize a usual azobenzene derivative (which includes no amino group) and induce a structural change of a crystalline polymer by mixing the azobenzene derivative and the crystalline polymer. Moreover, it requires considerable time and effort to chemically bond an azo group with a polymer directly. Therefore, the conventional photoresponsive polymer cannot be manufactured easily, let alone with variations. Moreover, sufficient stability and a sufficient function (photoresponsiveness) cannot be attained by simply dispersing a low-molecular-weight azo compound in a matrix.

Moreover, it is not easy to use, in a solution state or in a film-shaped solid state, a photosensitive material in which amine including a photoresponsive group, such as an azo group, is intercalated in an inorganic layered crystal. Therefore, such a photosensitive material has a drawback that they can be used only for limited purposes.

A well-known photofunctional polymer other than the photoresponsive polymers and the photoresponsive polymer materials is a conjugated system polymer that absorbs light of a certain wavelength band. For example, crystalline polydiacetylene obtained by polymerizing diacetylene is a colored conjugated system polymer that has high absorbance with respect to light in a visible region.

Incidentally, in order to design a crystalline polymer such as polydiacetylene, topochemical polymerization is performed. Well-known examples of the topochemical polymerization are polymerization of a 1,3-diene monomer such as a muconic derivative, a sorbic derivative, or the like, and polymerization in a built-up film such as an LB (Langmuir-Blodgett) film or the like. The topochemical polymerization is one form of solid-state polymerization. In the topochemical polymerization, a reaction proceeds with minimum movements of atoms and substituents, while a center of gravity of a monomer and symmetry of a crystal are maintained. Therefore, a structure of a product obtained by the topochemical polymerization is controlled not only by chemical properties, e.g. reactivity, of the monomer, but also by an arrangement of the crystal formed by the monomer. Thus, in the topochemical polymerization, a polymerization reaction proceeds under a control of a crystalline lattice. Therefore, the topochemical polymerization makes it possible to design a polymer having stereospecificity and stereoselectivity.

However, according to the conventional topochemical polymerization of diacetylene, it is not easy to predict reactivity of the polymerization reaction. Therefore, it is not easy to predict a crystalline structure of the polydiacetylene obtained by performing the topochemical polymerization. In other words, it is not easy to control an arrangement of polymer chains in the crystal of the polydiacetylene. Therefore, because the crystalline structure of the polydiacetylene obtained by performing the topochemical polymerization varies according to various conditions such as a condition of polymerization and the like, it is not easy to obtain polydiacetylene having an intended absorbing property.

On the other hand, if the polydiacetylene is used as a photofunctional polymer, it is desired that the polydiacetylene have a certain crystalline structure under a certain reaction condition, in order to attain a stable function. It is therefore desired that an arrangement of the polymer chains of the polydiacetylene obtained by polymerizing diacetylene be controlled, so as to obtain polydiacetylene that has a certain absorbing property. If such polydiacetylene that has an intended absorbing property cannot be attained with high reproducibility by setting a reaction condition, it is not easy to use the polydiacetylene as a photofunctional polymer.

The present invention was made to solve the foregoing conventional problems. An object of the present invention is therefore to provide a photoresponsive polymer in which amine including an azo group, which is a photoresponsive group, is intercalated as a guest compound in a layered crystalline polymer including carboxyl acid, the photoresponsive polymer being such that an absorbing property and a structure thereof can be changed by radiating light so as to cause cis/trans isomerization of the azo group. Another object is to provide a built-up type diacetylene polymer that includes polydiacetylene having a layered structure in which an arrangement of polymer chains in a crystal is controlled, the built-up type diacetylene polymer being a conjugated system polymer having high absorbaption in a visible region. Yet another object is to provide a crystal of ammonium carboxylate made of carboxyl acid and at least one nitrogen-containing compound selected from the group consisting of amine and ammonia, and to provide a method of manufacturing a crystal of ammonium carboxylate suitable for manufacturing the photoresponsive polymer and the built-up type diacetylene polymer.

DISCLOSURE OF INVENTION

A method of the present invention for manufacturing a crystal of ammonium carboxylate includes the step of mixing, in an absence of a liquid medium, a crystal of carboxyl acid and at least one nitrogen-containing compound selected from the group consisting of amine and ammonia.

In this method, carboxyl acid is reacted in a crystalline state with at least one nitrogen-containing compound selected from the group consisting of amine and ammonia. Because the carboxyl acid is reacted in the crystalline state, which is a most controlled reaction field, a stereospecific reaction is induced. As a result, a single product is obtained. Moreover, because this method uses no liquid medium (e.g. a solvent, a dispersion medium, or the like), separation of a liquid medium and recrystallization are not required. Therefore, this method makes it possible to manufacture a crystal of ammonium carboxylate in a simple manner.

In addition to the advantage in synthesis, because no liquid medium is used, there is also an advantage that this method is environment-friendly in that no waste liquid medium is produced.

In the present description, the term "liquid medium" refers to a liquid substance that does not directly contribute to a chemical reaction, but forms a field (a reaction field) in which a chemical reaction occurs. The "liquid medium" is typified by a liquid solvent and a liquid dispersion medium.

A photoresponsive polymer of the present invention is a layered polymer in which amine including, as a photoresponsive group, a bivalent group represented by the following general formula

where Ar and Ar' are independently aromatic hydrocarbon bivalent groups, is intercalated as a guest compound in a layered crystal (a layered crystalline polymer) of a polymer (especially polymuconic acid or polysorbic acid) including a carboxyl group.

In this arrangement, amine including, as a photoresponsive group, a bivalent group including an azo group (—N=N—) is intercalated. Due to this structure, cis-trans isomerization of the azo group occurs when light is radiated, resulting in a structural change of the bivalent group. Therefore, it is possible to change a crystalline structure of the layered crystalline polymer (e.g., to change a layer interval) in accordance with the structural change of the bivalent group. Thus, according to the present invention, it is possible to provide a novel crystalline photofunctional polymer capable of reversibly changing a crystalline structure thereof by performing a photo response (a response to radiation of light).

A photofunctional polymer of the present invention including an azo group is such that the layer interval thereof changes reversibly according to conditions of light radiation. Therefore, it is expected that the photofunctional polymer can be used as (i) a photofunctional material for use as an optical memory material and a recording material, (ii) a photofunctional material for use as an electric/electronic material, (iii) and the like.

A crystal of ammonium carboxylate that is a monomer of a built-up type diacetylene polymer of the present invention includes at least one carboxyl acid and at least one amine, at least one kind of compound selected from (i) the at least one carboxyl acid and (ii) the at least one amine being a diacetylene derivative.

From the crystal of ammonium carboxylate, it is possible to obtain a built-up type diacetylene polymer that is a conjugated system polymer. That is, when carboxyl groups of the carboxyl acid and amino groups of the amine are ionically bonded, a crystal of ammonium carboxylate in which an arrangement of the carboxyl acid and the amine is regulated is produced. The crystal of ammonium carboxylate thus produced is structured so that a layer of carboxyl acid and a layer of ammonium are built-up alternately.

Therefore, by polymerizing the crystal of ammonium carboxylate, it is possible to control a direction of arrangement of polymer chains obtained by polymerization, thereby obtaining a built-up type diacetylene polymer that has a layered structure including a layer of carboxyl acid and a layer of ammonium. The layered structure of the built-up type diacetylene polymer varies according to a type of the ammonium carboxylate used. Therefore, by appropriately selecting types of the carboxyl acid and the amine used, it is possible to obtain built-up type diacetylene polymers of various layered structures.

The diacetylene polymer obtained by polymerizing the diacetylene derivative is a conjugated system polymer, and is a colored polymer having high absorbance with respect to light in the visible region. Here, the term "colored" means that the color of the polymer is other than white. Therefore, because of the absorbing property of the built-up type diacetylene polymer, the built-up type diacetylene polymer can be used in an organic electroluminescence (an organic EL), an organic photoluminescence (an organic PL), a non-linear optical material, and the like. In addition, the absorbing property of the built-up type diacetylene polymer varies according to the layered structure of the built-up type diacetylene polymer. Therefore, by appropriately combining the carboxyl acid and the amine, which are components of the ammonium carboxylate, it is possible to provide built-up type diacetylene polymers of various absorbing properties.

Moreover, because the built-up type diacetylene polymer includes a conjugated system polymer, the built-up type diacetylene polymer has an excellent electric property. Therefore, the built-up type diacetylene polymer can be used as an organic semiconductor. Furthermore, each layer of the built-up type diacetylene polymer is in nanometer-thickness. Therefore, it is possible to use the built-up type diacetylene polymer in nano-devices.

For a fuller understanding of the nature and advantages of the invention, reference should be made to the ensuing detailed description taken in conjunction with the accompanying drawings.

BRIEF DESCRIPTION OF DRAWINGS

FIG. 5(a) is a conceptual diagram illustrating that the crystal of ammonium carboxylate of the present invention and the built-up type diacetylene polymer of the present invention are manufactured by means of intercalation. FIG. 5(b) illustrates a chemical formula of a reaction between a diene polymer and the amine as a diacetylene derivative.

FIGS. 6(a) and 6(b) are X-ray diffraction spectrums of a crystal of 2,5-polymuconic benzylammonium. FIG. 6(a) is an X-ray diffraction spectrum of a crystal of 2,5-polymuconic benzylammonium obtained in one example of the manufacturing method of the present invention. FIG. 6(b) is an X-ray diffraction spectrum of a crystal of 2,5-polymuconic benzylammonium obtained by a conventional manufacturing method.

FIG. 16(a) illustrates how a color of the crystal of ammonium carboxylate changed after X-rays were radiated onto the crystal. FIG. 16(b) illustrates how the color of the crystal of ammonium carboxylate changed after γ-rays were radiated onto the crystal.

BEST MODE FOR CARRYING OUT THE INVENTION

Figure 1:
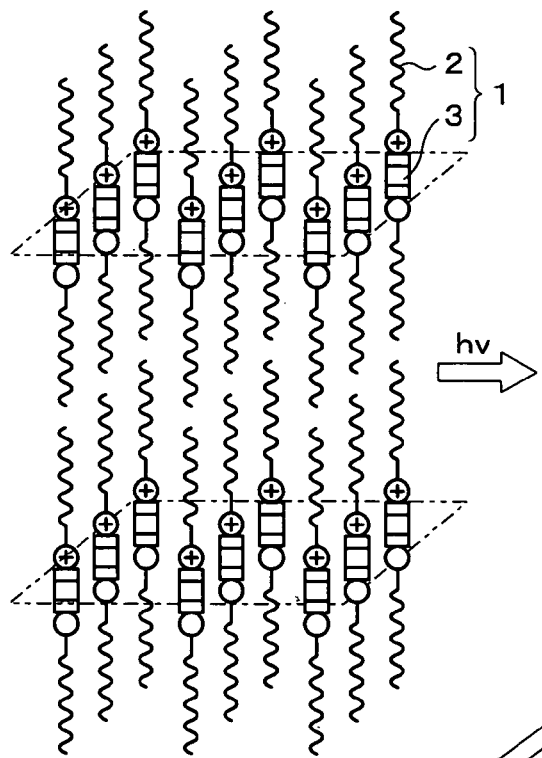
FIGS. 1(a) to 1(d) are schematic diagrams illustrating steps for manufacturing ammonium carboxylate of one embodiment of the present invention.
Figure 1:
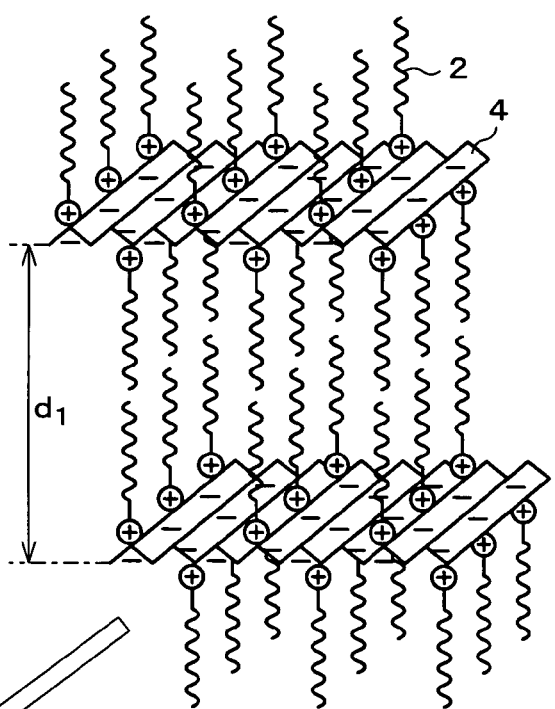
Figure 1:
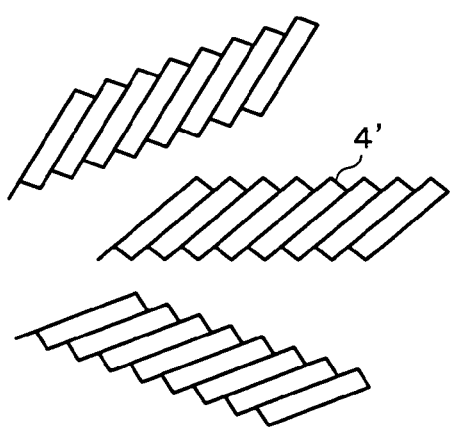
Figure 1:
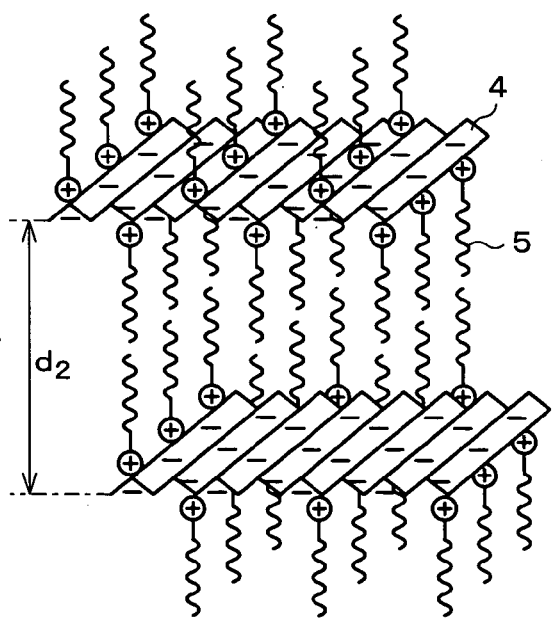

The present invention is more fully described through the following embodiments, examples, comparative examples, and referential examples. Note that the present invention is not limited to the following embodiments, examples, comparative examples, and referential examples.

First, a photoresponsive polymer, and a method of manufacturing ammonium carboxylate suitable for manufacturing the photoresponsive polymer are described. Then, a built-up type diacetylene polymer, and a crystal of ammonium carboxylate that is a monomer of the built-up type diacetylene polymer are described. Thereafter, the embodiments are described more fully through the examples, comparative examples, and referential examples.

[I] Photoresponsive Polymer and Method of Manufacturing Crystal of Ammonium Carboxylate In a method of the present invention for manufacturing ammonium carboxylate, a crystal of carboxyl acid (hereinafter "carboxyl acid crystal") is mixed with at least one nitrogen-containing compound selected from the group consisting of amine and ammonia. This is performed in an absence of a liquid medium, that is, the carboxyl acid crystal is not dissolved in a solvent or dispersed in a dispersion medium, but is in a crystalline state.

The carboxyl acid crystal is not particularly limited, as long as it is a solid substance at a normal temperature. Examples of the carboxyl acid crystal are (i) monobasic unsaturated carboxyl acid such as sorbic acid, crotonic acid, tiglic acid, and the like; (ii) dibasic unsaturated carboxyl acid such as malonic acid, succinic acid, adipic acid, oxalic acid, and the like; (iii) and the like. In addition, the carboxyl acid crystal may be a polymer such as polymuconic acid, polysorbic acid, or the like, the polymer including a carboxyl group.

Said at least one nitrogen-containing compound selected from the group consisting of amine and ammonia is not particularly limited, and may be a solid substance or a gaseous substance. Examples of the at least one nitrogen-containing compound selected from the group consisting of amine and ammonia are: (i) primary amine such as methylamine, ethylamine, n-propylamine, n-butylamine, isobutylamine, octylamine, benzylamine, dodecylamine, 1-naphthylmethylamine, and the like; (ii) secondary amine; (iii) tertiary amine; (iv) ammonia; (v) and the like.

If the carboxyl acid crystal is carboxyl acid such as sorbic acid, muconic acid, or the like, the carboxyl acid including a conjugated diene part (conjugated diene including a carboxyl group), and the at least one nitrogen-containing compound selected from the group consisting of amine and ammonia is primary amine (hereinafter "amine (A)") represented by the following formula $R^1CH_2NH_2$ where $R^1$ is an aryl group, or is a normal alkyl group that contains five or more carbon atoms, a crystal of ammonium carboxylate is obtained. By polymerizing the crystal of ammonium carboxylate in a solid state, it is possible to produce a layered crystal.

The amine (A) may be a liquid, a solid substance, or a gaseous substance, and is not particularly limited. Examples of the amine (A) are octylamine, benzylamine, dodecylamine, 1-naphthylmethylamine, n-pentylamine, n-hexylamine, n-heptylamine, decylamine, and the like. Among these, it is preferable that the amine (A) is amine whose molecular structure is suitable for forming a column structure. Specifically, the amine (A) is preferably at least one compound selected from the group consisting of benzylamine, dodecylamine, and 1-naphthylmethylamine. It is particularly preferable that the amine (A) is 1-naphthylmethylamine.

The group represented by $R^1$ is preferably an aryl group, or is a normal alkyl group that contains seven or more carbon atoms. More preferably, the group represented by $R^1$ is an aryl group, or is a normal alkyl group that contains nine or more carbon atoms.

If the carboxyl acid crystal is a crystal of a polymer of carboxyl acid such as sorbic acid, muconic acid, or the like, the carboxyl acid including a conjugated diene part (conjugated diene carboxyl acid; conjugated diene having at least one carboxyl group), it is possible to obtain a crystal (a crystal of a polymer of ammonium carboxylate) in which at least one nitrogen-containing compound selected from the group consisting of amine and ammonia is intercalated as a guest species (a guest compound) between layers of the layered crystal, which is a host species, of the polymer of the conjugated diene including a carboxyl group.

There is no particular limitation as to the nitrogen-containing group mixed with the layered crystal of the polymer of the conjugated diene including a carboxyl group. Specific examples of the nitrogen-containing group are (i) primary amine; (ii) secondary amine such as N-methylbenzylamine and the like; (iii) tertiary amine such as N,N-dimethyldodecylamine, tridodecylamine, N,N-dimethylbenzylamine and the like; (iv) and the like. Among these, primary amine represented by the following formula is preferable:

$R^2NH_2$ where $R^2$ is a hydrocarbon group (that contains one or more carbon atoms) that may include a functional group.

Here, the term "functional group" refers to a group other than a hydrocarbon group.

If the carboxyl acid crystal is a crystal of a polymer of carboxyl acid such as sorbic acid, muconic acid, or the like, the carboxyl acid including a conjugated diene part (conjugated diene including a carboxyl group), and the at least one nitrogen-containing compound selected from the group consisting of amine and ammonia is primary amine (hereinafter "amine (B)") represented by the following formula $R^2NH_2$ where $R^2$ is a hydrocarbon group (that contains one or more carbon atoms) that may include a functional group, it is possible to obtain a layered crystal of a polymer of ammonium carboxylate.

Other than the primary amine represented by the formula $R^1CH_2NH_2$ where $R^1$ is an aryl group, or is a normal alkyl group that contains five or more carbon atoms, the amine (B) may be (i) normal alkyl primary amine that contains less than five carbon atoms, such as methylamine, ethylamine, n-propylamine, n-butylamine, and the like; (ii) primary amine having a branch, such as isobutylamine, sec-butylamine, tert-butylamine, and the like; (iii) primary amine having a ring-shaped structure, such as cyclohexylamine and the like; (iv) diamine such as hexamethylenediamine and the like; and (v) primary amine such as ethanolamine, amino acid, and the like, the primary amine including a functional group.

It is preferable that the carboxyl acid and the amine are used at a theoretical amount ratio, i.e. a ratio at which the number of carboxyl group of the carboxyl acid and the number of amino group of the amine are equal.

It is preferable that the carboxyl acid crystal and the amine, which is a solid substance or a liquid at a normal temperature, are mixed by trituration in a triturator. There is no limitation as to a mixing time. For example, if the carboxyl acid crystal and the amine are mixed by trituration in a triturator, about 30 minutes is sufficient.

Described next is how to obtain, by a method of the present invention, a layered crystal of ammonium polycarboxylate from the primary amine and the conjugated diene including a carboxyl group, the layered crystal of ammonium polycarboxylate being such that various kinds of primary amine are intercalated between layers. Described here as an example is a case in which the conjugated diene including a carboxyl group is (Z,Z)-muconic acid.

In a first step, the amine (A) and a crystal of (Z,Z)-muconic acid, which is the conjugated diene including a carboxyl group, are mixed in an absence of a liquid medium. As a result, a crystal of (Z,Z)-muconic ammonium that is conjugated diene including an ammonium carboxylate group is produced, as shown by the following formula:

Chemical Formula 1

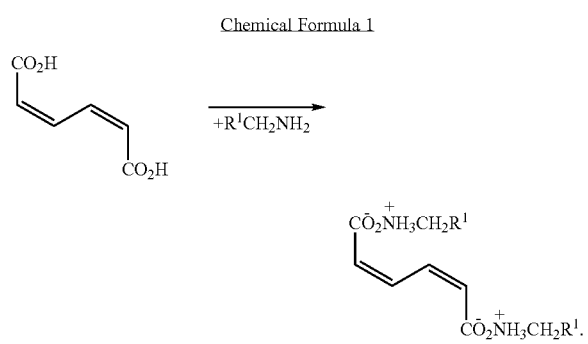

As shown in FIG. 1(a), the crystal of (Z,Z)-muconic ammonium has a column structure in which (Z,Z)-muconic ammonium molecules 1 are stacked. That is, the crystal of (Z,Z)-muconic ammonium is made by ionic bonds between (Z,Z)-muconic anion molecules 3 and secondary ammonium ion ($R^1CH_2NH_3^+$) molecules 2. The ionic bonds are established in such a manner that the (Z,Z)-muconic anion molecules 3 and secondary ammonium ion molecules 2 are aligned in a layered shape. In the crystal of (Z,Z)-muconic ammonium, there are a plurality of planes (layers) that are parallel to each other. On each plane, there are centers of a plurality of (Z,Z)-muconic anion molecules 3, the centers forming a conjugated π plane. The (Z,Z)-muconic anion molecules 3 and the secondary ammonium ion molecules 2 are aligned in a direction perpendicular to the planes.

It is preferable that a size of the crystal of (Z,Z)-muconic acid is small, so that the crystal of (Z,Z)-muconic acid contacts the amine (A) in larger areas, thereby reacting at a high speed. It is therefore preferable that the crystal of (Z,Z)-muconic acid and the primary amine are mixed by trituration in a triturator. There is no limitation as to a mixing time. For example, if the crystal of (Z,Z)-muconic acid and the primary amine are mixed by trituration in a triturator, about 30 minutes is sufficient.

It is preferable that the crystal of (Z,Z)-muconic acid and the primary amine are used at a theoretical amount ratio, i.e. a ratio at which 2 mol of the amine (A) is used with respect to 1 mol of the muconic acid.

Next, in a second step, the crystal of (Z,Z)-muconic ammonium, which is the conjugated diene including an ammonium carboxylate group, is polymerized in a solid state. During polymerization, the crystal of (Z,Z)-muconic ammonium is kept in a crystalline state. As a result, the (Z,Z)-muconic ammonium is polymerized by a radial chain reaction mechanism, and 2,5-polymuconic ammonium is produced, as shown in the following formula:

Chemical Formula 2

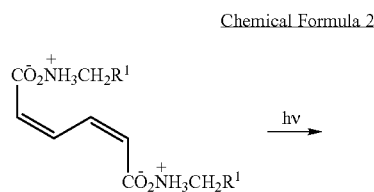

-continued

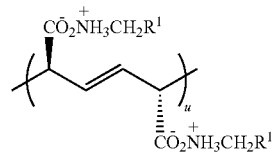

where u is the number of repetitive structure units. Confirmation of u can be performed by GPC (gel permeation chromatography). In general, u is within a range of 10 to 10,000,000, typically within a range of 100 to 100,000.

In the crystal of (Z,Z)-muconic ammonium, the (Z,Z)-muconic anion molecules 3 are aligned in the layered shape, as described above. Therefore, a polymerization reaction of the crystal of (Z,Z)-muconic ammonium is topochemical polymerization, in which a monomer molecule is polymerized with minimum movements of the monomer molecule in the crystal, under a control of the layered arrangement (a crystalline lattice). As a result, a layered crystal of 2,5-polymuconic ammonium is produced. The layered crystal of 2,5-polymuconic ammonium has a large molecular mass and high stereoregularity. The stereoregularity of the layered crystal of 2,5-polymuconic ammonium is high because all centers of three-dimensional structures in the repetitive structure units are controlled. The crystal of the polymer (2,5-polymuconic ammonium) obtained by the solid-state polymerization is as spatially symmetric as the crystal of the monomer ((Z,Z)-muconic ammonium). A center of gravity of the repetitive structure units is substantially identical to that of the monomer.

As shown in FIG. 1(b), in the layered crystal of 2,5-polymuconic ammonium, secondary ammonium ion (counter ammonium cation) molecules 2 are intercalated between a plurality of layers (layers of polycarboxyl acid) made of 2,5-polymuconic anion (carboxylate ion) molecules 4. The secondary ammonium ion molecules 2 are perfectly aligned. A layer interval d1 of the layered crystal of 2,5-polymuconic ammonium varies according to a length of a carbon chain of the amine (A).

In the crystal of the polymer, there is a well-regulated hydrogen bond network identical to a hydrogen bond network formed in the crystalline structure of the monomer. The hydrogen bond network is confirmed by a result of an analysis of the crystalline structure, and can be classified into several patterns (see J. Am. Chem. Soc., 121(48), 11122-11129 (1999)).

As described above, by the topochemical polymerization in which a molecular arrangement is designed by using interaction between molecules so that the diene part is stacked suitably for polymerization, it is possible to synthesize a polymer in which not only stereoregularity, but also a two-dimensional structure is controlled.

When X-rays are radiated, the solid-state polymerization proceeds very rapidly. However, by performing a rapid X-ray crystalline structure analysis using an image plate and a CCD (charge coupled device) camera system, it is possible to analyze a change to the crystalline structure induced by the solid-state polymerization. By performing the rapid X-ray crystalline structure analysis and an NMR (nuclear magnetic resonance) spectrum measure, it is confirmed that the polymer obtained is a stereoregular polymer having a meso-diisotactictrans-2,5-structure.

The solid-state polymerization may be performed by a method (hereinafter "the radiation polymerization method") in which radiation is radiated in a solid state onto the crystal of (Z,Z)-muconic ammonium, which is the conjugated diene including an ammonium carboxylate group. Alternatively, the solid-state polymerization may be performed by a method (hereinafter "the thermal polymerization method") in which the crystal of (Z,Z)-muconic ammonium, which is the conjugated diene including an ammonium carboxylate group, is polymerized by heating the crystal of (Z,Z)-muconic ammonium while maintaining the crystalline structure thereof. Alternatively, the radiation polymerization method and the thermal polymerization method may be performed concurrently. In terms of a purity of the crystal obtained, the radiation polymerization method is more advantageous than the thermal polymerization method, especially if X-rays or γ-rays are radiated. On the other hand, the thermal polymerization method is advantageous in that it does not require a large-scale reactor unlike the radiation polymerization method, and it is safer because there is no danger of exposure to radiation, unlike the case in which X-rays or γ-rays are radiated.

Examples of the radiation radiated in the radiation polymerization method are ultraviolet rays, X-rays, γ-rays, and the like. Transmittance of X-rays and γ-rays is high. Therefore, by radiating X-rays or γ-rays, an initiation reaction is induced evenly throughout the crystal. As a result, it is possible to produce a polymer crystal having particularly few distortions and defects.

A heating temperature in the thermal polymerization method is not particularly limited, as long as (Z,Z)-muconic ammonium starts polymerization. However, it is preferable that the heating temperature is lower than a melting point or a decomposition temperature of the (Z,Z)-muconic ammonium. If the heating temperature is lower than the melting point or the decomposition temperature of the (Z,Z)-muconic ammonium, it is possible to perform thermal polymerization while keeping the (Z,Z)-muconic ammonium in the crystalline state. Here, it is preferable that the temperature lower than the melting point of the monomer is lower than a temperature at which (Z,Z)-muconic ammonium starts melting. In addition, it is preferable that the heating temperature lower than the decomposition temperature of (Z,Z)-muconic ammonium is lower than the temperature at which (Z,Z)-muconic ammonium starts decomposing. If the heating temperature in the thermal polymerization is not lower than the temperature at which (Z,Z)-muconic ammonium starts decomposing, it is preferable that the heating temperature is such that a polymerization speed of the (Z,Z)-muconic ammonium is high, and there is a large difference between the polymerization speed and a decomposition speed.

Then, in a third step, the crystal of 2,5-polymuconic ammonium, which is the conjugated diene having an ammonium carvoxylate group, is thermally decomposed by heating. As a result, as shown by the following formula Chemical Formula 3

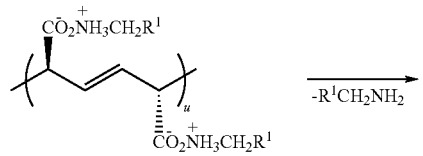

-R¹CH₂NH₂ →

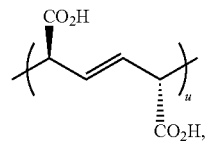

ammonium ions are separated as amine, and the crystal of 2,5-polymuconic ammonium is converted into a layered crystal of 2,5-polymuconic acid, which is a layered crystal of the conjugated diene including a carboxyl group.

For example, one way to convert the crystal of 2,5-polymuconic ammonium into the layered crystal of 2,5-polymuconic acid is hydrolyzing the crystal of 2,5-polymuconic ammonium by using acid such as hydrochloric acid. However, the thermal decomposition method is preferable in that no liquid medium is used. An example of hydrolyzing methods using acid is a method in which the crystal of 2,5-polymuconic ammonium is soaked in a methanol solution (including water) of hydrochloric acid or an aqueous solution of hydrochloric acid.

The layered crystal of 2,5-polymuconic acid obtained by the foregoing conversion includes a large number of polymer sheets 4', as shown in FIG. 1(c), and functions as an organic intercalation compound capable of taking ammonium ions in and out reversibly. Thus, the layered crystal of 2,5-polymuconic acid is useful as a host compound (an organic intercalation compound) for organic intercalation, in which various kinds of amine can be introduced as a guest. Generally-used intercalate materials (materials used for intercalation) are inorganic materials typified by graphite, metal oxide, clay mineral, and the like. However, in the present invention, the layered crystal of 2,5-polymuconic acid is not such generally-used intercalate materials, but is an intercalate material including only organic substances.

Finally, in a fourth step, the layered crystal of 2,5-polymuconic acid is mixed with the amine (B) under an absence of a liquid medium. As a result, as shown by the following formula Chemical Formula 4

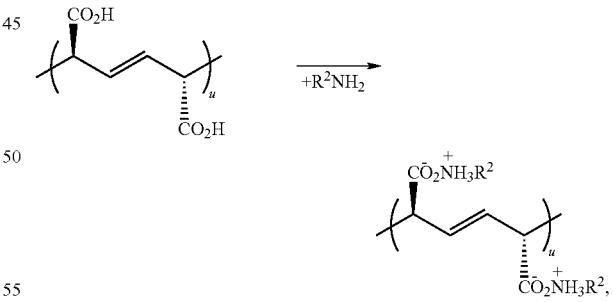

a crystal of 2,5-polymuconic ammonium, which is a crystal (a layered crystal in which ammonium ions are intercalated between layers) of the polymer of the conjugated diene including an ammonium carboxylate group, is produced again.

As shown in FIG. 1(d), the crystal of 2,5-polymuconic ammonium has a layered crystalline structure in which amine (B) molecules 5' are intercalated as secondary ammonium ion molecules 5 between a plurality of layers made of 2,5-polymuconic anion (carboxylate ion) molecules 4.

In order to improve a yield, it is preferable that the crystal of 2,5-polymuconic ammonium and the amine (B) are used at such a ratio that not less than 2 mol of the amine (B) is used with respect to 1 mol of the carboxyl group of the 2,5-polymuconic ammonium. It is most preferable that the crystal of 2,5-polymuconic ammonium and the amine (B) are used at a theoretical amount ratio, that is, such a ratio that 2 mol of the amine (B) is used with respect to 1 mol of the carboxyl group of the 2,5-polymuconic ammonium.

A layer interval d2 of the layered crystal of 2,5-polymuconic ammonium varies according to a length of a carbon chain of the amine (B). Therefore, if the carbon chain of the amine (B) is shorter than the carbon chain of the amine (A), the layer interval d2 of the layered crystal obtained in the fourth step is shorter than the layer interval d1 of the layered crystal obtained in the second step, as shown in FIG. 1(d).

Figure 2:
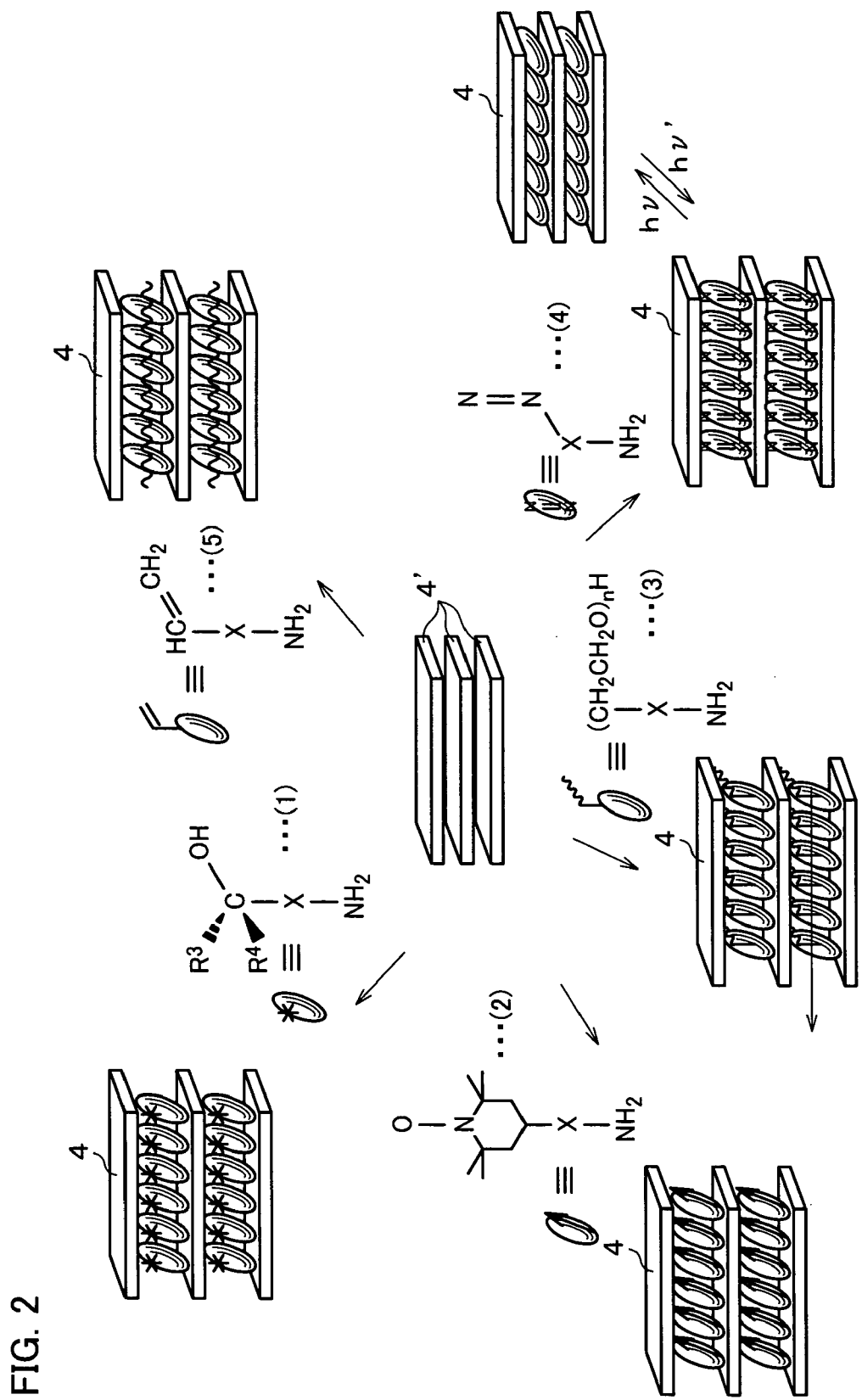
FIG. 2 is a schematic diagram illustrating an application of a layered crystal of a polymer of the ammonium carboxylate obtained by a manufacturing method of the present invention.

According to the intercalation in the fourth step, it is possible to use, as the amine (B), such amine that includes a functional group expressing a specific function, and to introduce the functional group expressing a specific function into the crystal of 2,5-polymuconic acid (the polymer sheets 4' in FIG. 2). The crystal in which the amine including the functional group expressing a specific function is introduced in the layered crystal of 2,5-polymuconic acid can be used as a functional polymer crystal in various ways, such as a material for optical division, a material for molecule recognition, an organo-magnetic body, an ion-conducting material, a photoresponsive material, a stimuli-sensitive material, a photoreactive material, and the like.

Specifically, by using, as the amine (B), such amine that includes chiral carbon, it is possible to obtain a functional polymer crystal in which the amine including chiral carbon is intercalated between layers of the layered crystal of 2,5-polymuconic acid. For example, by using, as the amine (B), such amine that includes a hydroxyl group bonded with chiral carbon and that is represented by formula (1) (where $R^3$ and $R^4$ are hydrocarbon groups that are different from each other, and X is a hydrocarbon bivalent group) as shown in FIG. 2, it is possible to obtain a functional polymer crystal in which the amine is intercalated between layers of the layered crystal (the 2,5-polymuconic anion molecules 4 in FIG. 2). This functional polymer crystal can be used for optical division, molecule recognition, and the like. In the optical division, one of (R)-alcohol and (S)-alcohol is extracted from a mixture of (R)-alcohol and (S)-alcohol.

By using, as the amine (B), such amine that has a high magnetic moment, e.g. such amine that includes an amineoxide part, and that is represented by formula (2) (where X is a hydrocarbon bivalent group) as shown in FIG. 2, it is possible to obtain a functional polymer crystal in which the amine is intercalated between layers of the layered crystal of 2,5-polymuconic acid. This functional polymer material can be used as an organo-magnetic body.

By using, as the amine (B), such amine that includes a polyoxyalkylene chain such as a polyoxyethylene chain or the like, that is, by using e.g. primary amine that includes a polyoxyethylene chain and that is represented by formula (3) (where X is a hydrocarbon bivalent group, and n is an integer not less than 2) as shown in FIG. 2, it is possible to obtain a functional polymer crystal in which the amine is intercalated between layers of the layered crystal of 2,5-polymuconic acid. This functional polymer material can be used as a conducting material and an ion-conducting material that transmits ions such as Li ions and the like.

By using, as the amine (B), such amine that includes a nitrogen-nitrogen double bond, e.g. such amine that includes an azo group and that is represented by formula (4) (where X is a hydrocarbon bivalent group) as shown in FIG. 2, it is possible to obtain a functional polymer crystal in which the amine is intercalated between layers of the layered crystal of 2,5-polymuconic acid. As shown in FIG. 2, light energy changes an alignment of the amine (ammonium ions) intercalated, thereby changing a layer interval. Therefore, this functional polymer crystal can be used as a photoresponsive material and a stimuli-sensitive material. That is, by using, as the amine (B), such amine that includes a nitrogen-nitrogen double bond, it is possible to obtain a photofunctional polymer crystal that can be used as a photoresponsive material and a stimuli-sensitive material. The photofunctional polymer crystal is described later in detail.

By using, as the amine (B), such amine that includes carbon-carbon unsaturated bond, e.g. such amine that includes a vinyl group and that is represented by formula (5) (where X is a hydrocarbon bivalent group) as shown in FIG. 2, it is possible to obtain a photofunctional polymer crystal in which the amine is intercalated between layers of the layered crystal of 2,5-polymuconic acid. This photofunctional polymer crystal can be used as a photoresponsive material such as a built-up type diacetylen polymer, which is described later, and as a material that provides a distinct reaction field.

According to the foregoing arrangements, whereas no liquid medium is used in any step, i.e. the step of synthesizing the monomer ((Z,Z)-muconic ammonium), the step of polymerizing the monomer, the step of converting the 2,5-polymuconic ammonium into the 2,5-polymuconic acid, and the step of intercalating ammonium ions into the 2,5-polymuconic acid, it is possible to obtain a layered crystal of 2,5-polymuconic acid in which arbitrary amine (B) is intercalated between layers.

In the foregoing explanation, (Z,Z)-muconic acid is used as the conjugated diene including a carboxyl group. However, instead of (Z,Z)-muconic acid, (i) other $\alpha,\beta$-unsaturated dibasic carboxyl acid such as (E,E)-muconic acid, (E,Z)-muconic acid, and the like, or (ii) $\alpha,\beta$-unsaturated monobasic carboxyl acid such as sorbic acid and the like, (iii) and the like may be used.

If (E,E)-muconic acid is used instead of the (Z,Z)-muconic acid, a polymer obtained in the second step has a structure identical to the structure of the polymer obtained by using the (Z,Z)-muconic acid. This is because the monomer directed in the same direction in the first step is stacked in a column-like shape. This is confirmed by using a crystalline structure model.

If (E,E)-muconic acid or sorbic acid is used, instead of the (Z,Z)-muconic acid, as the conjugated diene including a carboxyl group, it is preferable to use 1-naphthylmethylamine as the amine (A).

Next, the functional polymer crystal, that is, the photoresponsive polymer of the present invention, is described in detail.

A photoresponsive polymer of the present invention is obtained by a method of manufacturing a crystal of ammonium carboxylate, the method including the step of mixing, in an absence of a liquid medium, (i) the layered crystal of the polymer of the conjugated diene including a carboxyl group and (ii) at least one nitrogen-containing compound selected from the group consisting of amine and ammonia, the nitrogen-containing compound, which is mixed with the layered crystal of the polymer of the conjugated diene including a carboxyl group, being amine that is a bivalent group and that is represented by the following general formula $$—Ar—N=N—Ar'— \qquad (6),$$

where Ar and Ar' are independently aromatic hydrocarbon bivalent groups. With this method, it is possible to obtain, as the crystal of ammonium carboxylate, a photoresponsive polymer of the present invention in which the amine including the photoresponsive group is intercalated as a guest compound in the layered crystal (the layered crystalline polymer) of the polymer of the conjugated diene including a carboxyl group.

The photoresponsive polymer of the present invention is a photoresponsive polymer in which the amine (hereinafter "photoresponsive-group-containing amine") that has the bivalent groups and that is represented by the general formula (6) is intercalated as a guest compound in the layered crystal (the layered crystalline polymer) of the polymer including a carboxyl group.

The layered crystalline polymer including carboxyl acid is not particularly limited, as long as it is a crystalline polymer that has a layered structure and includes carboxyl acid. That is, the layered crystalline polymer including carboxyl acid is not limited to a crystalline polymer that derives from conjugated diene carboxyl acid, but may be a crystalline polymer that (i) is other than a crystalline polymer that derives from conjugated diene carboxyl acid, and (ii) has a layered structure and includes carboxyl acid. However, it is particularly preferable that the layered crystalline polymer including carboxyl acid is a crystalline polymer (a layered crystal of a polymer of conjugated diene including a carboxyl group) that derives from conjugated diene carboxyl acid. Examples of the crystalline polymer that derives from conjugated diene carboxyl acid are a polymuconic acid crystal, a polysorbic acid crystal, a polybutadiene carboxyl acid crystal, and the like. It is more preferable that the crystalline polymer that derives from conjugated diene carboxyl acid is a polymuconic acid crystal or a polysorbic acid crystal.

Preferably, the photoresponsive-group-containing amine is primary amine, because it is easy to induce an intercalation reaction if primary amine is used.

It is preferable that, in the photoresponsive-group-containing amine, at least one unsaturated hydrocarbon bivalent group is inserted as a spacer between (i) the bivalent group shown in the general formula (6), and (ii) an amine group. This is because an intercalation reaction cannot be induced easily if amine having low basicity, such as amine in which an aromatic group is directly bonded with an amine group, is used. With this arrangement, sufficient basicity of the photoresponsive-group-containing amine is attained, and an intercalation reaction can be induced easily.

The aromatic hydrocarbon bivalent groups denoted by Ar and Ar' in the general formula (6) are not particularly limited, but may be two or more benzene rings connected with each other. Specific examples of the aromatic hydrocarbon bivalent groups denoted by Ar and Ar' are phenylene groups such as 1,4-phenylene groups and the like, biphenylene groups, naphthylene groups, and the like. Among these, 1,4-phenylene groups are particularly preferable.

It is particularly preferable that the photoresponsive-group-containing amine is monoamine (hereinafter "photoresponsive-group-containing monoamine") represented by the following general formula Y—Ar—N=N—Ar—X'—R$^5$—NH$_2$, where R$^5$ denotes that there is a hydrocarbon bivalent group at that position, or that there is no substituent at that position; X' denotes that there is a bivalent group including a hetero atom at that position, or that there is no substituent at that position; and Y denotes a hydrogen atom or an arbitrary substituent.

Alternatively, it is particularly preferable that the photoresponsive-group-containing amine is diamine (hereinafter "photoresponsive-group-containing diamine") represented by the following general formula H$_2$N—R$^5$—X'—Ar—N=N—Ar—X'—R$^5$—NH$_2$, where each R$^5$ independently denotes that there is no hydrocarbon bivalent group at that position, or that there is no substituent at that position; and each X' independently denotes that there is a bivalent group including a hetero atom at that position, or that there is no substituent at that position.

An unsaturated hydrocarbon bivalent group denoted by R$^5$ may be an aliphatic hydrocarbon bivalent group typified by a normal aliphatic hydrocarbon bivalent group, or may be an alicyclic hydrocarbon bivalent group typified by a cyclohexylene group. It is preferable that R$^5$ is a bivalent group represented by the following general formula —(CH$_2$)$_m$—, where m is an integer from 0 to 18. In other words, it is preferable that R$^5$ denotes that there is, at that position, a normal alkylene group that contains 0 to 18 carbon atoms, i.e. an aliphatic saturated hydrocarbon bivalent group, or that there is no substituent at that position. More preferably, m is not less than 1 and not more than 12. In other words, it is preferable that there is a normal alkylene group as a spacer group at the position of R$^5$. It is preferable that m, which represents the number of carbons (the number of methylene carbons) of the spacer group, is not more than 12.

It is preferable that the bivalent group denoted by X', the bivalent group including a hetero atom, is a bivalent group that includes the hetero atom in a main chain. Examples of the bivalent group that includes the hetero atom in the main chain are —O—, —S—, —COO—, —OCO—, —CONH—, —NHCO—, —CONHCO—, —NHCONH—, —OCONH—, —NHCOO—, and the like.

There is no particular limitation as to Y. Examples of Y are an hydrogen atom, an alkyl group, an alkoxy group, a cyano group (—CN), and the like. One example of the alkyl group is a normal alkyl group represented by —(CH$_2$)$_m$CH$_3$ (where m, which denotes the number of methylene carbons, is 0 to 18, more preferably not less than 1 and not more than 12). One example of the alkoxy group is a substituent represented by —O(CH$_2$)$_m$CH$_3$ (where m, which denotes the number of methylene carbons, is 0 to 18, more preferably not less than 1 and not more than 12). Moreover, Y may be a substituent represented by —(OCH$_2$CH$_2$)$_m$OCH$_3$ (where m, which denotes the number of methylene carbons, is 0 to 18, more preferably not less than 1 and not more than 12).

The photoresponsive-group-containing amine can be synthesized from a commercially available azo-group-containing compound. For example, 4-(phenylazo)benzylamine, which is a kind of photoresponsive-group-containing monoamine, can be manufactured from commercially available azobenzene-4-carbonylchloride according to the following scheme (a):

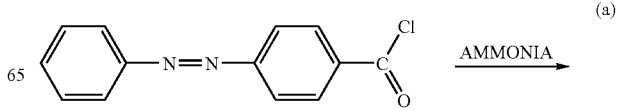

-continued

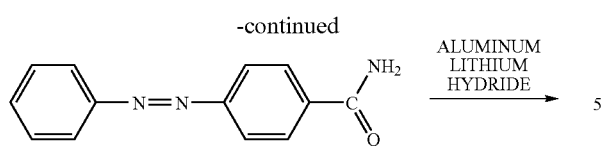

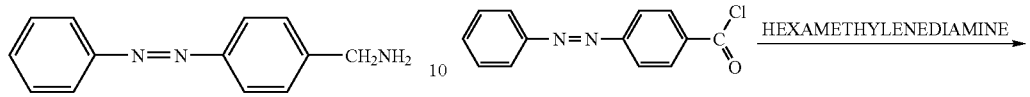

Moreover, 4-(11-aminoundecyloxy)azobenzene (also known as "11-[4-(phenylazo)phenyloxy]undecylamine"), which is a kind of photoresponsive-group-containing monoamine, can be manufactured from commercially available 4-phenylazophenol and commercially available 11-bromoundecanoic acid according to the following scheme (b):

(b)

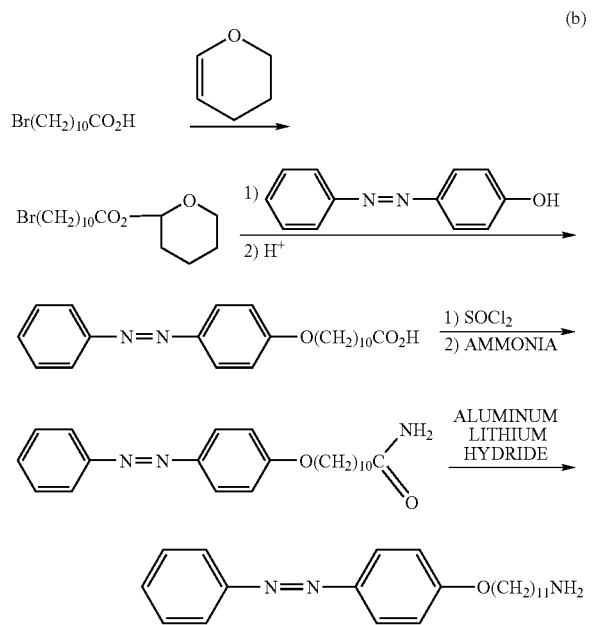

Moreover, as shown by the following scheme (c), N-(6-aminohexyl)azobenzenecarboxyamide, which is a kind of photoresponsive-group-containing monoamine, can be manufactured by reacting commercially available azobenzene-4-carbonylchloride and commercially available hexamethylenediamine. Moreover, N-(aminoalkyl)azobenzenecarboxyamide can be manufactured by the same process from corresponding alkylenediamine.

(c)

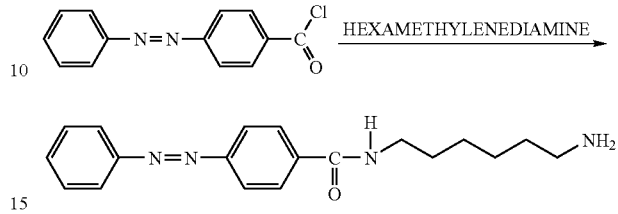

Moreover, as shown by the following scheme (d), 4,4'-di(aminomethyl)azobenzene (also known as "4,4'-azobis(benzylamine)") can be manufactured by reacting commercially available azobenzene-4,4'-dicarbonyldichloride and ammonia, and performing reduction with aluminum lithium hydride.

(d)

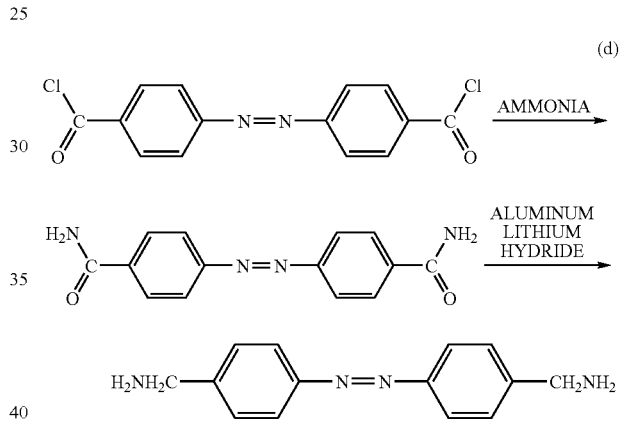

Moreover, as shown by the following scheme (e), N,N'-di(6-aminohexyl)-azobenzene-4-4'-dicarboxyamide (also known as "4,4'-azobis[N-(6-aminohexyl)benzamide]") can be manufactured by reacting commercially available azobenzene-4,4'-dicarbonyldichloride and commercially available hexamethylenediamine. Moreover, 4,4'-azobis[N-(aminoalkyl)benzamide can be manufactured by the same process from corresponding alkylenediamine.

(e)

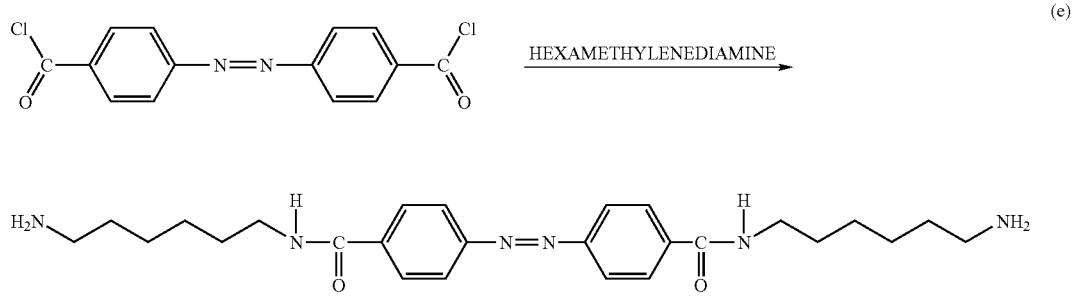

It is preferable that the photoresponsive polymer of the present invention is manufactured by the foregoing method (the method in which photoresponsive-group-containing amine and a layered crystal of a polymer of conjugated diene including a carboxyl group are mixed in an absence of a liquid medium). However, the photoresponsive polymer of the present invention may be manufactured by other methods.

For example, although the intercalation reaction in the foregoing method is induced without using a solvent (in the absence of a liquid medium), the intercalation reaction may be induced by using a solvent as a dispersion agent for dispersing the crystalline polymer (the layered crystal of the polymer of the conjugated diene including a carboxyl group). The solvent used as the dispersion agent may be of any kind, as long as amine dissolves therein and the crystalline polymer does not dissolve or swell therein. Examples of the dispersion agent are organic solvents such as (i) an alcohol such as methanol, isopropanol, and the like, (ii) ketone such as acetone, methylethylketone, and the like, (iii) ether such as tert-butylmethylether and the like, (iv) a halogen-based solvent such as 1,2-dichloroethane and the like, (v) aromatic hydrocarbon such as toluene and the like, (vi) aliphatic hydrocarbon such as hexane and the like, (vii) and the like. Furthermore, water may be used as the dispersion agent.

Moreover, a crystalline polymer whose layered crystalline structure is identical to that of the crystalline polymer obtained by the foregoing method may be obtained as follows: (1) previously performing preparation of ammonium salt of the carboxyl acid including the conjugated diene part, the preparation being performed by reacting photoresponsive-group-containing amine and carboxyl acid (in particular, muconic acid or sorbic acid) including a conjugated diene part, and (2) performing solid-state polymerization of an ammonium carboxylate crystal including the conjugated diene part. However, because solid-state polymerization reactivity (topochemical polymerization reactivity) is determined by a crystalline structure of ammonium salt derivative monomers (the ammonium carboxylate including the conjugated diene part), that is, by a packing pattern of monomer molecules in the crystal, not all the ammonium salt derivative monomers can form the layered structure as a result of the topochemical polymerization. Therefore, the foregoing method, in which the amine including the photoresponsive group is intercalated in the layered crystalline polymer including carboxyl acid, the layered crystalline polymer being prepared previously, is a more reliable method for obtaining the photoresponsive polymer of the present invention.

As described above, a method of the present invention for manufacturing a crystal of ammonium carboxylate includes the steps of: (i) mixing, in an absence of a liquid medium, (a) conjugated diene including an ammonium carboxylate group and (b) primary amine represented by the following formula $R^1CH_2NH_2$ where $R^1$ is an aryl group, or is a normal alkyl group that contains five or more carbon atoms, so as to obtain a crystal of the conjugated diene including the ammonium carboxylate group; (ii) polymerizing, in a solid state, the crystal of the conjugated diene including the ammonium carboxylate group, so as to obtain a layered crystal of a polymer of the conjugated diene including the ammonium carboxylate group, (iii) causing elimination of ammonium ions by heating the layered crystal of the conjugated diene including the ammonium carboxylate group, so as to obtain a layered crystal of a polymer of conjugated diene including a carboxyl group, and (iv) mixing, in an absence of a liquid medium, (c) the layered crystal of the polymer of the conjugated diene including the carboxyl group and (d) primary amine represented by the following formula $R^2NH_2$ where $R^2$ is a hydrocarbon group that may include a functional group.

In the foregoing method, a layered crystal of a polymer of ammonium carboxylate is produced.

According to the foregoing method, reactions in all steps are induced in a crystalline state. Because the reactions in the crystalline state are reactions in a most controlled reaction field, stereospecific reactions proceed. As a result, a single product is obtained.

Moreover, because the foregoing method uses no liquid medium (e.g. a solvent, a dispersion medium, or the like) in any step, separation of a liquid medium and recrystallization are not required.

Therefore, the foregoing method makes it possible to manufacture a layered crystal of a polymer of ammonium carboxylate in a simple manner.

Furthermore, because no liquid medium is used in the foregoing method, a crystal of a polymer does not swell or dissolve in a dispersion medium, unlike in the conventional method using a dispersion medium. Therefore, according to the foregoing method, it is possible to intercalate, between layers of the layered crystal, alkyl primary amine having a branch structure or primary amine including a functional group. This cannot be attained with the conventional method using a dispersion medium. Thus, the foregoing method can be employed for synthesizing a novel layered crystal of a polymer of ammonium carboxylate, the layered crystal being such that primary amine that cannot be synthesized with the conventional method using a dispersion medium, the primary amine being alkyl primary amine having a branch structure or primary amine including a functional group, is intercalated between layers of the layered crystal.

In the second step, the polymerization in the solid state may be performed by radiating radiation onto the crystal of conjugated diene including the ammonium carboxylate group in the solid state, or by performing thermal polymerization of the crystal of conjugated diene including the ammonium carboxylate group while keeping the crystal of conjugated diene including the ammonium carboxylate group in the crystalline state.

Moreover, in the method of the present invention for manufacturing a crystal of ammonium carboxylate, a compound mixed with the layered crystal of the polymer of the conjugated diene including the carboxyl group is amine that is a bivalent group as photoresponsive groups and that is represented by the following general formula —Ar—N=N—Ar'— where Ar and Ar' are independently aromatic hydrocarbon bivalent groups; and the amine is intercalated as a guest compound into the layered crystal.

With this method, it is possible to manufacture, in a simple manner, a crystal of ammonium carboxylate in which the amine including the bivalent group is intercalated as a guest compound in the layered crystal (the layered crystalline polymer) of the polymer of the conjugated diene including the carboxyl group, that is, to manufacture the photoresponsive polymer of the present invention.

[ii] Built-Up Type Diacetylene Polymer and Monomer Thereof, and Method of Manufacturing Them A built-up type diacetylene polymer of the present invention is obtained by polymerizing a crystal of ammonium carboxylate. As described above, the crystal of ammonium carboxylate includes at least one kind of carboxyl acid and at least one kind of amine, at least one kind of compound selected from (i) the at least one kind of carboxyl acid and (ii) the at least one kind of amine being a diacetylen derivative.

The diacetylene derivative is not particularly limited, as long as the diacetylene derivative is carboxyl acid or amine that has two carbon-carbon triple bonds. The carbon-carbon triple bonds may be formed at any position. The diacetylene derivative includes at least one carboxyl group or at least one amino group. The diacetylene derivative may include a substituent other than (i) a carboxyl group and (ii) an amino group. In addition to the carboxyl acid or the amine as the diacetylen derivative, carboxyl acid or amine other than the diacetylen derivative may be included.

The carboxyl acid as the diacetylen derivative is not particularly limited. However, if the diacetylene derivative is the at least one kind of carboxyl acid, it is preferable that the at least one kind of carboxyl acid is represented by the following general formula (7):

$$X^1—(CH_2)_i—C≡C—C≡C—(CH_2)_j—COOH \qquad (7)$$

where $X^1$ is COOH or H, and i and j are respectively integers not less than 0 and not more than 18.

Specific examples of the carboxyl acid as the diacetylen derivative are: 2,4-hexadiynecarboxyl acid, 2,4-heptadiynecarboxyl acid, 2,4-octadiynecarboxyl acid, 2,4-decadiynecarboxyl acid, 2,4-dodecadiynecarboxyl acid, 2,4-tetradecadiynecarboxyl acid, 2,4-pentadecadiynecarboxyl acid, 2,4-hexadecadiynecarboxyl acid, 2,4-octadecadiynecarboxyl acid, 2,4-nonadecadiynecarboxyl acid, 10,12-tetradecadiynecarboxyl acid, 10,12-pentadecadiynecarboxyl acid, 10,12-hexadecadiynecarboxyl acid, 10,12-heptadecadiynecarboxyl acid, 10,12-octadecadiynecarboxyl acid, 10,12-tricosadiynecarboxyl acid, 10,12-pentachosadiynecarboxyl acid, 10,12-hexachosadiynecarboxyl acid, 10,12-heptachosadiynecarboxyl acid, 10,12-octachosadiynecarboxyl acid, 10,12-nonachosadiynecarboxyl acid, and the like. In addition, the dicarboxyl acid as the diacetylen derivative may be dicarboxyl acid such as 2,4-hexadiynedicarboxyl acid, 3,5-octadiynedicarboxyl acid, 4,6-decadiynedicarboxyl acid, 8,10-octadecadiynedicarboxyl acid, and the like.

The amine as the diacetylen derivative is not particularly limited. However, if the diacetylene derivative is the at least one kind of amine, it is preferable that the at least one kind of amine is represented by the following general formula (8):

$$Y^1—(CH_2)_p—C≡C—C≡C—(CH_2)_q—NH_2 \qquad (2)$$

where $Y^1$ is $NH_2$ or H, and p and q are respectively integers not less than 0 and not more than 18.

Specific examples of the amine as the diacetylen derivative are: 2,4-hexadiynylamine, 2,4-heptadiynylamine, 2,4-octadiynylamine, 2,4-decadiynylamine, 2,4-dodecadiynylamine, 2,4-tetradiynylamine, 2,4-pentadecadiynylamine, 2,4-hexadecadiynylamine, 2,4-octadecadiynylamine, 2,4-nonadecadiynylamine, 10,12-tetradecadiynylamine, 10,12-pentadecadiynylamine, 10,12-hexadecadiynylamine, 10,12-heptadecadiynylamine, 10,12-octadecadiynylamine, 10,12-tricosadiynylamine, 10,12-pentacosadiynylamine, 10,12-hexacosadiynylamine, 10,12-heptacosadiynylamine, 10,12-nonacosadiynylamine, and the like. In addition, the amine as the diacetylen derivative may be diamine such as 2,4-hexadiynyldiamine, 3,5-octadiynyldiamine, 4,6-decadiynyldiamine, 8,10-octadecadiynyldiamine, and the like.

If the diacetylene derivative is the at least one kind of carboxyl acid, it is preferable that the at least one kind of amine is represented by the following formula $$R^6—NH_2$$

where $R^6$ is a hydrocarbon group that may include a functional group.

If the diacetylene derivative is the at least one kind of amine, it is preferable that the at least one kind of carboxyl acid is represented by the following formula $$R^7—COOH$$

where $R^7$ is a hydrocarbon group that may include a functional group.

The functional group is a substituent other than a hydrocarbon group. Moreover, $R^6$ and $R^7$ are respectively hydrocarbon groups that may include a hetero atom, a functional group, and/or an unsaturated group, and are not particularly limited. Especially, in order to obtain ammonium carboxylate that has an excellent layered structure, it is preferable that $R^6$ and $R^7$ are selected from (i) a benzyl group including a methyl group, halogen, a methoxy group, or the like, (ii) a chain alkyl group that contains eight or more carbon atoms, (iii) a naphthyl group, and (iv) a naphthylmethyl group.

Specific examples of the amine represented by $R^6—NH_2$ are: benzylamine, methylbenzylamine, chlorobenzylamine, bromobenzylamine, methoxybenzylamine, octylamine, decylamine, dodecylamine, tetradecylamine, hexadecylamine, octadecylamine, naphthylamine, naphthylmethylamine, and the like.

Specific examples of the carboxyl acid represented by $R^7—COOH$ are: benzoic acid, methylbenzoic acid, chlorobenzoic acid, bromobenzoic acid, methoxybenzoic acid, phenylacetic acid, methylphenylacetic acid, chlorophenylacetic acid, bromophenylacetic acid, methoxyphenylacetic acid, octanoic acid, decanoic acid, dodecanoic acid, tetradecanoic acid, hexadecanoic acid, octadecanoic acid, naphthalenecarboxyl acid, naphthylacetic acid, and the like.

The crystal of ammonium carboxylate may be such that at least one kind of compound selected from (i) the at least one kind of carboxyl acid and (ii) the at least one kind of amine is the diacetylene derivative, and at least another kind of compound selected from (i) the at least one kind of carboxyl acid and (ii) the at least one kind of amine is the diene derivative.

The diene derivative is not particularly limited, as long as the diene derivative is carboxyl acid or amine, the carboxyl acid or the amine including two carbon-carbon double bonds. The diene derivative may be a conjugated diene as a monomer, or may be a polymer of the conjugated diene made by polymerizing the conjugated diene. The carboxyl group or the amino group included in the diene derivative may be at least one, and the diene derivative may include a substituent other than a carboxyl group or an amino group. The carboxyl acid and/or the amine may include carboxyl acid and/or amine other than the diacetylene derivative and the diene derivative.

The diacetylene derivative and the diene derivative may be such that one is carboxyl acid and the other is amine. It may be arranged so that both of the diacetylene derivative and the diene derivative are carboxyl acid, or both of the diacetylene derivative and the diene derivative are amine.

For example, the crystal of ammonium carboxylate may be such that the at least one kind of the carboxyl acid is the diene derivative, and the at least one kind of the amine is the diacetylene derivative.

If the diene derivative is the at least one kind of carboxyl acid, it is preferable that the at least one kind of carboxyl acid is represented by the following general formula $$X^2—(CH_2)_{i'}—C=C—C=C—(CH_2)_{j'}—COOH \qquad (9)$$

where $X^2$ is COOH or H, and i' and j' are respectively integers not less than 0 and not more than 18.

Specific examples of the carboxyl acid as the diene derivative are (i) muconic acid, (ii) sorbic acid, (iii) butadiene carboxyl acid, (iv) a polymer (such as polymuconic acid and poly sorbic acid) of these carboxyl acid, the polymer being synthesized previously, (v) and the like. However, the carboxyl acid is not limited to these examples.

On the other hand, it may be arranged so that the diene derivative is the at least one kind of amine, and the diacetylene derivative is the at least one kind of carboxyl acid. If the diene derivative is the at least one kind of amine, it is preferable that the at least one kind of amine is represented by the following general formula

$$Y^2-(CH_2)_{p'}-C=C-C=C-(CH_2)_{q'}-NH_2 \qquad (10)$$

where $Y^2$ is $NH_2$ or H, and p' and q' are respectively integers not less than 0 and not more than 18.

Specific examples of the amine as the diene derivative are 2,4-pentadienylamine, 2,4-hexadienylamine, 2,4-octadienylamine, 2,4-decadienylamine, 2,4-dodecadienylamine, 2,4-tetradecyldienylamine, 2,4-hexadienyl-1,6-diamine, 6,8-dodecadienyl-1,12-diamine, and a polymer of these amine, and the like. However, the amine as the diene derivative is not limited to these examples.

In the crystal of ammonium carboxylate, carboxyl groups of the carboxyl acid and amino groups of the amine are aligned in a bonded state. Therefore, an arrangement of the carboxyl acid and the amine is regulated, so that the crystal of ammonium carboxylate has a crystalline structure in which a layer of carboxyl acid and a layer of ammonium are built-up alternately. By performing solid-state polymerization while maintaining the crystalline structure, it is possible to obtain a built-up type diacetylene polymer of the present invention.

In particular, if the diacetylene is at least one kind of compound selected from (i) the at least one kind of carboxyl acid and (ii) the at least one kind of amine, and the diene derivative is at least another kind of compound selected from (i) the at least one kind of carboxyl acid and (ii) the at least one kind of amine, the crystal of ammonium carboxylate includes the diacetylene derivative and the diene derivative. Therefore, the built-up type diacetylene polymer obtained by polymerizing the crystal of ammonium carboxylate includes a diacetylene polymer and a diene polymer.

The diacetylene polymer obtained by polymerizing the diacetylene derivative is a colored conjugated-system polymer. On the other hand, the diene polymer obtained by polymerizing the diene derivative is a non-conjugated-system polymer, and is a colorless polymer having no absorbance with respect to light in the visible region. Note that the term "colored" means being transparent and colorless, or being white.

It is expected that the absorbing property of the built-up type diacetylene polymer obtained by polymerizing the crystal of ammonium carboxylate varies according to the layer interval and a structure of interfaces between layers, because the built-up type diacetylene polymer is structured so that the conjugated-system diacetylene polymer and the non-conjugated-system diene polymer are built-up alternately. It is also expected that an electric property of the built-up type diacetylene polymer varies in the same manner as the absorbing property varies, because the built-up type diacetylene polymer includes the conjugated-system polymer and the non-conjugated-system polymer. Therefore, it is expected that the built-up type diacetylene polymer is used as a novel functional polymer used in (i) an organic EL, (ii) an organic PL, (iii) a non-linear optical material, (iv) an organic semiconductor, (v) a nano-device, (vi) and the like.

The crystal of ammonium carboxylate may be such that the diacetylene derivative is at least one kind of carboxyl acid, and the diene derivative is at least another kind of carboxyl acid. Alternatively, the crystal of ammonium carboxylate may be such that the diacetylene derivative is at least one kind of amine, and the diene derivative is at least another kind of amine.

If the diacetylene derivative is at least one kind of carboxyl acid, and the diene derivative is at least another kind of carboxyl acid, the crystal of ammonium carboxylate may include the diacetylene derivative represented by the general formula (7), and the diene derivative represented by the general formula (9). If the diacetylene derivative is at least one kind of amine, and the diene derivative is at least another kind of amine, the crystal of ammonium carboxylate may include the diacetylene derivative represented by the general formula (8) and the diene derivative represented by the general formula (10).

In these cases, because the crystal of ammonium carboxylate includes the diacetylene derivative and the diene derivative in the same layer, a copolymerization reaction occurs in the same layer. After the copolymerization reaction, a conjugate length of an obtained copolymer of diacetylene and diene is different from a conjugate length of the diacetylene polymer. Therefore, an absorbing property of the built-up type diacetylene polymer obtained by polymerizing the ammonium carboxylate is different from that of a case in which only the diacetylene derivative is included in the same layer.

Furthermore, the absorbing property of the built-up type diacetylene polymer obtained by polymerizing the ammonium carboxylate varies according to a mixing ratio and an arrangement of the diacetylene derivative and the diene derivative used. Therefore, by appropriately selecting the diacetylene derivative and the diene derivative so that the mixing ratio and the arrangement are changed, it is possible to provide built-up type diacetylene having various absorbing properties.

Figure 3:
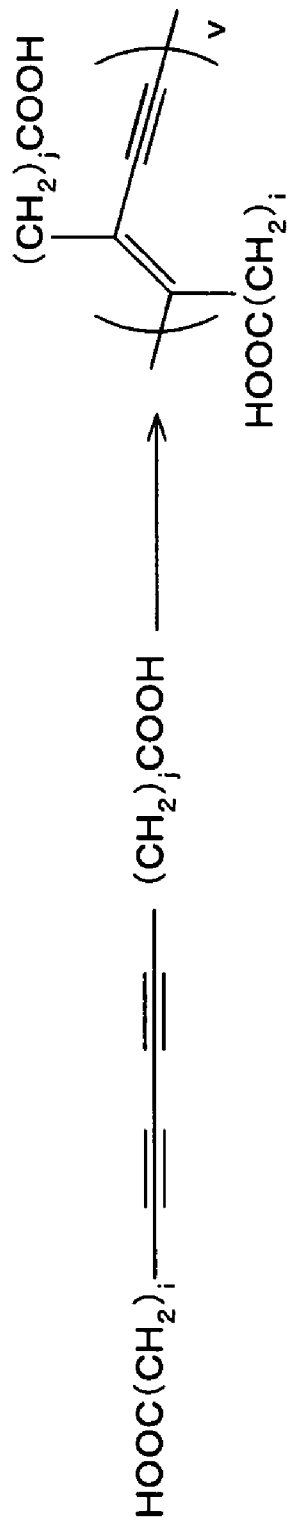
FIG. 3(a) is a chemical formula of a polymerization reaction of carboxyl acid as a diacetylene derivative.
FIG. 3(b) is a chemical formula of a polymerization reaction of amine as a diene derivative.
Figure 3:
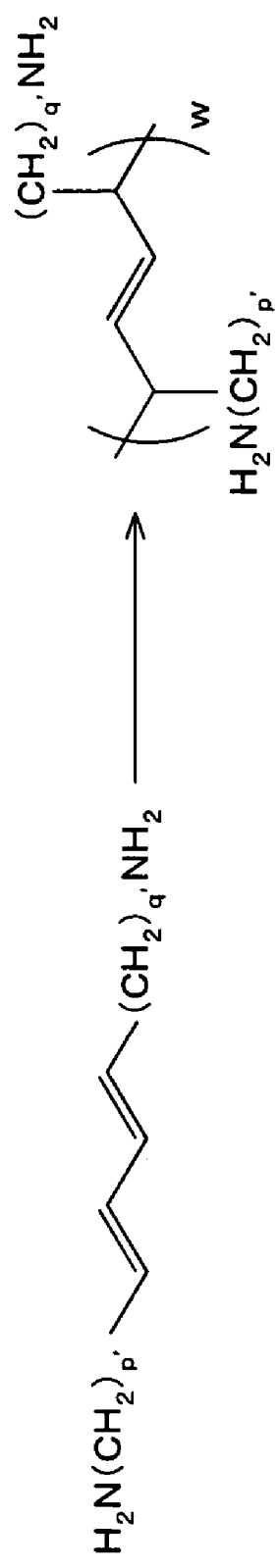
Figure 4:
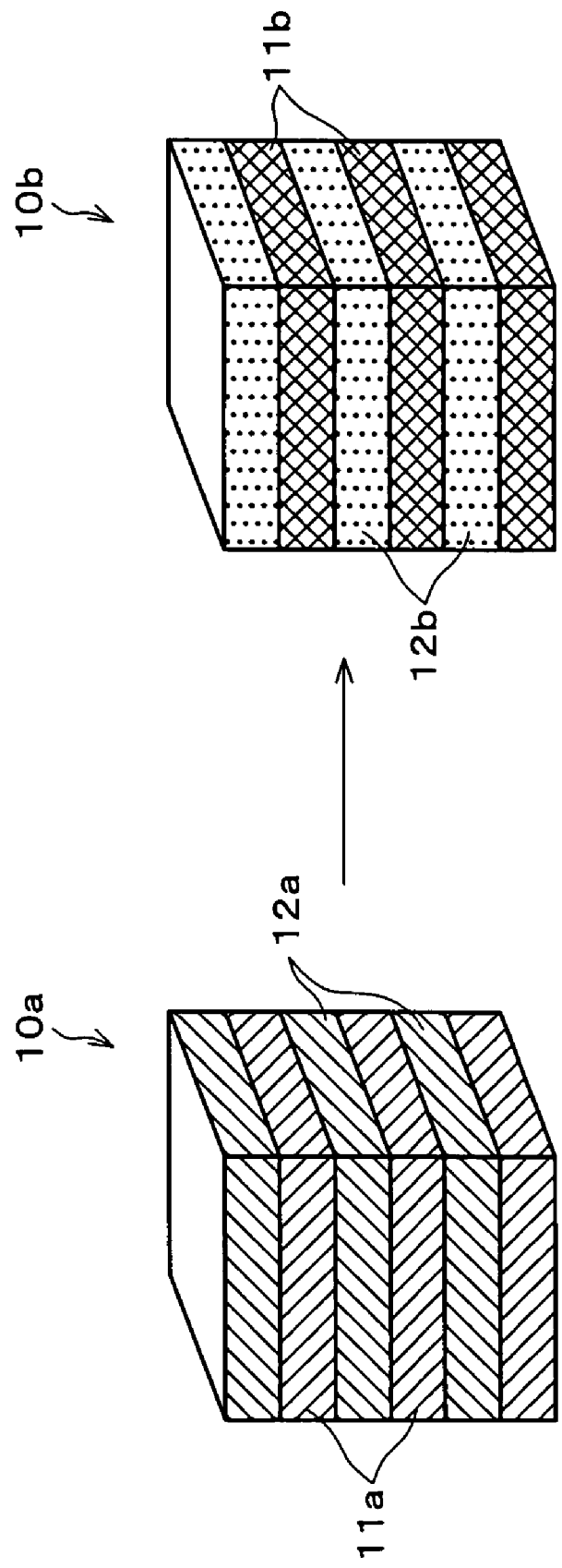
FIG. 4 is a conceptual diagram illustrating a crystal of ammonium carboxylate, and a built-up type diacetylene polymer.

Next, with reference to FIG. 4, the following describes a case in which the crystal of ammonium carboxylate includes, as the carboxyl acid, the diacetylene derivative (FIG. 3(a)) represented by the general formula (7) where $X^1$ is COOH, and, as the amine, the diene derivative (FIG. 3(b)) represented by the general formula (10) where $Y^2$ is $NH_2$. In FIGS. 3(a) and 3(b), v and w are arbitrary integers, respectively.

As shown by FIG. 4, on the left of the arrow, crystalline ammonium carboxylate 10a has a crystalline structure in which a diacetylene carboxyl acid layer 11a and a diene ammonium layer 12a are built-up alternately. By performing solid-state polymerization of the ammonium carboxylate 10a, a built-up type diacetylene polymer 10b is obtained.

The built-up type diacetylene polymer 10b includes a diacetylene polymer layer 11b and a diene polymer layer 12b. The diacetylene polymer layer 11b is formed by polymerizing the diacetylene carboxyl acid layer 11a. The diene polymer layer 12b is formed by polymerizing the diene ammonium layer 12a. The ammonium carboxylate 10a is polymerized while a crystalline structure thereof is maintained. The ammonium carboxylate 10a is thus turned into the built-up type diacetylene polymer 10b. As a result, the diacetylene polymer layer 11b and the diene polymer layer 12b are built-up alternately like the diacetylene polymer layer 11a and the diene ammonium layer 12a.

In the diacetylene carboxyl acid layer 11a and the diene ammonium layer 12a, polymerization is induced as shown in FIGS. 3(a) and 3(b), respectively. The diacetylene carboxyl acid layer 11a and the diene ammonium layer 12a are thus turned into the diacetylene polymer layer 11b and the diene polymer layer 12b, respectively. That is, in the diacetylene carboxyl acid layer 11a, as shown in FIG. 3(a), the carboxyl acid as the diacetylene derivative is polymerized, thereby producing the diacetylene polymer layer 11b. The diacetylene polymer is a conjugated-system polymer including a carbon-carbon double bond and a carbon-carbon triple bond in a repetitive structure thereof. On the other hand, in the diene ammonium layer 2a, as shown in FIG. 3(b), the amine as the diene derivative is polymerized, thereby producing the diene polymer layer 2b. The diene polymer is a non-conjugated-system polymer including a carbon-carbon double bond in a repetitive structure thereof.

As described above, the conjugated-system polymer has absorbance with respect to light in the visible region. Therefore, it is expected that the built-up type diacetylene polymer 10b shown in FIG. 4 has high absorbance with respect to light in the visible region. Moreover, the built-up type diacetylene polymer 10b has the structure in which the diacetylene polymer layer 11b, which includes the conjugated-system polymer, and the diene polymer layer 12b, which includes the non-conjugated-system polymer, are built-up alternately. Therefore, it is expected that an absorption property of the built-up type diacetylene polymer 10b varies according to a thickness of each layer and a structure of an interface between the diacetylene polymer layer 11b and the diene polymer layer 12b. Therefore, because the built-up type diacetylene polymer 10b has various absorbing properties according to the diacetylene carboxyl acid and the dieneamine used, it is expected that the built-up type diacetylene polymer 10b can be used as an organic material for (i) an organic EL, (ii) an organic PL, (iii) a non-linear optical material, (iv) an organic semiconductor, (v) a nano-device, (vi) and the like.

Next, a method of manufacturing the built-up type diacetylene polymer of the present invention is described.

The built-up type diacetylene polymer of the present invention is obtained by performing solid-state polymerization of the crystal of ammonium carboxylate. The solid-state polymerization of the crystal of ammonium carboxylate can be performed easily by radiating light onto the crystal or by heating the crystal.

The light radiated onto the crystal may be visible light, ultraviolet rays, X-rays, γ-rays, or the like. Transmittance of X-rays and γ-rays is high. Therefore, by radiating X-rays or γ-rays, the solid-state polymerization can be performed suitably. This is because, if X-rays or γ-rays are radiated, a reaction is induced evenly throughout the crystal, thereby producing a crystal of the built-up type diacetylene polymer having particularly few distortions and defects. Conditions of radiating the light may be set appropriately in accordance with a wavelength used. However, it is preferable that the light is radiated at a room temperature for one minute to 100 hours, more preferably for 0.5 hour to 20 hours.

On the other hand, if the solid-state polymerization is performed by heating, the crystal as a whole may be heated by using a drier, a hot plate, an aluminum bath, or the like. Alternatively, the crystal as a whole may be heated by using a hot-water bath, an oil bath, a sand bath, or the like, after the crystal is placed in a glass ample or a heat-resistant sealed container. The heating is performed preferably at 40° C. to 200° C., more preferably at 80° C. to 120° C. A heating time may be selected appropriately according to the heating temperature. However, the heating time is preferably 10 minutes to 200 hours, more preferably 0.5 hour to 10 hours.

Thus, by performing the solid-state polymerization (the topochemical polymerization), the built-up type diacetylene polymer is obtained. Therefore, the polymerization occurs in the crystal of ammonium carboxylate, in which the arrangement of the carboxyl acid and the amine is regulated. As a result, it is possible to easily manufacture the built-up type diacetylene polymer that has a layered structure of the layer of carboxyl acid and the layer of ammonium.

Especially, the topochemical polymerization of the diacetylene derivative and the topochemical polymerization of the diene derivative are similar in principle. Therefore, by radiating light onto the ammonium carboxylate including the diacetylene derivative and the diene derivative, or by heating the ammonium carboxylate including the diacetylene derivative and the diene derivative, it is possible to simultaneously induce the topochemical polymerization of the diacetylene derivative and the topochemical polymerization of the diene derivative, so that the built-up type diacetylene polymer can be obtained easily.

Furthermore, because the polymerization reactions are induced by radiating light or by heating the crystal of ammonium carboxylate while keeping the crystal in the crystalline state, there are advantages in that, for example, no additive (such as a reaction solvent, a catalyst, and the like) other than a monomer is required, and no purification by separation of a produced polymer is required.

As described above, the built-up type diacetylene polymer of the present invention can be obtained easily once the crystal of ammonium carboxylate is obtained. In this connection, a method of manufacturing the crystal of ammonium carboxylate is described next.

A method of manufacturing the crystal of ammonium carboxylate is a method in which at least one kind of carboxyl acid and at least one kind of amine are reacted, and at least one kind of compound selected from (i) the at least one kind of carboxyl acid and (ii) the at least one kind of amine is a diacetylene derivative.

The method in which at least one kind of carboxyl acid and at least one kind of amine are reacted may be performed according to a well-known method. Specifically, the carboxyl acid and the amine are mixed in an appropriate solvent, and then subjected to condensation, cooling, or the like, so that a crystal of ammonium carboxylate is separated out. The crystal of ammonium carboxylate may also be obtained without using a solvent, by mixing the carboxyl acid and the amine.

The crystal of ammonium carboxylate may be obtained by intercalation. The intercalation is a phenomenon in which amine or carboxyl acid is inserted between layers of a carboxyl acid crystal or an amine crystal (hereinafter "layered crystal") that is layered in advance.

The intercalation can be induced by dispersing the layered crystal in an appropriate liquid medium, adding amine or carboxyl acid to be inserted into the layered crystal, and then removing the liquid medium. Alternatively, in order to induce the intercalation, (i) the layered crystal and (ii) the amine or the carboxyl acid to be inserted into the layered crystal may be mixed by trituration in a triturator or the like, without using the liquid medium.

Inventors of the present invention found that the intercalation of amine into carboxyl acid as a diene derivative proceeds quantitatively (A. Matsumoto, T. Odani, Micromol. Rapid Commun., 22, pp. 1195-1215 (2001)). Therefore, the intercalation is one effective method for obtaining the crystal of ammonium carboxylate.

If the crystal of ammonium carboxylate is obtained by the intercalation, it is preferable that a layered crystal of carboxyl acid is used, and amine is inserted into the layered crystal. It is preferable that the carboxyl acid as the layered crystal is polymuconic acid made by polymerizing miconic acid, sorbic acid, or the like as a diene derivative. Therefore, it is preferable that the amine is a diacetylene derivative.

Here, a method of obtaining the built-up type diacetylene polymer of the present invention by the intercalation is specifically described, with reference to FIGS. 5(a) and 5(b). Described below is an example of intercalation in which the layered crystal is a diene polymer made by polymerizing carboxyl acid as a diene derivative, such as muconic acid, sorbic acid, or the like, and the amine as a diacetylene derivative is inserted into the layered diene polymer.

As shown in FIG. 5(a), a layered diene polymer crystal 13, which is obtained by polymerizing the carboxyl acid as the diene derivative, has a structure in which diene polymer layers 13b are built-up. The diene polymer in each diene polymer layer includes a carbon-carbon double bond and a carboxyl group, as shown in FIG. 5(b). In the formula, $Z^1$, and $Z^2$, which is described later, are arbitrary substituents, and k is an arbitrary integer.

When the diene polymer crystal 13 and the amine as the diacetylene derivative (hereinafter "DA-NH$_2$") are mixed, a carboxyl group of the diene polymer and an amino group of the DA-NH$_2$ are bonded, as shown in FIG. 5(b). At this time, if $Z^1$ reacts with the amino group of the DA-NH$_2$, $Z^2$ is $Z^1$ and the DA-NH$_2$ bonded together. If $Z^1$ does not react with the amino group of the DA-NH$_2$, $Z^2$ is a substituent identical to $Z^1$. As a result, as shown in FIG. 5(a), crystalline ammonium carboxylate 20a in which diacetylene amine layers 14a including the DA-NH$_2$ are formed between the diene polymer layers 13b is obtained. That is, the ammonium carboxylate 20a has a built-up structure in which the dine polymer layers 13b and the diacetylene amine layers 14a are formed alternately.

Then, by radiating light onto the ammonium carboxylate 20a or by heating the ammonium carboxylate 20a, a polymerization reaction of the diacetylene amine layers 14a is induced, thereby turning the diacetylene amine layers 14a into diacetylene polymer layers 14b. As a result, a built-up type diacetylene polymer 20b is obtained. The built-up type diacetylene polymer 20b is obtained by polymerizing the ammonium carboxylate 20a while the crystalline state thereof is maintained. Therefore, the built-up type diacetylene polymer 20b has the crystalline structure in which the diene polymer layers 13b and the diacetylene amine layers 14a are built-up alternately.

Thus, it is also possible to obtain the crystal of ammonium carboxylate by the intercalation. By performing solid-state polymerization of the crystal, the built-up type diacetylene polymer is obtained.

In order to obtain the crystal of ammonium carboxylate, it is one way to use carboxyl acid and amine at a theoretical amount ratio. In other words, its is one way to set the amounts of the carboxyl acid and the amine so that the number of carboxyl groups in the carboxyl acid and the number of amino groups in the amino acid become equal. In case the theoretical amount ratio of the carboxyl acid and that of the amine are not equal, excess carboxyl acid or excess amine may be removed by cleaning after the crystal of ammonium carboxylate is produced. Alternatively, a mixture of ammonium carboxylate and carboxyl acid, or a mixture of ammonium carboxylate and amine may be used.

In the following, the present invention is described through examples, comparative examples, and referential examples, in order to describe the foregoing embodiments more specifically. First, measurement apparatuses and the like in the following examples, comparative examples, and referential examples are described.

<Measurement of Melting Points, Thermal Decomposition Temperatures, and Spectrums>

Melting points and thermal decomposition temperatures were measured in a nitrogen airflow at a programming rate of 10° C./min., by using a thermogravimetry/differential thermal analysis simultaneous measurement apparatus (TG/DTA6000, a product of Seiko Instruments, Inc.). As a result of measurements, the melting points and the thermal decomposition temperatures were determined.

Ultraviolet-visible absorption spectrums and diffuse reflectance ultraviolet-visible absorption spectrums were measured by measuring diffuse reflectance of solid samples, by using an ultraviolet-visible absorption spectrophotometer (V-550, a product of JASCO Corporation) equipped with an integrating sphere apparatus. Infrared absorption spectrums were measured by a KBr tablet method by using a JASCO Herschel FT-IR-430 (a product of JASCO Corporation). Powder X-ray diffraction spectrums were measured by radiating a monochromatic CuK$_\alpha$ ($\lambda$=1, 54118 Å) by using an RINT-2100 (a product of Rigaku Corporation).

<Radiation of Light and Heating>

In case ultraviolet rays were mainly used for inducing polymerization reactions by radiating light, a high-pressure mercury lamp (SHL-100-2 type lamp, 100 W, with a pyrex filter, a product of Toshiba Corporation) was used. In case γ-rays were radiated, radiation was performed at a dose of 200 kGy. In case X-rays were radiated, radiation was performed by using an RINT-2100 (a product of Rigaku Corporation).

In case heating was performed for inducing polymerization reactions, a thermo aluminum bath (a product of Iwaki Glass Co., Ltd.) was used at 100° C.

Example 1

By employing the manufacturing method of the present invention, a crystal of (Z,Z)-muconic benzylammonium, which can be synthesized by solid-state photopolymerization, was synthesized.

0.9291 g ($6.54 \times 10^{-3}$ mole) of (Z,Z)-muconic acid and 1.4012 g ($1.31 \times 10^{-2}$ mole) of benzylamine, which is a liquid at a normal temperature, were triturated for 30 minutes in a triturator at a normal temperature, so as to react the (Z,Z)-muconic acid and the benzylamine.

In an IR spectrum (an infrared absorption spectrum) of a product of the reaction, an absorption peak of 1710 cm$^{-1}$, which derived from carboxyl groups, was not confirmed, but an absorption peak of 1560 cm$^{-1}$, which derived from carboxylate, was confirmed. In powder X-ray diffraction measurement, as shown in FIG. 6(a), the product of the reaction showed a diffraction pattern identical to a diffraction pattern (FIG. 6(b)) of a crystal of (Z,Z)-muconic benzylammonium produced by a conventional method, in which isolation was performed by recrystallization after reactions in a solvent. From these results, it was found that the crystal of (Z,Z)-muconic benzylammonium was obtained after the reaction occurred quantitatively.

Example 2

First, by using a high-pressure mercury lamp, ultraviolet rays were radiated at 30° C. for eight hours onto the crystal of (Z,Z)-muconic benzylammonium synthesized in Example 1. As a result, solid-state photopolymerization of the (Z,Z)-muconic benzylammonium was induced, and an insoluble product was obtained in the solvent. After radiation of the ultraviolet rays was terminated, an unreacted monomer ((Z,Z)-muconic benzylammonium) was extracted by using methanol, thereby isolating the product.

Figure 7:
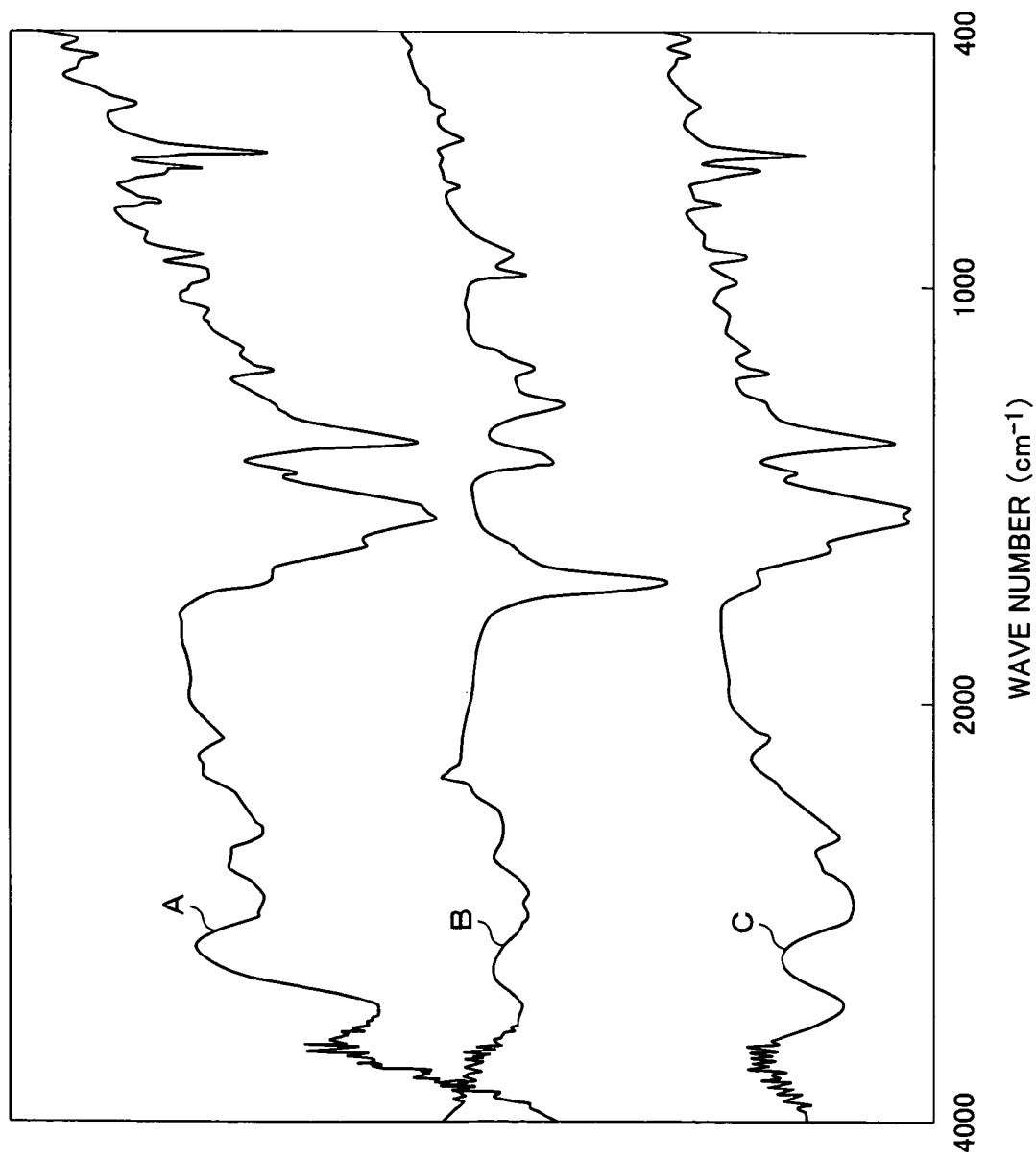
FIG. 7 illustrates IR spectrums of the 2,5-polymuconic benzylammonium and 2,5-polymuconic acid that are obtained in one example of the manufacturing method of the present invention.

From the fact that, as shown by the curve A in FIG. 7, an absorption peak of 1580 cm$^{-1}$, which derived from conjugated diene, disappeared from an IR spectrum of the isolated product, it was confirmed that the (Z,Z)-muconic benzylammonium was polymerized to produce a crystal of 2,5-polymuconic benzylammonium. A yield of the 2,5-polymuconic benzylammonium was 3%. By changing radiation time of the ultraviolet rays from eight hours to 72 hours, the yield of the 2,5-polymuconic benzylammonium was improved to 30%.

Next, the crystal of 2,5-polymuconic benzylammonium was thermally decomposed by heating under a reduced pressure (vacuum) at 250° C. for two hours.

In an IR spectrum of a product of thermal decomposition, as shown by the curve B in FIG. 7, the absorption peak of 1560 cm$^{-1}$, which derived from carboxylate, was not confirmed, but the absorption peak of 1710 cm$^{-1}$, which derived from carboxyl groups, was confirmed. In the powder X-ray diffraction measurement, the product showed a diffraction pattern identical to the diffraction pattern of a crystal of 2,5-polymuconic acid obtained by a conventional method (a method in which (1) (Z,Z)-muconic acid and benzylamine were mixed in a solvent, (2) (Z,Z)-muconic benzylammonium was isolated by recrystallization, (3) Solid-state photopolymerization of the (Z,Z)-muconic benzylammonium was performed, and (4) Hydrolyzation was performed by using hydrochloric acid). From these results, it was found that the crystal of 2,5-polymuconic benzylammonium was turned into a crystal of 2,5-polymuconic acid, and that the 2,5-polymuconic acid had high stereoregularity.

Then, as in Example 1, 0.1036 g (such an amount that two mole corresponded to one mole of repetitive structure unit of the 2,5-polymuconic acid, that is, such an amount that one mole corresponded to one mole of carboxyl groups of the 2,5-polymuconic acid) of benzylamine was added to 0.0687 g of the crystal of 2,5-polymuconic acid, and the benzylamine and the crystal of 2,5-polymuconic acid were triturated in a triturator for 30 minutes, so as to react the benzylamine and the crystal of 2,5-polymuconic acid.

In an IR spectrum of a product of the reaction, as shown by the curve C in FIG. 7, the absorption peak of 1710 cm$^{-1}$, which derived from carboxyl groups, was not confirmed, but the absorption peak of 1560 cm$^{-1}$, which derived from carboxylate, was confirmed. In the powder X-ray diffraction measurement, the product of the reaction showed a diffraction pattern identical to a diffraction pattern of a crystal of 2,5-polymuconic acid in which benzylamine was intercalated between layers, the crystal of 2,5-polymuconic acid being produced by a conventional method. Here, the conventional method was a method in which isolation was performed by recrystallization after intercalation in a dispersion medium.

From these results, it was found that the crystal of 2,5-polymuconic acid in which benzylamine was intercalated between layers, i.e. a crystal of 2,5-polymuconic benzylammonium, was produced after the intercalation proceeded quantitatively.

Example 3

By employing the manufacturing method of the present invention, a crystal of (Z,Z)-muconic dodecylammonium salt, which can be synthesized by solid state photopolymerization, was synthesized.

0.3256 g (2.29×10$^{-3}$ mole) of (Z,Z)-muconic acid and 0.8493 g (4.58×10$^{-3}$ mole) of dodecylamine, which is a solid substance at a normal temperature, were triturated for 30 minutes in a triturator at a normal temperature, so as to react the (Z,Z)-muconic acid and the dodecylamine.

In an IR spectrum of a product of the reaction, the absorption peak of 1710 cm$^{-1}$, which derived from carboxyl groups, was not confirmed, but the absorption peak of 1560 cm$^{-1}$, which derived from carboxylate, was confirmed. In the powder X-ray diffraction measurement, the product of the reaction showed a diffraction pattern identical to a diffraction pattern (FIG. 6(b)) of a crystal of (Z,Z)-muconic dodecylammonium produced by a conventional method, in which isolation was performed by recrystallization after reactions in a solvent. From these results, it was found that a crystal of (Z,Z)-muconic dodecyl ammonium was obtained after the reaction occurred quantitatively.

Example 4

First, by using a high-pressure mercury lamp, ultraviolet rays were radiated at 30° C. for eight hours onto the crystal of (Z,Z)-muconic dodecylammonium synthesized in Example 3. As a result, solid-state photopolymerization of the (Z,Z)-muconic dodecylammonium was induced, and an insoluble product was obtained in the solvent. After radiation of the ultraviolet rays was terminated, an unreacted monomer ((Z, Z)-muconic benzylammonium) was extracted by using methanol, thereby isolating the product.

From the fact that the absorption peak of 1580 cm$^{-1}$, which derived from conjugated diene, disappeared from an IR spectrum of the isolated product, it was confirmed that the (Z,Z)-muconic dodecylammonium was polymerized to produce a crystal of 2,5-polymuconic dodecylammonium. A yield of the 2,5-polymuconic dodecylammonium was 24%. By changing radiation time of the ultraviolet rays from eight hours to 72 hours, the yield of the 2,5-polymuconic dodecylammonium was improved to 81%.

Next, the crystal of 2,5-polymuconic dodecylammonium was thermally decomposed by heating under a reduced pressure at 250° C. for two hours.

In an IR spectrum of a product of thermal decomposition, the absorption peak of 1560 cm$^{-1}$, which derived from carboxylate, was not confirmed, but the absorption peak of 1710 cm$^{-1}$, which derived from carboxyl groups, was confirmed. In the powder X-ray diffraction measurement, the product showed a diffraction pattern identical to the diffraction pattern of a crystal of 2,5-polymuconic acid obtained by a conventional method (a method in which (1) (Z,Z)-muconic acid and dodecylamine were mixed in a solvent, (2) (Z,Z)-muconic dodecylammonium was isolated by recrystallization, (3) Solid-state photopolymerization of the (Z,Z)-muconic dodecylammonium was performed, and (4) Hydrolyzation was performed by using hydrochloric acid). From these results, it was found that the 2,5-polymuconic dodecylammonium was turned into a crystal of 2,5-polymuconic acid, and that the 2,5-polymuconic acid had high stereoregularity.

Then, as in Example 3, 0.2019 g (such an amount that two mole corresponded to one mole of repetitive structure unit of the 2,5-polymuconic acid, that is, such an amount that one mole corresponded to one mole of carboxyl groups of the 2,5-polymuconic acid) of dodecylamine was added to 0.0774 g of the crystal of 2,5-polymuconic acid, and the dodecylamine and the crystal of 2,5-polymuconic acid were triturated in a triturator for 30 minutes, so as to react the dodecylamine and the crystal of 2,5-polymuconic acid.

In an IR spectrum of a product of the reaction, the absorption peak of 1710 cm$^{-1}$, which derived from carboxyl groups, was not confirmed, but the absorption peak of 1560 cm$^{-1}$, which derived from carboxylate, was confirmed. In the powder X-ray diffraction measurement, the product of the reaction showed a diffraction pattern identical to a diffraction pattern of a crystal of 2,5-polymuconic acid in which dodecylamine was intercalated between layers, the crystal of 2,5-polymuconic acid being produced by a conventional method.

Here, the conventional method was a method in which isolation was performed by recrystallization after intercalation in a dispersion medium. According to a result of the powder X-ray diffraction measurement, a layer interval d of a layered crystal (the crystal of 2,5-polymuconic acid) was 4.8 Å before the intercalation, and 32.6 Å after the dodecylamine was intercalated.

From these results, it was found that the crystal of 2,5-polymuconic acid in which dodecylamine was intercalated, i.e. a crystal of 2,5-polymuconic dodecylammonium, was produced after the intercalation proceeded quantitatively.

Example 5

First, a crystal of 2,5-polymuconic acid was obtained as in Example 4.

Then, as in Example 4, to the crystal of 2,5-polymuconic acid, tert-butylamine was added in such an amount that one mole corresponded to one mole of carboxyl groups of the 2,5-polymuconic acid. The mixture was triturated in a triturator for 30 minutes, so as to react the 2,5-polymuconic acid and the tert-butylamine.

In an IR spectrum of a product of the reaction, the absorption peak of 1710 $cm^{-1}$, which derived from carboxyl groups, was not confirmed, but the absorption peak of 1560 $cm^{-1}$, which derived from carboxylate, was confirmed. From the results of the IR spectrum analysis, and the powder X-ray diffraction measurement, it was found that a crystal of 2,5-polymuconic crystal in which the tert-butylamine was intercalated, i.e. a crystal of 2,5-polymuconic tert-butylammonium was obtained after the intercalation proceeded quantitatively.

COMPARATIVE EXAMPLE

First, as in Example 4, a crystal of 2,5-polymuconic acid was obtained.

Then, an attempt was made to intercalate tert-butylamine into the crystal of 2,5-polymuconic acid by a conventional method, i.e. a method in which the crystal of 2,5-polymuconic acid was dispersed in methanol, and tert-butylamine was added to a dispersion liquid.

As a result, because a polymer swelled or dissolved in the methanol during reaction, an intended crystal of ammonium could not be obtained.

As is obvious from Example 5 and Comparative Example above, the method of the present invention made it possible to intercalate tert-butylamine into a crystal of 2,5-polymuconic acid, which was impossible according to the conventional methods.

Example 6

Synthesis of 4-(phenylazo)benzylamine

As described above, 4-(phenylazo)benzylamine was produced from commercially available azobenzene-4-carbonylchloride, according to the scheme (a).

Specifically, a solution made by dissolving 0.197 g of commercially available azobenzene-4-carbonylchloride (a product of Tokyo Kasei Kogyo Co., Ltd.) in 15 mL of dichloromethane was gradually added at a room temperature to 2 mL of 28%-by-weight ammonia water. The mixture was stirred overnight. Then, an insoluble part was isolated by filtering, and was cleaned with water, so as to obtain a solid substance. By recrystallizing the solid substance from acetone, azobenzenecarboxyamide (azobenzenecarboxylic amide) was obtained at an 85% yield. A structure of the azobenzenecarboxyamide was confirmed from a $^1$H-NMR spectrum and a $^{13}$C-NMR spectrum.

NMR spectrum data of the azobenzenecarboxyamide was as follows:

$^1$H-NMR (acetone-$d_6$) δ 8.13-8.15 (m, Ar, 2H), 7.95-7.99 (m, Ar, 4H), 7.58-7.63 (m, Ar, 3H), 6.8 (br, $NH_2$, 2H)

$^{13}$C-NMR (acetone-$d_6$) δ 168.42 (C=O), 155.17, 153.68, 137.77, 132.94, 130.54, 129.87, 124.04, 123.63 (Ar).

The azobenzenecarboxyamide was obtained also by using ammonia gas instead of the ammonia water. Specifically, the intended azobenzenecarboxyamide was obtained at the same yield (85%) by gradually dropping a chloroform solution of azobenzene-4-carbonylchloride while introducing excess ammonia gas into the chloroform.

Next, 0.078 g of the azobenzenecarboxylic amide synthesized, 0.119 g of aluminum lithium hydride, and 5 mL of dry diethylether were poured into a flask, and were put under reflux for 34 hours. The temperature was set back to a room temperature. Then, 10 mL of water was dropped carefully and gradually, so that the water reacted with the excess aluminum lithium hydride. After stirring overnight, extraction was performed tree times by using 100 mL of diethylether, and the ether was removed by pressure-reduction. After that, a remaining supernatant was purified by a silica gel chromatography (developing solvent: methanol). As a result, 0.021 g (yield: 29%) of intended 4-(phenylazo)benzylamine was obtained. A structure of the 4-(phenylazo)benzylamine was confirmed from a $^1$H-NMR spectrum and a $^{13}$C-NMR spectrum.

NMR spectrum data of the 4-(phenylazo)benzylamine was as follows:

$^1$H-NMR (chloroform-d) δ 7.89-7.92 (m, Ar, 4H), 7.26-7.54 (m, Ar, 5H), 3.94 (s, $CH_2$, 2H)

$^{13}$C-NMR (chloroform-d) δ 152.62, 151.58, 146.42, 130.85, 129.06, 127.66, 123.08, 122.75 (Ar), 46.21 ($CH_2$).

[Preparation of Crystal of 2,5-polymuconic acid]

As in Example 4, a crystal of 2,5-polymuconic acid was obtained.

[Intercalation Reaction]

Then, an intercalation reaction of the 4-(phenylazo)benzylamine into the crystal of 2,5-polymuconic acid obtained was induced.

As in Example 4, 79 mg of the 2,5-polymuconic acid (muconic acid unit 0.56 mmol) and 236 mg of the 4-(phenylazo)benzylamine (1.12 mmol; theoretical amount ratio, i.e. [—$NH_2$]/[—$CO_2H$]=2) were triturated for 30 minutes in a triturator, so as to mix the 2,5-polymuconic acid and the 4-(phenylazo)benzylamine by stirring. Then, the unreacted 4-(phenylazo)benzylamine was removed by cleaning with 50 ml of diethylether. As a result, a crystal of 2,5-polymuconic acid in which the 4-(phenylazo)benzylamine was intercalated was obtained at a 48% yield.

Figure 8:
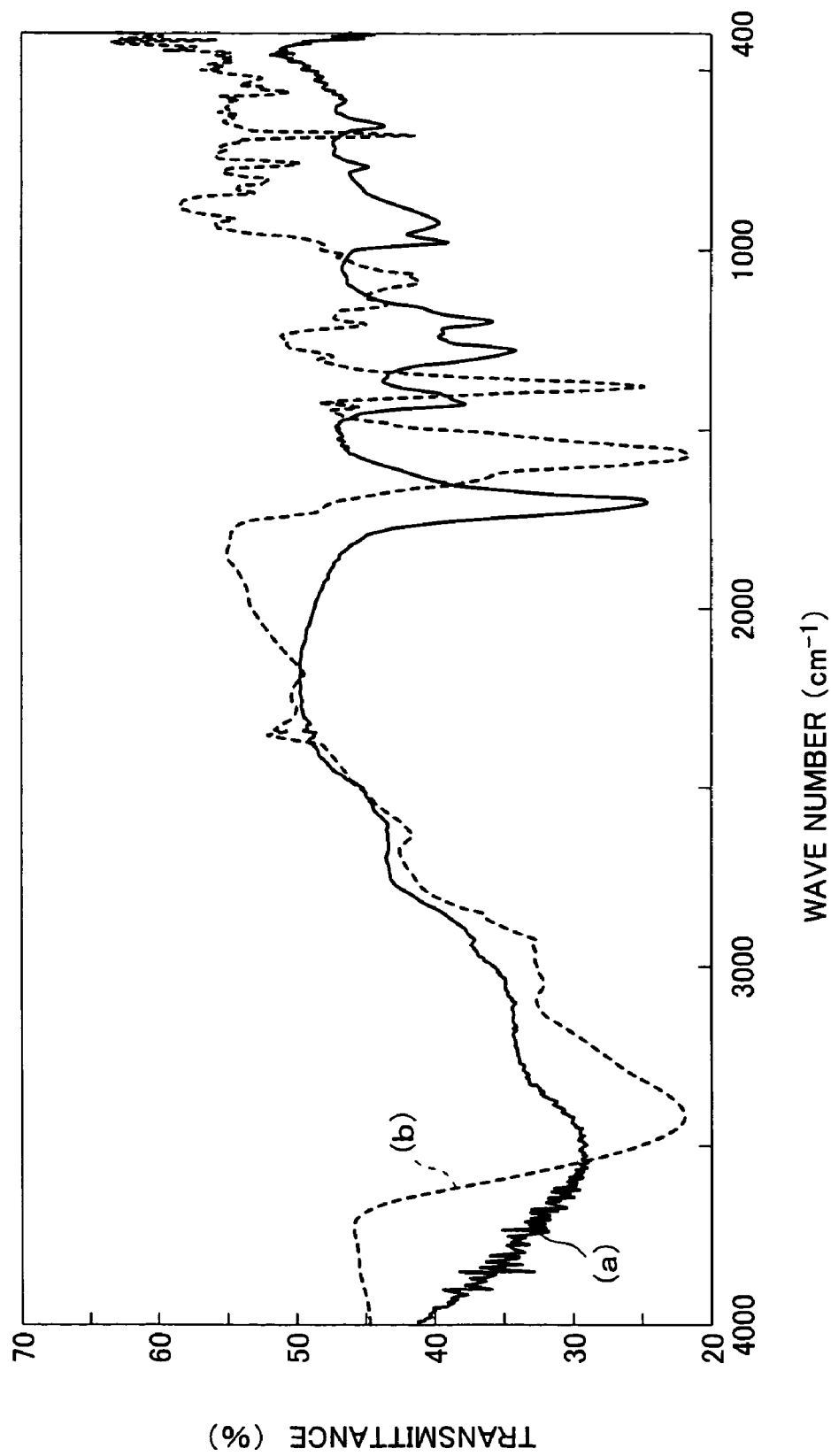
FIG. 8 illustrates IR spectrums of a layered crystal of 2,5-polymuconic acid of one example of the manufacturing method of the present invention, the IR spectrums being different before and after amine including a photoresponsive group was intercalated.

FIG. 8 shows how the IR spectrum (the infrared absorption spectrum) of the crystal of 2,5-polymuconic acid changed as a result of the intercalation. In FIG. 8, the spectrum denoted by (a) is the IR spectrum of the crystal of 2,5-polymuconic acid, and the spectrum denoted by (b) is the spectrum of the crystal of 2,5-polymuconic acid in which the 4-(phenylazo)benzylamine was intercalated.

After the reaction, the absorption at 1710 $cm^{-1}$, which had been by carboxyl groups and found in the spectrum of the 2,5-polymuconic acid before the intercalation, was no longer found. Instead, the absorption at 1560 $cm^{-1}$, which was by carboxylate (ammonium carboxylate), was found. From this result, it was found that the carboxyl groups had turned into the carboxylate due to the intercalation of amine into the crystal of 2,5-polymuconic acid. Thus, it was found that a crystal of 4-(phenylazo)benzylamine, which is a photoresponsive polymer of the present invention, had been produced.

[Change of Ultraviolet-Visible Absorption Spectrum Due to Radiation of Ultraviolet Rays]

Figure 9:
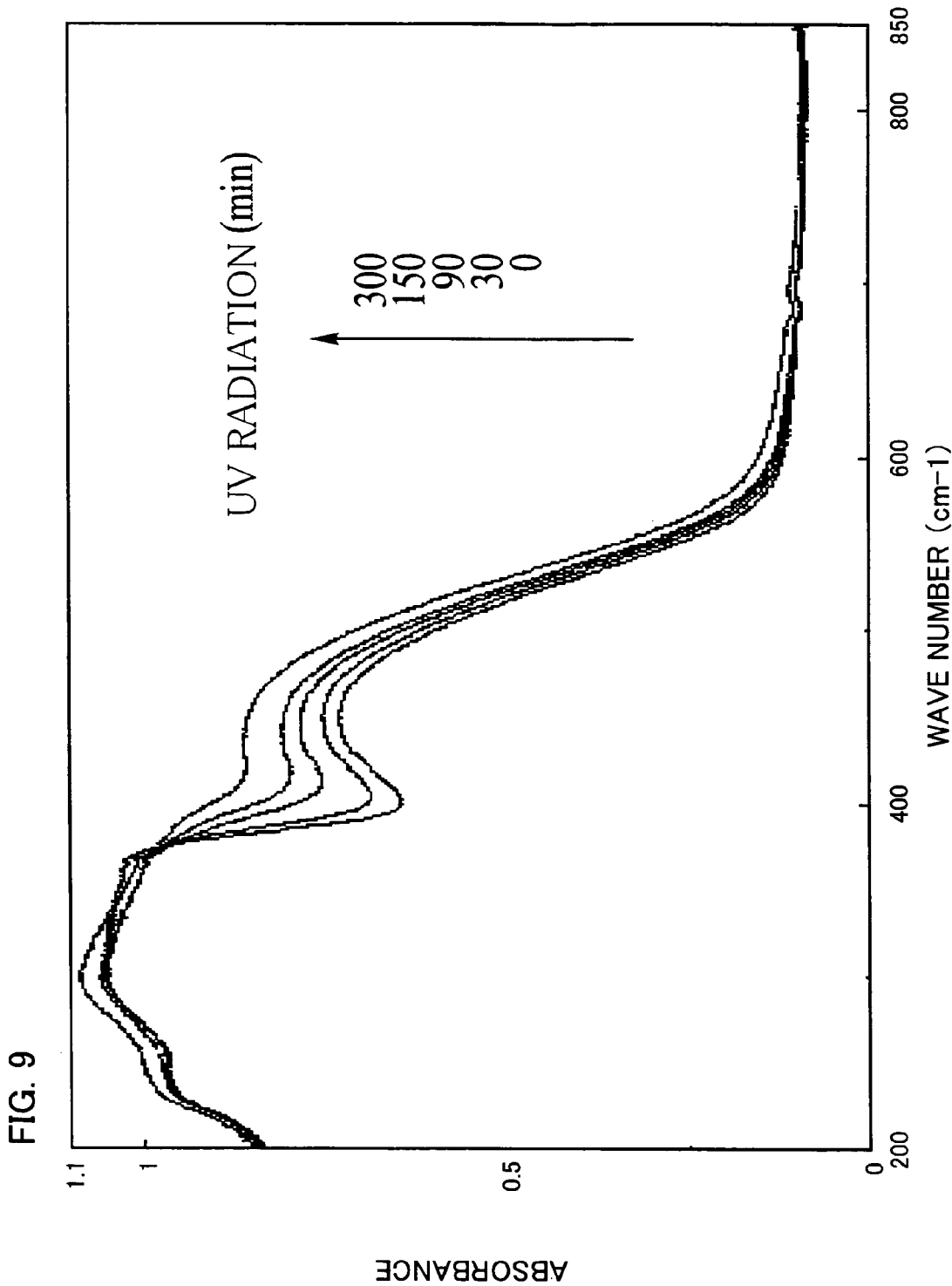
FIG. 9 illustrates how an ultraviolet-visible absorption spectrum changed after ultraviolet rays were radiated onto a photoresponsive polymer of one example of the present invention.

Onto the crystal of 2,5-polymuconic acid in which 4-(phenylazo)benzylamine was intercalated, ultraviolet rays were radiated at a room temperature from a 10 cm-distance by using a high-pressure mercury lamp. Then, changes of an ultraviolet-visible absorption spectrum (an ultraviolet-visible diffuse reflectance spectrum) brought by changing a radiation time from zero minutes to 300 minutes were measured. FIG. 9 shows a result of measurement of the changes of the ultraviolet-visible absorption spectrum. The curves shown in FIG. 9 represent ultraviolet-visible absorption spectrums after radiation times 0 minutes, 30 minutes, 90 minutes, 150 minutes, and 300 minutes, respectively from the lower one.

As a result, as shown in FIG. 9, the longer a radiation time of ultraviolet rays was, the greater an absorption intensity around 450 nm became. The absorption intensity around 450 nm derived from a cis-type azobenzene structure. Thus, it was found that an azobenzen part of the 4-(phenylazo)benzylamine, the azobenzen part having been a trans body before the ultraviolet rays were radiated, was partially transformed into a cis boby due to the radiation of ultraviolet rays.

[Change of Powder X-Ray Diffraction Profile Due to Radiation of Ultraviolet Rays]

Figure 10:
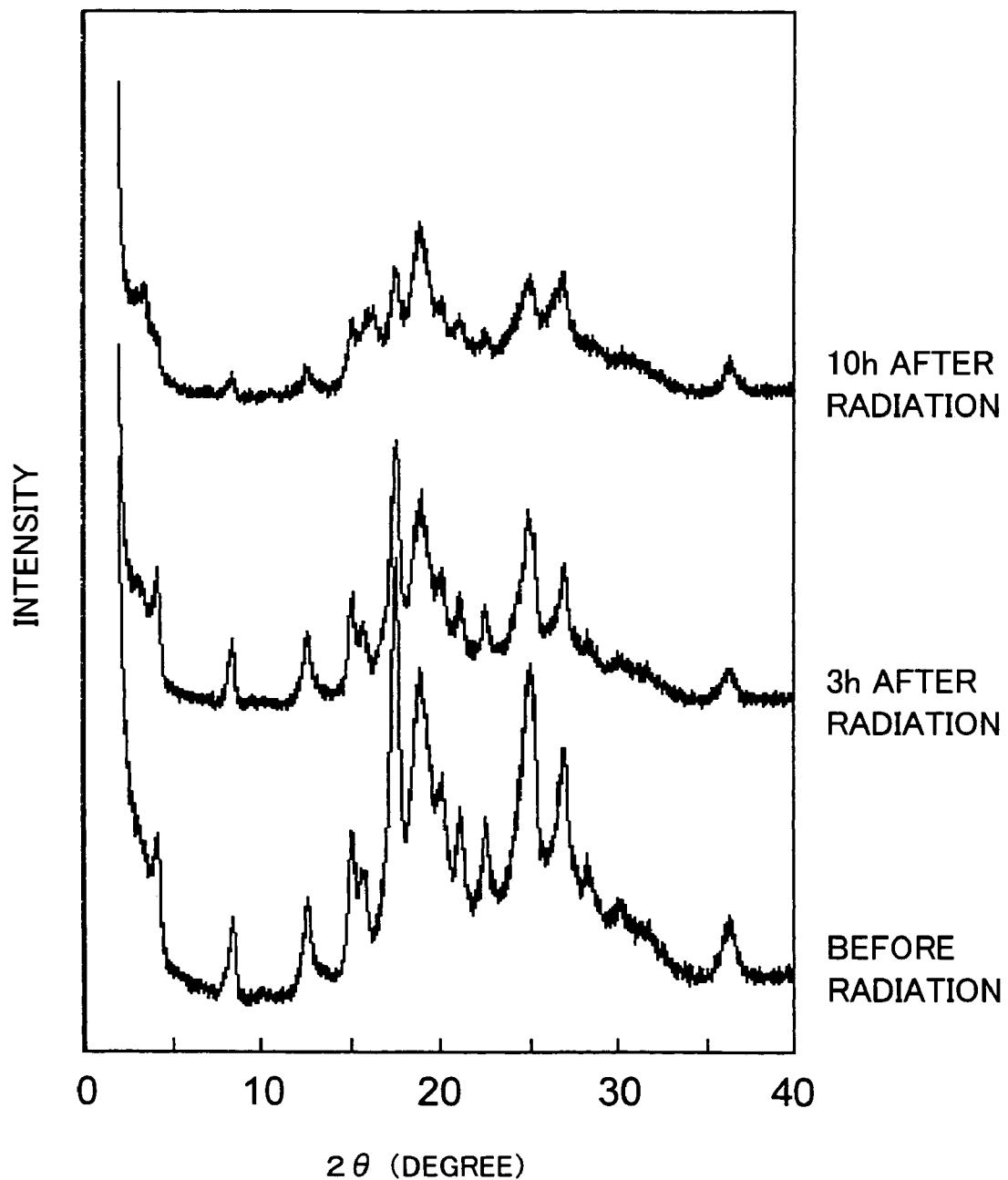
FIG. 10 illustrates how powder X-ray diffraction changed after ultraviolet rays were radiated onto the photoresponsive polymer of one example of the present invention.

Changes of the layered structure of the crystal of 2,5-polymuconic acid brought by radiating ultraviolet rays (for three hours and 10 hours) were evaluated by powder X-ray diffraction. FIG. 10 shows a powder X-ray diffraction profile. Before ultraviolet rays were radiated, a sharp diffraction peak was found around 18°. However, after the ultra violet rays were radiated, intensity of the diffraction peak decreased. Thus, it was found that the layered structure changed. Moreover, the longer the radiation time of ultraviolet rays was, the lower peak intensity around 2θ=3° became, and another peak appeared on a low-angle side instead. Thus, it was found that a repetition cycle (the layer interval d) of the layered structure was changed by radiating ultraviolet rays.

Example 7

Synthesis of 4-(11-aminoundecyloxy)azobenzene

As a synthesis example of another amine including azobenzene, 4-(11-aminoundecyloxy)azobenzene was synthesized according to the scheme (b).

Details of synthesis reactions were as follows.

First, 10.0 g of commercially available 11-bromoundecane (a product of Tokyo Kasei Kogyo Co., Ltd.) and 3.17 g of 3,4-dihydro-2H-pyran (a product of Wako Pure Chemical Industries, Ltd.) were dissolved in 20 mL of dichloromethane. While the solution was cooled with iced water, 0.95 g of p-toluenesulfonicpyridinium was added. The mixture was stirred at 0° C. for 30 minutes, and then at a room temperature for two hours. After the mixture was cleaned with an aqueous solution of sodium hydrogen bicarbonate, and then with water, an organic layer was separated. After dichloromethane was removed from the organic layer by pressure-reduction, 11-bromoundecanoic ester protected by 3,4-dihydro-2H-pyran, i.e. 11-bromoundecanoic 3,4,5,6-tetrahydro-2H-pyranyl ($Br(CH_2)_{10}COOR^0$; $R^0$ was a 3,4,5,6-tetrahydro-2H-pyranyl group) was obtained at a 59% yield. A structure of the 11-bromoundecanoic 3,4,5,6-tetrahydro-2H-pyranyl was confirmed from a $^1$H-NMR spectrum.

$^1$H-NMR spectrum data of the 11-bromoundecanoic 3,4,5,6-tetrahydro-2H-pyranyl was as follows:

$^1$H-NMR (chloroform-d) δ 5.97 (t, CH, 1H), 3.90 (t, $OCH_2$, 1H), 3.70 (t, $OCH_2$, 1H), 3.40 (t, $BrCH_2$, 2H), 2.35 (t, $CH_2CO_2$, 2H), 1.29-1.88 (m, $CH_2$, 24H).

In 25 mL of dry dimethylformamide, 7.03 g of the 11-bromoundecanoic 3,4,5,6-tetrahydro-2H-pyranyl and 2.62 g of commercially available 4-(phenylazo)phenol (a product of Tokyo Kasei Kogyo Co., Ltd.) were dissolved. To the solution obtained, 2.80 g of potassium carbonate and a catalytic amount of potassium iodide were added. The mixture was reacted at 70° C. for two days. After the temperature was set back to a room temperature, extractions were performed three times by using 50 mL of ether, and the ether solution was cleaned with water. After the ether was removed by pressure-reduction, 50 mL of tetrahydrofuran and 5 mL of concentrated hydrochloric acid were added, followed by stirring for 40 minutes at a room temperature. The tetrahydrofuran was then removed by pressure-reduction, and a chloroform soluble component was extracted three times by using 100 mL of chloroform. The extract was cleaned with a saturated saline solution and water, and concentrated to obtain a yellow solid. The solid was purified by recrystallization from a mixed solvent of chloroform and hexane (mixing ratio: chloroform/hexane=2 to 5). As a result, a compound including a decamethyleneoxy group ($—O(CH_2)_{10}—$) as a spacer group between an azobenzene part and a carboxyl group, i.e. 11-[4-(phenylazo)phenyloxy]undecanoic acid (azobenzene-O—$(CH_2)_{10}$—COOH) was obtained at an 82% yield. A structure of the 11-[4-(phenylazo)phenyloxy]undecanoic acid was confirmed from a $^1$H-NMR spectrum and a $^{13}$C-NMR spectrum.

NMR spectrum data of the 11-[4-(phenylazo)phenyloxy]undecanoic acid was as follows:

$^1$H-NMR (chloroform-d) δ 7.85-7.92 (m, Ar, 4H), 7.49-7.51 (m, Ar, 3H), 6.98-7.01 (m, Ar, 2H), 4.03 (t, $OCH_2$), 2.35 (t, $CH_2CO_2$, 2H), 1.31-1.83 (m, $CH_2$, 16H)

$^{13}$C-NMR (chloroform-d) δ 179.10, 161.70, 152.78, 146.84, 130.27, 129.01, 124.73, 122.51, 114.69, 68.34, 64.39, 33.92, 29.44, 29.31, 29.18, 29.01, 28.62, 25.99, 25.00, 24.00.

In 10 mL of 1,2-dichloroethane, 1.494 g of the 11-[4-(phenylazo)phenyloxy]undecanoic acid was dissolved. To the solution obtained, 0.5 mL of thionyl chloride and a drop of N,N-dimethylformamide were added, and the mixture was put under reflux for 3.5 hours, so as to synthesize 11-[4-(phenylazo)phenyloxy]undecanylchloride (azobenzene-O—$(CH_2)_{10}COCl$). In another flask, 10 mL of 1,2-dichloroethane was poured, and ammonia gas was introduced for five minutes, so as to obtain a saturated solution. Into the saturated solution, the reaction solution of 11-[4-(phenylazo)phenyloxy]undecanoic acid and thionyl chloride, i.e. the solution of 11-[4-(phenylazo)phenyloxy]undecanylchloride, was gradually dropped, while cooling the reaction solution to keep it at a room temperature. After the reaction solution was dropped, ammonia gas was introduced for two hours, so as to induce reactions to produce amide. After the reactions, a small amount of water was added to the reaction solution, followed by stirring. Then, an insoluble part was filtered out and dried. As a result, a yellow solid substance of an amide derivative of azobenzene including a spacer group, i.e. 11-[4-(phenylazo)phenyloxy]undecanamide (azobenzene-O—$(CH_2)_{10}$CONH$_2$) was obtained (yield: 74%). A structure of the 11-[4-(phenylazo)phenyloxy]undecanamide was confirmed from a $^1$H-NMR spectrum.

$^1$H-NMR spectrum data of the 11-[4-(phenylazo)phenyloxy]undecanamide was as follows:

$^1$H-NMR (chloroform-d) δ 7.86-7.92 (m, Ar, 4H), 7.43-7.51 (m, Ar, 3H), 6.99-7.01 (m, Ar, 2H), 4.04 (t, OCH$_2$), 2.22 (t, CH$_2$CONH$_2$, 2H), 1.31-1.82 (m, CH$_2$, 16H).

A flask was charged with 1.008 g of the 11-[4-(phenylazo) phenyloxy]undecanamide, 0.624 g of aluminum lithium hydride, and 40 mL of dry diethylether, and the contents were put under reflux for 12 hours. The temperature was set back to a room temperature, and 20 mL of water was gradually dropped, so as to cause the excess aluminum lithium hydride to react with the water. Thereafter, the reaction solution was stirred for one day. Then, extraction from the reaction solution was performed three times by using 200 mL of diethylether, and the diethylether was removed by pressure-reduction. After that, a remaining supernatant was purified by recrystallization from a mixed solvent of chloroform and hexane. As a result, an intended amine derivative of 4-(phenylazo)benzene including a spacer group, i.e. 4-(11-aminoundecyloxy)azobenzene (azobenzene-O—(CH$_2$)$_{11}$NH$_2$) was obtained at a 76% yield. A structure of the 4-(11-aminoundecyloxy)azobenzene was confirmed from a $^1$H-NMR spectrum and a $^{13}$C-NMR spectrum.

NMR spectrum data of the 4-(11-aminoundecyloxy) azobenzene was as follows:

$^1$H-NMR (chloroform-d) δ 7.86-7.91 (m, Ar, 4H), 7.42-7.51 (m, Ar, 3H), 6.99-7.00 (m, Ar, 2H), 4.03 (t, OCH$_2$), 2.73 (t, CH$_2$NH$_2$, 2H), 1.29-1.81 (m, CH$_2$, 18H)

$^{13}$C-NMR (chloroform-d) δ 161.70, 152.78, 146.84, 130.27, 12.01, 124.73, 122.51, 114.68, 68.34, 41.26, 31.86, 29.53, 29.36, 29.18, 26.79, 26.00.

[Preparation of Crystal of 2,5-polymuconic acid]

As in Example 4, a crystal of 2,5-polymuconic acid was obtained.

[Intercalation Reaction]

Then, an intercalation reaction of the 4-(11-aminoundecyloxy)azobenzene into the crystal of 2,5-polymuconic acid obtained was induced.

Specifically, 80 mg of the 2,5-polymuconic acid (muconic acid unit 0.56 mmol) and 545 mg of the 4-(11-aminoundecyloxy)azobenzene (1.12 mmol; theoretical amount ratio, i.e. [—NH$_2$]/[—CO$_2$H]=2) were triturated for 30 minutes in a triturator, so as to mix the 2,5-polymuconic acid and the 4-(1-aminoundecyloxy)azobenzene with stirring. Then, the unreacted 4-(11-aminoundecyloxy)azobenzene was removed by cleaning with 50 ml of diethylether. As a result, a crystal of 2,5-polymuconic acid in which the 4-(11-aminoundecyloxy) azobenzene was intercalated was obtained at a 50% yield.

As in Example 6, from IR spectra of a crystal of 2,5-polymuconic acid before and after the intercalation, it was found that a crystal of 2,5-polymuconic 11-[4-(phenylazo) phenyloxy]undecylammonium, which was a photoresponsive polymer of the present invention, had been produced.

[Photoresponsiveness]

With respect to the 2,5-polymuconic 11-[4-(phenylazo) phenyloxy]undecylammonium obtained, changes of an ultraviolet-visible absorption spectrum, the changes being brought by radiating ultraviolet rays, were observed as in Example 6. A repetition cycle of a layered structure was changed by radiating ultraviolet rays. It was thus confirmed that the 2,5-polymuconic 11-[4-(phenylazo)phenyloxy]undecylammonium had photoresponsiveness.

Example 8

A crystal of ammonium carboxylate including (i) carboxyl acid as a diacetylene derivative and (ii) various kinds of amine, and a built-up type diacetylene polymer made by polymerizing the crystal were obtained.

[Synthesis of Carbonic Acid as Diacetylene Derivative]

First, the carboxyl acid as a diacetylene derivative was synthesized.

10,12-pentacosadiynecarboxyl acid (a product of Fluka) and 10,12-tricosadiynecarboxyl acid (a product of Fluka) shown in Table 1, which appears later, were used after purification by recrystallization from chloroform. 2,4-pentadecadiynecarboxyl acid (a product of Tokyo Kasei Kogyo Co., Ltd.) was used after purification by silica gel column chromatography.

2,4-pentadecadiynecarboxyl acid was synthesized by inducing a Cadiot-Chodkiewicz coupling reaction (L. Brandsma, Preparative Acetylenic Chemistry, 2nd Elsevier (1988), p. 212). The procedure was as follows.

In an atmosphere of dry nitrogen, 2.5 g (0.015 mol) of 1-dodecene (a product of Tokyo Kasei Kogyo Co., Ltd.) and 25 mL of dry THF were mixed in a 100 mL-three-neck flask having a dropping funnel and a cooling tube, and were cooled down to −78° C. in a dry ice-methanol bath. Then, 11 mL (0.017 mol) of a hexane solution of n-butyllithium (a product of Kanto Kagaku; 1.57 mol/L) was added into the flask by using a syringe, and was stirred for two hours in an atmosphere of nitrogen, while the flask was kept at −78° C. Subsequently, a TFT solution (25 mL) of iodine (4.5 g, 0.07 mol) was dropped while keeping the flask at 0° C., followed by stirring for one hour at a room temperature. Then, 50 mL of water was added, and extraction was performed twice by using 50 mL of hexane. After the extract was dried, the hexane was removed by filtering. As a result, 1-iodine-1-dodecin, which was a yellow liquid, was obtained. The 1-iodine-1-dodecin was purified by isolation through silica gel column chromatography (in which hexane was used as a developing solvent), and used for the following reaction.

A 100 mL-three-neck flask was charged with 10 mL of an ethylamine aqueous solution (70%, a product of Wako Pure Chemical Industries, Ltd.), 15 mL of methanol, 5 mL of water, 2 g of hydroxylamine chloride, and 0.2 g of copper chloride (a product of Tokyo Kasei Kogyo Co., Ltd.), and the contents were stirred at a room temperature under an atmosphere of dry nitrogen. Into the flask, 1.05 g (0.015 mol) of a methanol solution (20 mL) of XX (a product of Kanto Kagaku) was dropped for 10 minutes at a room temperature. While the flask was kept at 30° C. in an oil bath, the 1-iodine-1-dodecin was dropped for one hour. Then, the flask was heated to 40° C., and the contents were stirred for two hours. Subsequently, 40 mL of 1 mol/L-hydrochloric acid was added, and extraction was performed twice by using diethylether (50 mL). The extract was dried by using anhydrous magnesium sulphate. Then, the diethylether was removed by filtering. As a result, liquid 2,4-pentadecadiynecarboxyl acid was obtained. The 2,4-pentadecadiynecarboxyl acid was purified by isolation through silica gel column chromatography (in which chloroform/ethanol was used as a developing solvent). A yield was 2.24 g (60%).

With respect to the 2,4-pentadecadiynecarboxyl acid obtained, $^1$H-NMR measurement (400 MHz; CDCl$_3$ was used as a solvent) and $^{13}$C-NMR measurement (100 MHz;

CDCl$_3$ was used as a solvent) were performed. Chemical shifts δ (ppm) of peaks of spectrums obtained were as follows.

As a result of the $^1$H-NMR measurement, the peaks were δ=2.33 (t, J=7.2 Hz, C$\underline{H}_2$C≡C, 2H), 1.51 (m, CH$_3$C$\underline{H}_2$, 2H), 1.27 (br, C$\underline{H}_2$, 14H), 0.88 (t, J=7.2 Hz, C$\underline{H}_3$, 3H), where t, b, and m respectively denote that the peaks of the spectrums were a triple line, a multiple line, or broad; and J is a spin coupling constant. In the parentheses, an H is underlined if the H belonged to the peak of the spectrum, and the number of H is also indicated.

As a result of the $^{13}$C-NMR measurement, δ=157.18 (C=O), 88.42, 73.10, 65.09, 63.39 (C≡CC≡C), 31.62, 29.28, 29.18, 29.05, 28.76, 28.58, 27.46, 22.46, 19.20, 13.82 (CH$_3$(CH$_2$)$_9$).

[Obtaining Crystal of Ammonium Carboxylate]

Equimolar amounts of diacetylene carboxyl acid and amine (a product of Wako Pure Chemical Industries, Ltd. or Aldrich Corporation) shown in Table 1 were mixed in a solvent shown in Table 1, and concentrated. Then, the condensate was recrystallized by cooling. As a result, a white powdery crystal of ammonium carboxylate was obtained.

[Obtaining Built-Up Type Diacetylene Polymer]

Subsequently, a high-pressure mercury lamp was positioned 10 cm away from the white powdery crystal obtained, and ultraviolet rays were radiated for one hour in an air atmosphere, so as to obtain a built-up type diacetylene polymer. A built-up type diacetylene polymer was also obtained by radiating γ-rays for five hours at a room temperature onto the white powdery crystal.

Table 1 shows melting points of the crystals of ammonium carboxylate (in the Table, "MONOMER"), colors of the built-up type diacetylene polymers, yields of the built-up type diacetylene polymers obtained by radiating ultraviolet rays, and yields of the built-up type diacetylene polymers obtained by radiating γ-rays.

TABLE 1

| CARBOXYL ACID | AMINE | MONOMER MELTING POINT (° C.) | COLOR | POLYMER YIELD (%) ULTRA VIOLET RAYS | POLYMER YIELD (%) γ-RAYS |
|---|---|---|---|---|---|
| 10,12-PENTA COSADIYNE CARBOXYL ACID | BENZYLAMINE | 66-67 | PURPLE | 12 | 69 |
| | 2-METHYL BENZYL AMINE | 78-80 | PURPLE | 19 | 59 |
| | 4-METHYL BENZYL AMINE | 84-86 | PURPLE | 17 | 42 |
| | 2-CHLORO BENZYL AMINE | 86-88 | PURPLE | 30 | 63 |
| | 3-CHLORO BENZYL AMINE | 71-72 | PURPLE | 17 | 85 |
| | 4-CHLORO BENZYL AMINE | 84-86 | PURPLISH RED | 6 | 55 |
| | 1-NAPHTHYL METHYL AMINE | 99-101 | PURPLE | 17 | 63 |
| | t-BUTYL AMINE | 42-43 | PURPLISH RED | — | — |
| | CYCLOHEXYL AMINE | 70-71 | PURPLE | — | — |
| | n-OCTYL AMINE | 61-62 | PURPLE | — | 61 |
| | OCTADECYL AMINE | 74-75 | PURPLE | — | 35 |
| 2,4-PENTA DECADIYNE CARBOXYL ACID | BENZYLAMINE | 71-72 | PURPLE | 12 | 42 |
| 10,12-TRI COSADIYNE CARBOXYL ACID | BENZYLAMINE | 71-72 | PURPLE | VERY LITTLE | 66 |
| | 4-METHYL BENZYL AMINE | 76-78 | PURPLE | 20 | — |
| | 1-NAPHTHYL METHYL AMINE | 102-104 | PURPLE | 18 | — |

As shown in Table 1, all the built-up type diacetylene polymers obtained by radiating ultraviolet rays or γ-rays onto the crystals of ammonium carboxylate were colored.

Figure 11:
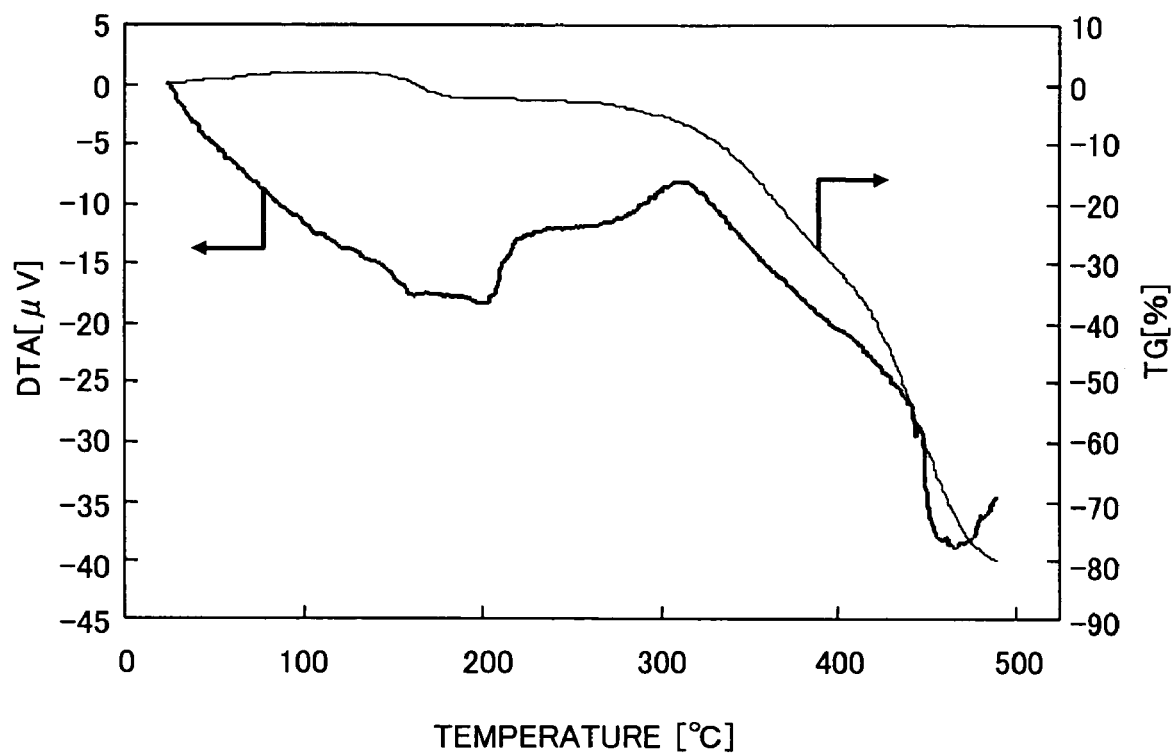
FIG. 11 illustrates thermogravimetry/differential thermal analysis (TG/DTA) spectrums of a built-up type diacetylene polymer obtained from 10,12-pentacosadiynecarboxyl 1-naphthylmethyl ammonium.
Figure 12:
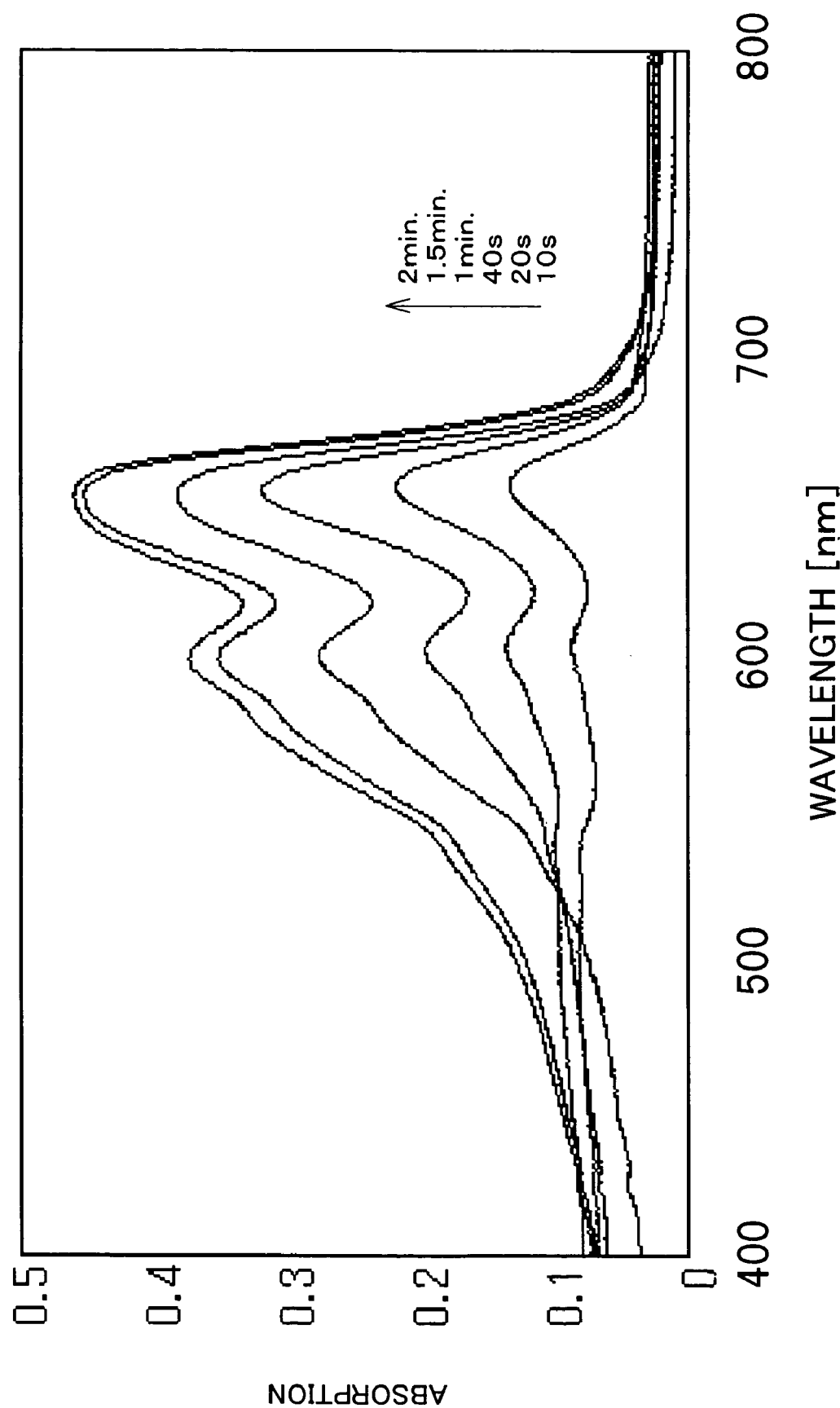
FIG. 12 illustrates how a diffuse reflectance ultraviolet-visible absorption spectrum changed over time after ultraviolet rays were radiated onto the 10,12-pentacosadiynecarboxyl 1-naphthylmethyl ammonium.

FIG. 11 shows TG/DTA spectrums of a built-up type diacetylene polymer obtained by radiating ultraviolet rays onto 10,12-pentacosadiynecarboxyl acid 1-naphthylmethylammonium made by combining 10,12-pentacosadiynecarboxyl acid ($C_{12}H_{25}C \equiv C-C \equiv C-C_8H_{16}-COOH$) and 1-naphthylmethylamine. FIG. 12 shows changes of an ultraviolet-visible absorption spectrum over time in case ultraviolet rays were radiated onto the ammonium carboxylate.

From FIG. 11, it was estimated that the melting point of the built-up type diacetylene polymer was not less than 150° C., and the decomposition temperature of the built-up type diacetylene polymer was not less than 250° C. From FIG. 12, it was found that absorption peaks at 600 nm and 655 nm increased as the radiation time of ultraviolet rays became longer. These two absorption peaks derived from a carbon-carbon triple bond and a carbon-carbon double bond on a main chain of the polymerized 10,12-pentacosadiynecarboxyl acid. Therefore, it was found that the crystal of ammonium carboxylate was polymerized by the ultraviolet rays radiated.

Figure 13:
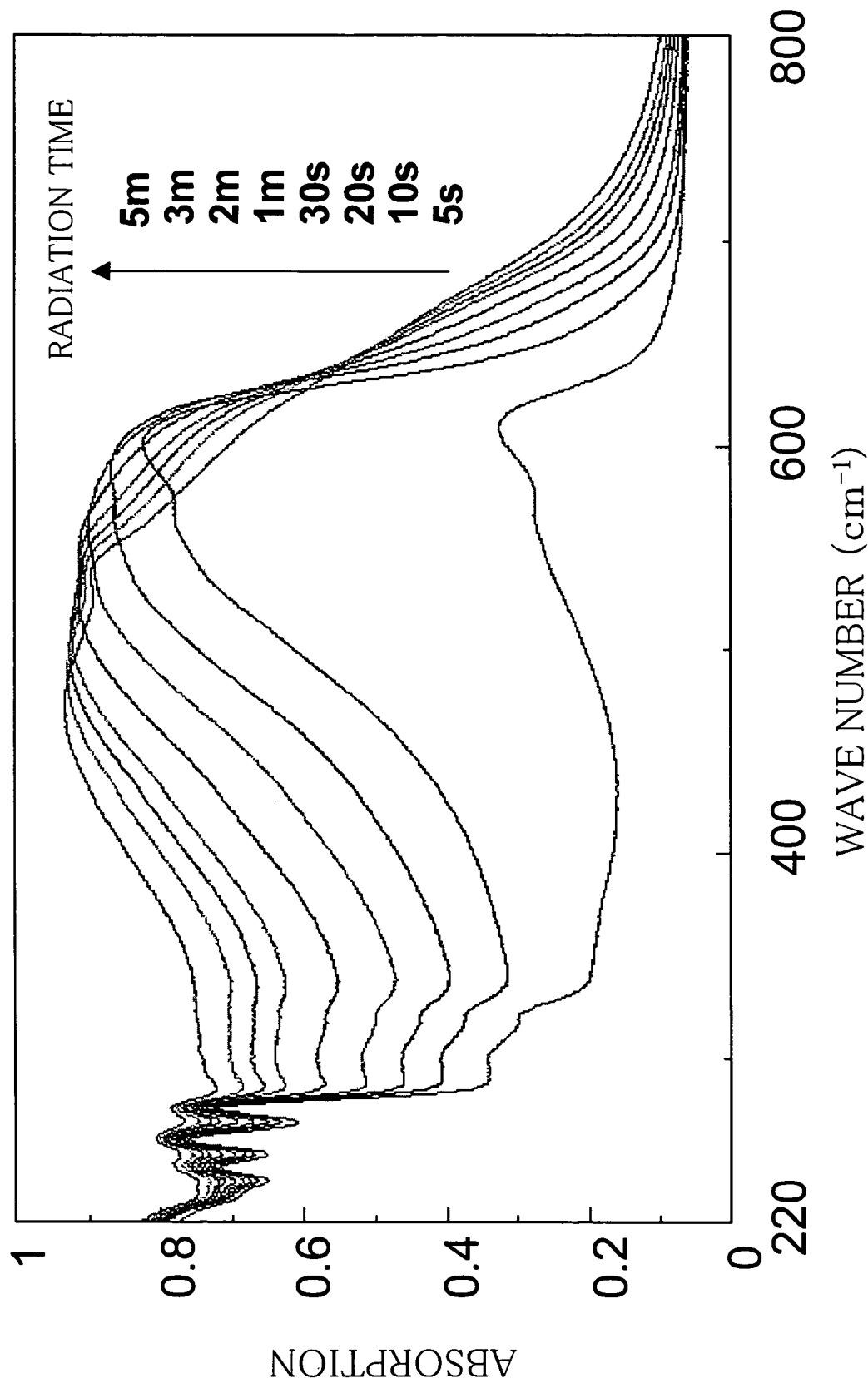
FIG. 13 illustrates how a diffuse reflectance ultraviolet-visible absorption spectrum changed over time after ultraviolet rays were radiated onto 2,4-pentadecadiynecarboxylic benzylammonium.

FIG. 13 shows changes of a diffuse reflectance ultraviolet-visible absorption spectrum over time in case ultraviolet rays were radiated onto 2,4-pentadecadiynecarboxylic benzylammonium made by combining 2,4-pentadecadiynecarboxylic acid and benzylamine. As shown in FIG. 13, it was found that an absorption around 530 nm increased as the radiation time of ultraviolet rays became longer. Therefore, it was found that the 2,4-pentadecadiynecarboxyl acid was polymerized.

Example 9

A crystal of ammonium carboxylate including carboxyl acid as a diene derivative and amine as a diacetylene derivative, and a built-up diacetylene polymer produced by polymerizing the crystal were obtained. Specifically, a) (Z,Z)-muconic 10,12-pentacosadiynylammonium, b) sorbic 10,12-tricosadiyneammonium, and c) 2,4-tetradecandienic 10,12-tricosadiyneammonium were synthesized and polymerized, respectively.

[Synthesis of Amine as Diacetylene Derivative]

10,12-pentacosadiynylamine and 10,12-tricosadiynylamine as diacetylene derivatives were synthesized.

Specifically, from the 10,12-pentacosadiynecarboxyl acid and the 10,12-tricosadiynecarboxyl acid as starting materials, 10,12-pentacosadiynylamine and 10,12-tricosadiynylamine were respectively synthesized by a method of synthesizing 2,4-tetradecyldienylamine, which is described later in Referential Example (see [Synthesis of Amine As Diene Derivative]).

A melting point of 10,12-pentacosadiynecarboxylicamide obtained during synthesis of the 10,12-pentacosadiynylamine was measured to be 99° C. to 102° C. As a result of $^1$H-NMR measurement (400 MHz; $CDCl_3$ was used as a solvent), chemical shifts δ (ppm) of peaks of spectrums were as follows: δ=5.37 (br s, $NH_2$, 2H), 2.20-2.26 (m, $CH_2$, $CH_2C \equiv$, 6H), 1.58 (s, $CH_2$, $\overline{2H}$), 1.48 (m, $CH_2$, 4H) 1.$\overline{25}$-1.$\overline{37}$ (m, $CH_2$, 26H), 0.88 (t, J=7.3 Hz, $CH_3$, 3H). Meaning of words in parentheses is described above.

As a result of measurement, melting point of the 10,12-pentacosadiynylamine obtained was 71° C. to 73° C. $^1$H-NMR measurement (400 MHz; $CDCl_3$ was used as a solvent) and $^{13}$C-NMR measurement (100 MHz; $CDCl_3$ was used as a solvent) were performed. Chemical shifts δ (ppm) of peaks of spectrums obtained were as follows.

As a result of the $^1$H-NMR measurement, the peaks were δ=2.67 (t, J=7 Hz, $CH_2$, 2H), 2.24 (t, J=7 Hz, $CH_2$, 2H), 1.25-1.36 (m, $CH_2$, 28$\overline{H}$), 0.88 (t, J=7.3 Hz, $CH_3$, $\overline{3H}$). As a result of the $^{13}$C-NMR measurement, δ=$\overline{77}$.51, 65.18 (C$\equiv$C), 41.95, 33.31, 31.88, 29.59, 29.39, 29.06, 28.80, 28.31, 26.81, 22.65, 19.16 ($CH_2$), and 14.09 ($CH_3$).

[Obtaining Crystal of Ammonium Carboxylate and Built-Up Type Diacetylene Polymer]

a) Synthesis and Polymerization of (Z,Z)-Muconic 10,12-pentacosadiynylammonium

In 50 mL of methanol, 0.016 g of (Z,Z)-muconic acid (a product of Mitsubishi Chemical Corporation), and 0.081 g of the 10,12-pentacosadiynylammonium obtained by the foregoing procedure were mixed. The mixture was concentrated by pressure-reduction until a total amount was reduced to 20 mL. Then, the mixture was cooled down to −30° C., so that a crystal of ammonium carboxylate was precipitated. By filtering, 0.020 g of the crystal was obtained. Onto the crystal, ultraviolet rays were radiated from a high-pressure mercury lamp for four hours. As a result, a built-up type diacetylene polymer was obtained.

The polymer obtained was purplish red. In infrared absorption spectrum measurement performed after ultraviolet rays were radiated, it was found that an absorption peak at 1593 $cm^{-1}$, which derived from conjugated diene, had disappeared. Thus, it was confirmed that the (Z-Z)-muconic acid had been polymerized. In diffuse reflectance ultraviolet-visible spectrum measurement performed after ultraviolet rays were radiated, intense absorption was found around 530 nm. Thus, it was found that the 10,12-pentacosadiynylamine had been polymerized.

b) Synthesis and Polymerization of Sorbic 10,12-tricosadiyneammonium

Equimolar amounts of sorbic acid (a product of Tokyo Kasei Kogyo Co., Ltd.) and 10,12-tricosadiyneamine were mixed in chloroform. Subsequently, the mixed solution was concentrated by pressure-reduction. Then, the mixed solution was cooled down to −30° C., so that a crystal was precipitated and obtained by filtering. The crystal obtained was in a powdery form. Then, the powdery crystal was shaped into a KBr tablet. Onto the tablet, ultraviolet rays were radiated from a high-pressure mercury lamp for four hours. As a result, a built-up type diacetylene polymer was obtained.

The polymer obtained was purplish red. In infrared absorption spectrum measurement performed after ultraviolet rays were radiated, it was found that an absorption peak at 1620 $cm^{-1}$, which derived from conjugated diene, disappeared. Thus, it was confirmed that the sorbic acid had been polymerized. In diffuse reflectance ultraviolet-visible spectrum measurement performed after ultraviolet rays were radiated, intense absorption was found around 530 nm. Thus, it was found that the 10,12-tricosadiyneamine had been polymerized.

c) Synthesis and Polymerization of 2,4-tetradecandienic 10,12-tricosadiyneammonium Except that 2,4-tetradecandienic acid and 10,12-tricosadiyneamine were used, synthesis and polymerization were performed as in b). As a result, a built-up type diacetylene polymer was obtained.

The polymer obtained was purplish red 30 minutes after ultraviolet rays were radiated. In diffuse reflectance ultraviolet-visible spectrum measurement performed four hours after ultraviolet rays were radiated, intense absorption was found around 530 nm. Thus, it was confirmed that the 10,12-tricosadiyneamine had been polymerized.

Figure 14:
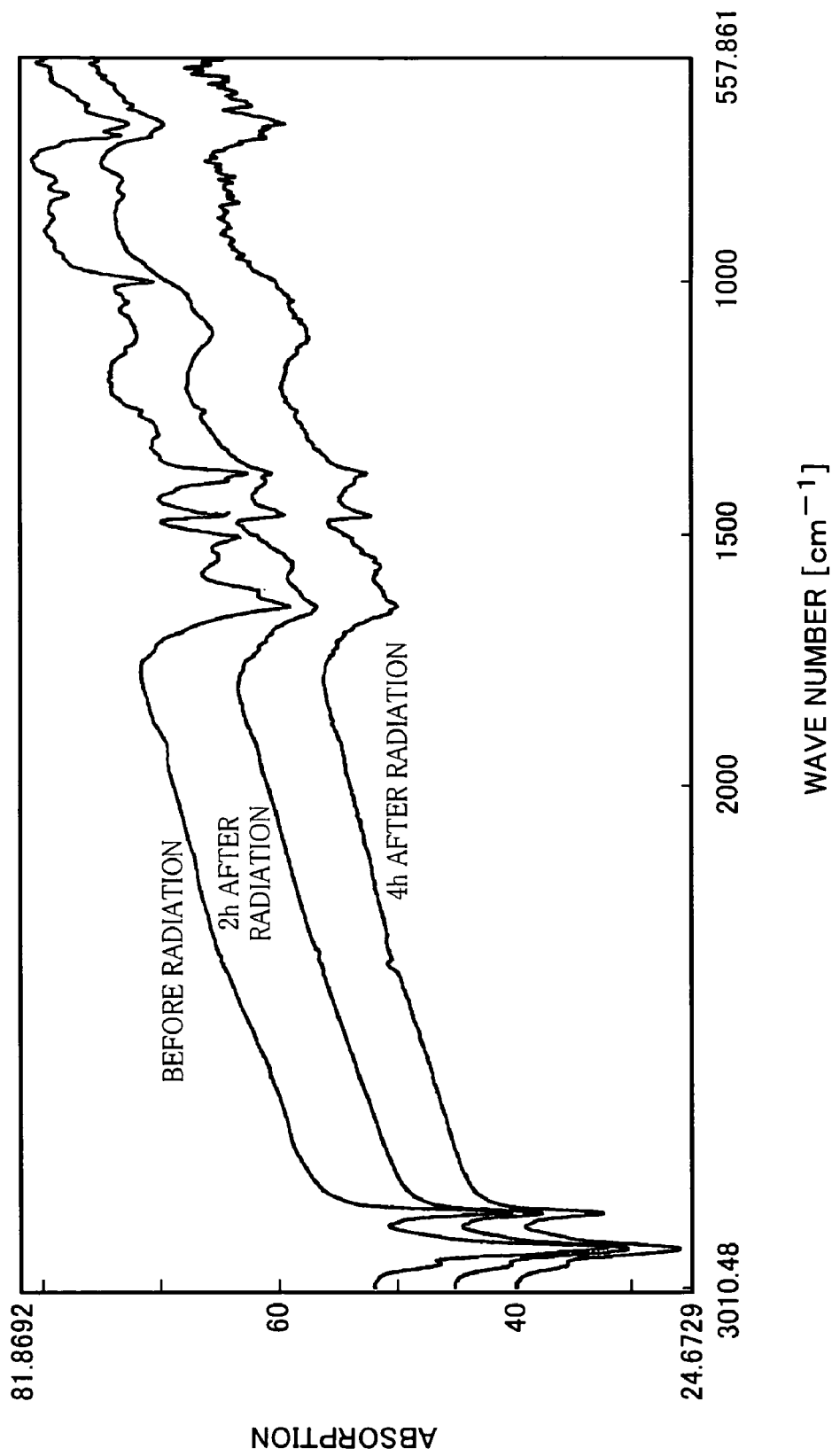
FIG. 14 illustrates how an infrared absorption spectrum changed over time after ultraviolet rays were radiated onto 2,4-tetradecanediene 10,12-tricosadiyneammonium.

In addition, infrared absorption spectrum measurement was performed before radiation of ultraviolet rays, two-hours after radiation, and four hours after radiation. FIG. 14 shows the results. As shown in FIG. 14, an absorption peak at 1648 cm$^{-1}$, which derived from conjugated diene, disappeared. Thus, it was confirmed that the 2,4-tetradecandienic acid had been polymerized.

Referential Example

A crystal of ammonium carboxylate including (i) polycarboxyl acid obtained by polymerizing carboxyl acid as a diene derivative and (ii) 2,4-tetradienylamine as a diene derivative was obtained.

[Synthesis of Amine as Diene Derivative]

The 2,4-tetradienylamine as a diene derivative was synthesized according to the following procedure.

A three-neck flask having a dropping funnel and a cooling tube was charged with (i) 0.802 g of sodium hydride (60%) dispersed in mineral oil and (ii) 100 mL of dry THF. While the dispersion liquid was stirred with a magnetic stirrer, phosphonotriethyl acetate (4.64 g) was gradually dropped for 50 minutes, followed by further stirring for one hour. Then, trans-2-dodecenal (4.05 g) was added into the flask. The flask was heated to 60° C. to 65° C., and then cooled down to 15° C. to 20° C. Then, a precipitate was isolated by decantation. To the precipitate, which was in a rubber-like form, THF was added to extract a soluble component. By concentrating the THF solution under a reduced pressure, an yellow liquid of 2,4-hexadecenecarboxylic ethyl was obtained at a 3.68 g (65.6%) yield.

The 2,4-hexadecencarboxylic ethyl (4.82 g) obtained according to the foregoing procedure was dissolved in 50 mL of methanol including 1.35 g of potassium hydroxide and approximately 10 mL of water. Then, the solution was put under reflux for one our. After that, the solution was cooled down, and diluted with water, so that the solution became several times larger in amount. Then, concentrated hydrochloric acid was added to the diluted solution until the diluted solution acquired acidity. After extraction was performed by using acetic ether, and the solvent was removed, 3.52 g (yield: 82.2%) of 2,4-hexadecencarboxyl acid was obtained.

With respect to the 2,4-hexadecencarboxyl acid obtained, $^1$H-NMR measurement (400 MHz; CDCl$_3$ was used as a solvent) was performed. As a result, chemical shifts δ (ppm) of peaks of spectrums were δ=7.35 (m, CH═CHCO$_2$H, 1H), 6.19 (m, CH═CHCO$_2$H, CH═CH—CH═CHCO$_2$H, 2H), 5.78 (d, CH$_2$CH═CH, 1H), 2.17 (m, CH$_2$CH═CH, 2H), 1.26-1.34 (m, CH$_2$, 14H), 0.88 (t, J=6.9 Hz, CH$_3$, 3H). Meaning of words in parentheses is described above, and d denotes a double line.

The 2,4-hexadecencarboxyl acid (3.52 g) was moved to a 100 mL-flask, and thionyl chloride (1.5 mL) was added thereto. After the flask was put under reflux for one hour in an oil bath, the contents, which was still hot, were gradually dropped with stirring into 28%-ammonia water (20 mL) cooled in an ice bath, and kept being stirred overnight. Then, 2,4-hexadecencarboxylamide thus produced was extracted by using chloroform. The chloroform was then removed by pressure-reduction. As a result, 2.85 g (89.3%) of 2,4-hexadecencarboxylamide was obtained. With respect to the 2,4-hexadecencarboxylamide obtained, $^1$H-NMR measurement (400 MHz; CDCl$_3$ was used as a solvent) and $^{13}$C-NMR measurement (100 MHz; CDCl$_3$ was used as a solvent) were performed. Chemical shifts δ (ppm) of peaks of spectrums obtained were as follows.

As a result of the $^1$H-NMR measurement, the peaks were δ=7.20 (m, CH═CHCO—, 1H), 6.13 (m, CH═CHCO, CH═CH—CH═CHCO—, 2H), 5.79 (d, CH═CH—CH═CHCO, 1H), 5.33 (brs, NH$_2$, 2H), 2.15 (m, CH$_2$CH═CH, 2H), 1.26-1.41 (m, CH$_2$, 14H), 0.87 (t, J=6.3 Hz, CH$_3$, 3H). Meaning of words in parentheses is described above, and s denotes a double line.

As a result of the $^{13}$C-NMR measurement, the peaks were δ=168.32 (C═O), 144.33, 142.89, 128.00, 120.34 (C═C), 32.96, 31.85, 29.49, 29.41, 29.28, 29.16, 28.07, 22.65 (CH$_2$), 14.09 (CH$_3$).

Then, a three-neck flask having a dropping funnel and a cooling tube was charged with aluminum lithium hydride (0.43 g) and diethylether anhydride (10 mL). Into the flask, an anhydrous ether solution (10 mL) of the 2,4-hexadecencarboxylamide (0.87 g) obtained above was gradually added for one hour. The reaction mixture was then put under reflux for 10 hours in an oil bath. The oil bath was replaced with an ice bath, and the excess aluminum lithium hydride was dissolved by carefully adding cold water (10 mL) by stirring intensely. After that, the stirring continued for 30 minutes. Then, the solution was filtered, and a soluble component was extracted several times from a remaining solid by using 100 mL of diethylether anhydride. The diethylether was removed by pressure-reduction. As a result, 2,4-tetradecyldienylamine was obtained at a 0.39 g (49.2%) yield.

With respect to the 2,4-tetradecyldienylamine obtained, $^1$H-NMR measurement (400 MHz; CDCl$_3$ was used as a solvent) and $^{13}$C-NMR measurement (100 MHz; CDCl$_3$ was used as a solvent) were performed. Chemical shifts δ (ppm) of peaks of spectrums obtained were as follows.

As a result of the $^1$H-NMR measurement, the peaks were 6=6.07 (m, CH═CH—CH═CH, 2H), 5.66 (m, CH═CHCH$_2$NH$_2$, 1H), 5.46 (m, CH═CH—CH═CHCH$_2$NH$_2$, 1H), 3.32 (m, CH$_2$NH$_2$, 2H), 1.98 (m, CH$_2$CH═CH—CH═CHCH$_2$NH$_2$, 2H), 1.21-1.48 (m, CH$_2$, 14H), 0.88 (t, J=6.8 Hz, CH$_3$, 3H).

As a result of the $^{13}$C-NMR measurement, the peaks were δ=134.42, 132.07, 130.14, 129.55 (C═C), 43.87, 32.57. 31.86, 29.53, 29.28, 25.28, 22.63 (CH$_2$), 14.07 (CH$_3$).

[Obtaining Ammonium Carboxylate]

First, according to publications (for example, A. Matsumoto, S. Nagahama, T. Odani, J. Am. Chem. Soc., 122, p. 9109 (2000); A. Matsumoto, Prog. React. Kinet. Mecha., 26, p. 59 (2001)), ultraviolet rays were radiated onto a crystal of muconic alkylammonium for 100 hours from a high-pressure mercury lamp. Thus, the crystal of muconic alkylammonium was polymerized in a solid state. After that, the crystal of polymuconic alkylammonium was hydrolyzed or thermally decomposed, so as to obtain polymuconic acid. Then, 50 mg of a crystal of polymuconic acid was dispersed in 20 mL of methanol, and one equivalent of 2,4-tetradecyldienylamine was added to the crystal of polymuconic acid. After (i) stirring at a room temperature for eight hours, (ii) filtering, and (iii) drying by pressure-reduction, a crystal was obtained.

With respect to the crystal obtained, infrared absorption measurement and powder X-ray diffraction spectrum measurement were performed. As a result, it was found that the 2,4-tetradecyldienylamine was introduced into the crystal of polymuconic acid, as a result of intercalation.

Example 10

By intercalation, a crystal of ammonium carboxylate was obtained, which included (i) polycarboxyl acid made by polymerizing carboxyl acid as a diene derivative and (ii) 10,12-pentacosadiynylamine which was a diacetylene derivative and was obtained by the foregoing method. Furthermore, a built-up type diacetylene derivative made by polymerizing the crystal was obtained.

Specifically, according to publications (for example, A. Matsumoto, S. Nagahama, T. Odani, J. Am. Chem. Soc., 122, p. 9109 (2000); A. Matsumoto, Prog. React. Kinet. Mecha., 26, p. 59 (2001)), ultraviolet rays were radiated onto a crystal of muconic alkylammonium for 100 hours from a high-pressure mercury lamp. Thus, the crystal of muconic alkylammonium was polymerized in a solid state. After that, the crystal of muconic alkylammonium was hydrolyzed or thermally decomposed, so as to obtain polymuconic acid.

Figure 15:
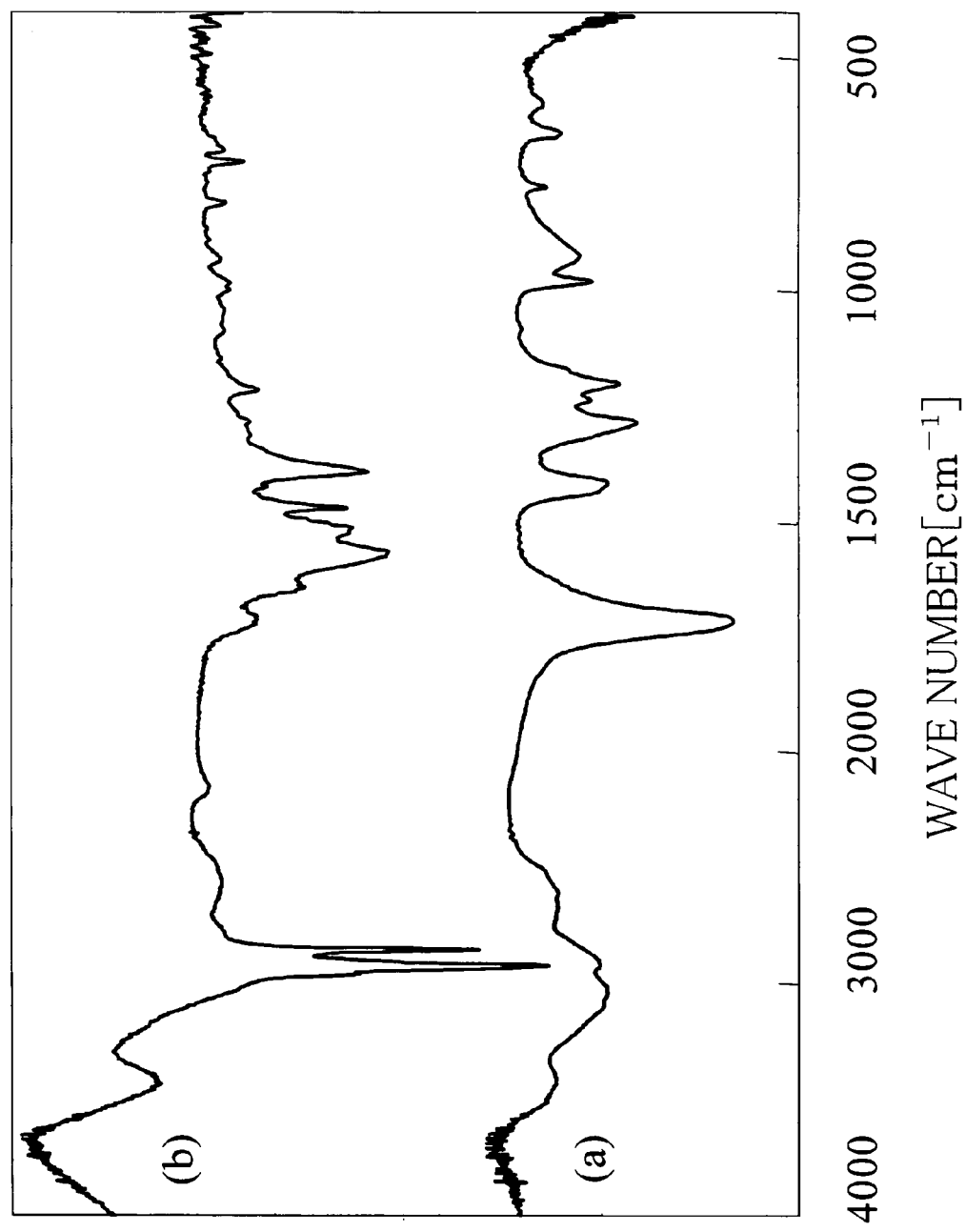
FIG. 15 illustrates an infrared absorption spectrum ((a)) of polymuconic acid and an infrared absorption spectrum ((b)) of a crystal of ammonium carboxylate in which 10,12-pentacosadiynylamine was introduced into the polymuconic acid by means of intercalation.

With respect to the crystal of polymuconic acid, infrared absorption spectrum measurement was performed. FIG. 15 shows the result. As shown by the spectrum (a) in FIG. 15, intensity of absorption peaks at 1610 cm$^{-1}$ and 1649 cm$^{-1}$, both of which derived from conjugated diene, were decreased. Instead, an absorption peak at 970 cm$^{-1}$, which derived from a trans-type carbon-carbon double bond, appeared clearly. Therefore, it was found that the muconic alkylammonium was polymerized, and became the polymuconic acid.

Then, 50 mg of the crystal of polymuconic acid obtained was dispersed in 20 mL of methanol, and one equivalent of 10,12-pentacosadiynylamine was added to the crystal of polymuconic acid. After (i) stirring at a room temperature for two hours, (ii) filtering, and (iii) drying by pressure-reduction, a crystal was obtained as a result of intercalation.

With respect to the crystal of ammonium carboxylate obtained, infrared absorption spectrum measurement was performed. FIG. 15 shows the result. As shown by the spectrum (b) in FIG. 15, the infrared absorption spectrum of the ammonium carboxylate was different from the infrared absorption spectrum ((a) in FIG. 15) of the crystal of polymuconic acid. This suggests that 10,12-pentacosadiynylamine was introduced into the crystal of polymuconic acid.

Further, the crystal of ammonium carboxylate was subjected to heat, ultraviolet rays, X-rays, or γ-rays. As a result, a built-up type diacetylene polymer was obtained at a 76.8% yield. The built-up type diacetylene polymer was violet in all cases. Thus, as shown in FIGS. 16(a) and 16(b), the color of the crystal was changed by radiation in case X-rays or γ-rays were radiated.

Figure 17:
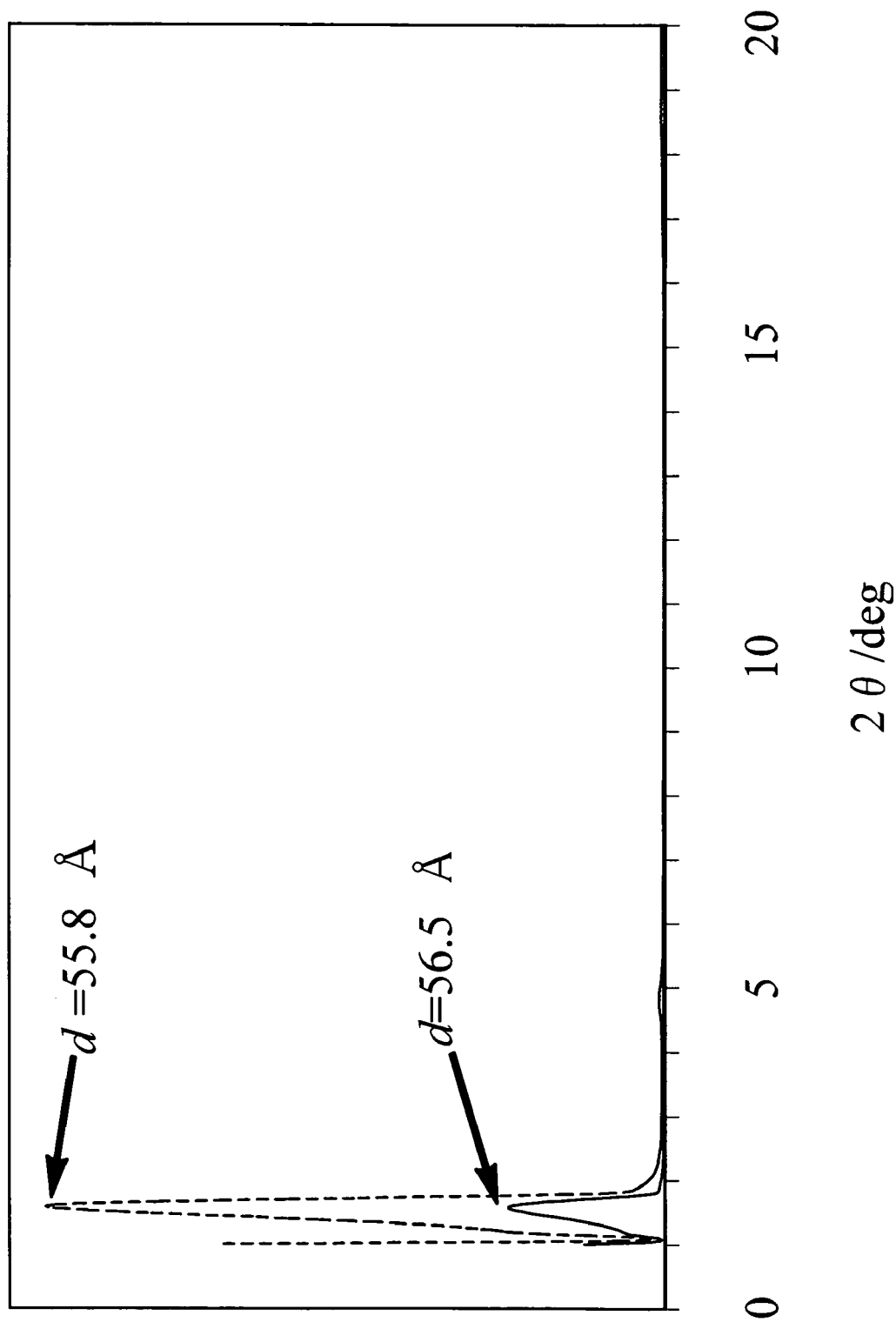
FIG. 17 illustrates X-ray powder diffraction spectrums of the crystal of ammonium carboxylate before and after γ-rays were radiated. The solid line indicates the spectrum before radiation, and the dotted line indicates the spectrum after radiation.

Furthermore, before and after radiating γ-rays onto the crystal of ammonium carboxylate, X-ray powder diffraction spectrum measurement was performed. FIG. 17 shows the result. As shown in FIG. 17, the peak (solid line in the figure) observed before the radiation of γ-rays shifted to a low-angle-side (dotted line in the figure) after the radiation of γ-rays. From these peaks, it was estimated that a layer interval d was 56.5 Å before the radiation of γ-rays, and 55.8 Å before the radiation of γ-rays. These results indicate that the 10,12-pentacosadiynylamine was polymerized.

Figure 18:
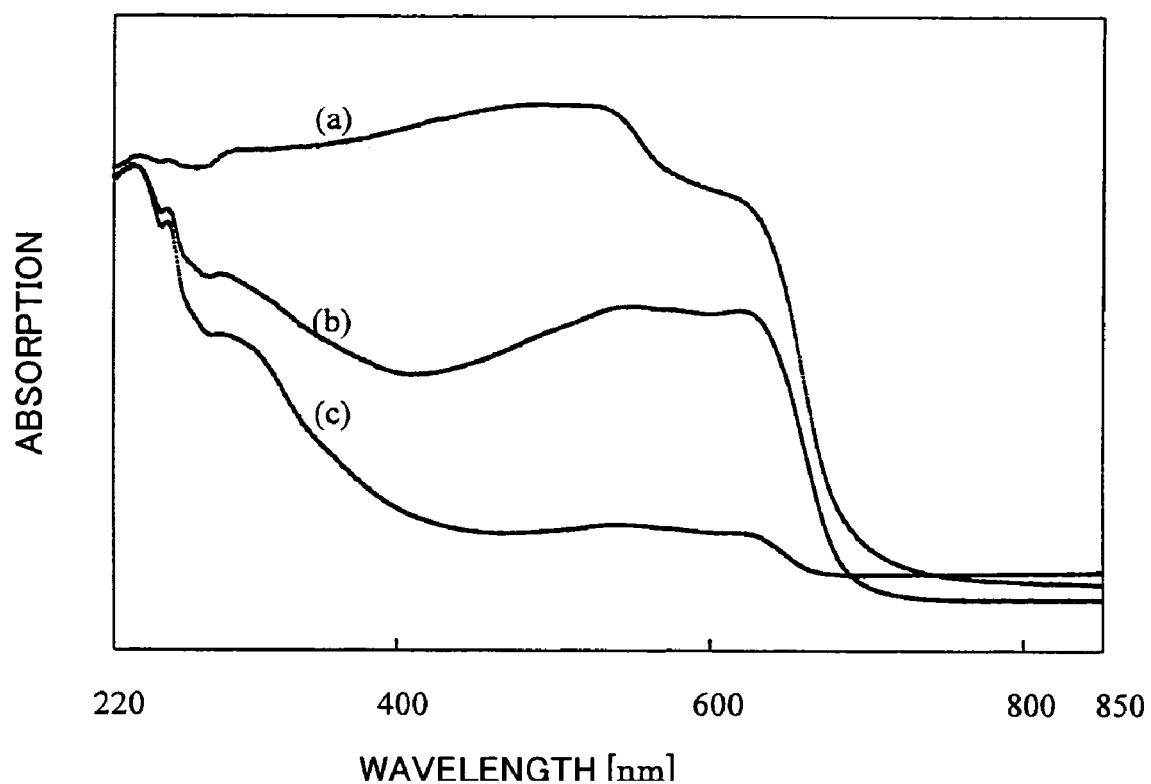
FIG. 18 illustrates a diffuse reflectance ultraviolet-visible spectrum ((a)) of a built-up type diacetylene polymer obtained by radiating γ-rays onto the crystal of ammonium carboxylate, a diffuse reflectance ultraviolet-visible spectrum ((b)) of a built-up type diacetylene polymer obtained by radiating ultraviolet rays onto the crystal of ammonium carboxylate, and a diffuse reflectance ultraviolet-visible spectrum ((c)) of the crystal of ammonium carboxylate.

Furthermore, diffuse reflectance ultraviolet-visible measurement was performed with respect to the ammonium carboxylate, and the built-up type diacetylene polymer obtained by radiating γ-rays or ultraviolet rays onto the ammonium carboxylate. The result is shown in FIG. 18. As shown in FIG. 18, in the spectrum ((a) in the figure) of the built-up type diacetylene polymer obtained by radiating γ-rays, and in the spectrum ((b) in the figure) of the built-up type diacetylene polymer obtained by radiating ultraviolet rays, intense absorption around 400 nm to 600 nm, which was not found in the spectrum ((c) in the figure) of the ammonium carboxylate, was observed. Therefore, it was found that the 10,12-pentacosadiynylamine was polymerized, and became the built-up type diacetylene polymer.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to the method of the present invention for manufacturing a crystal of ammonium carboxylate, it is possible to manufacture a crystal of ammonium carboxylate in a simple manner.

Moreover, the layer interval of the photoresponsive polymer of the present invention changes reversibly according to conditions of light radiation. Therefore, the photoresponsive polymer can be used as (i) a photofunctional material for use as an optical memory material and a recording material, (ii) a photofunctional material for use as an electric/electronic material, (iii) and the like.

Furthermore, the built-up type diacetylene polymer of the present invention can be used as a novel functional polymer used in an organic electroluminescence (organic EL), an organic photoluminescence (organic PL), a non-linear optical material, an organic semiconductor, a nano-device, and the like.

What is claimed is:

1. A method of manufacturing a photoresponsive polymer, comprising:
   mixing, in an absence of a liquid medium, a layered crystal of a polymer of a conjugated diene including a carboxyl group with an azo-group-containing compound that has a bivalent group and is represented by the following general formula

where Ar and Ar' are independently aromatic hydrocarbon bivalent groups, respectively; and
   the azo-group-containing compound being intercalated into the layered crystal.

2. A photoresponsive polymer, comprising:
   a compound containing azo-group represented by the following general formula

where Ar and Ar' are independently aromatic hydrocarbon bivalent groups, respectively,
   the azo-group-containing compound being intercalated in a layered crystal of a polymer of a conjugated diene including a carboxyl group.

3. The method as set forth in claim 1, wherein the conjugated diene including a carboxyl group is α,β-unsaturated dibasic carboxyl acid or α,β-unsaturated monobasic carboxyl acid.

4. The method as set forth in claim 1, wherein the layered crystal of a polymer of a conjugated diene including a carboxyl group is a polymuconic acid crystal or a polysorbic acid crystal.

5. The photoresponsive polymer as set forth in claim 2, wherein the polymer of a conjugated diene including a carboxyl group is a polymer of α,β-unsaturated dibasic carboxyl acid or α,β-unsaturated monobasic carboxyl acid.

6. The photoresponsive polymer as set forth in claim 2, wherein the polymer of a conjugated diene including a carboxyl group is polymuconic acid or a polysorbic acid.

* * * * *

UNITED STATES PATENT AND TRADEMARK OFFICE
CERTIFICATE OF CORRECTION

| | | |
|---|---|---|
| PATENT NO. | : 7,750,084 B2 | Page 1 of 1 |
| APPLICATION NO. | : 10/487849 | |
| DATED | : July 6, 2010 | |
| INVENTOR(S) | : Akikazu Matsumoto et al. | |

It is certified that error appears in the above-identified patent and that said Letters Patent is hereby corrected as shown below:

Title page, item (54) Title should read as follows:
(54) PHOTORESPONSIVE POLYMER, BUILT-UP TYPE DIACETYLENE POLYMER, CRYSTAL OF AMMONIUM CARBOXYLATE, AND METHOD OF MANUFACTURING THEM Signed and Sealed this Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,750,084 B2  
APPLICATION NO. : 10/487849  
DATED : July 6, 2010  
INVENTOR(S) : Akikazu Matsumoto et al.

Page 1 of 1

It is certified that error appears in the above-identified patent and that said Letters Patent is hereby corrected as shown below:

Title page, item (54) and at Column 1, lines 1-4, Title should read as follows:  
PHOTORESPONSIVE POLYMER, BUILT-UP TYPE DIACETYLENE POLYMER, CRYSTAL OF AMMONIUM CARBOXYLATE, AND METHOD OF MANUFACTURING THEM This certificate supersedes the Certificate of Correction issued November 16, 2010.

Signed and Sealed this

Fourteenth Day of December, 2010

David J. Kappos  
*Director of the United States Patent and Trademark Office*